(12) United States Patent
Harari et al.

(10) Patent No.: US 12,531,121 B2
(45) Date of Patent: Jan. 20, 2026

(54) THREE-DIMENSIONAL NOR MEMORY ARRAY OF THIN-FILM FERROELECTRIC MEMORY TRANSISTORS IMPLEMENTING PARTIAL POLARIZATION

(71) Applicant: SUNRISE MEMORY CORPORATION, San Jose, CA (US)

(72) Inventors: Eli Harari, Saratoga, CA (US);
Masahiro Yoshihara, Yokohama (JP);
Michael McCarthy, San Jose, CA (US)

(73) Assignee: SUNRISE MEMORY CORPORATION, San Jose, CA (US)

( * ) Notice: Subject to any disclaimer, the term of this patent is extended or adjusted under 35 U.S.C. 154(b) by 93 days.

(21) Appl. No.: 18/651,510

(22) Filed: Apr. 30, 2024

(65) Prior Publication Data

US 2024/0379160 A1    Nov. 14, 2024

Related U.S. Application Data

(60) Provisional application No. 63/501,124, filed on May 9, 2023.

(51) Int. Cl.
*G11C 16/04* (2006.01)
*G11C 5/06* (2006.01)
(Continued)

(52) U.S. Cl.
CPC .......... *G11C 16/0483* (2013.01); *G11C 5/063* (2013.01); *G11C 16/14* (2013.01);
(Continued)

(58) Field of Classification Search
CPC .......................... H01L 29/79; G11C 16/0408
See application file for complete search history.

(56) References Cited

U.S. PATENT DOCUMENTS 6,872,609 B1    3/2005   Kamal et al.
7,176,113 B1    2/2007   Wong et al.
(Continued)

OTHER PUBLICATIONS

H. Mulaosmanovic et al., "Evidence of single domain switching in hafnium oxide based FeFETs: Enabler for multi-level FeFET memory cells," 2015 IEEE International Electron Devices Meeting (IEDM), Washington, DC, USA, 2015, pp. 26.8.1-26.8.3, doi: 10.1109/IEDM.2015.7409777, 3 pages.

(Continued)

*Primary Examiner* — Jason Lappas

(57) ABSTRACT

A memory structure including three-dimensional NOR memory strings and method of operation is disclosed. In some embodiments, the memory device implements partial polarization to provide a reference signal for read operation. The reference signal realizes a third logical state distinguishable from the first and second logical stages in the ferroelectric memory transistor, such as associated with the program and erase states. In another embodiment, the memory device provides a reference signal for read operation by averaging a first signal associated with a program state and a second signal associated with an erased state of the ferroelectric memory transistor. In some embodiments, the memory device implements one or more partial polarization states to provide a multi-level memory cell with more than one logical bit stored in each memory cell.

43 Claims, 20 Drawing Sheets

(51) Int. Cl.
*G11C 16/14* (2006.01)
*G11C 16/26* (2006.01)
*H10B 43/20* (2023.01)
*H10B 51/20* (2023.01)
*H10D 30/67* (2025.01)
*H10D 30/69* (2025.01)

(52) U.S. Cl.
CPC .............. *G11C 16/26* (2013.01); *H10B 43/20* (2023.02); *H10B 51/20* (2023.02); *H10D 30/6729* (2025.01); *H10D 30/701* (2025.01)

(56) References Cited

U.S. PATENT DOCUMENTS

| | | | |
|---|---|---|---|
| 8,900,928 | B2 | 12/2014 | Taya et al. |
| 10,038,092 | B1 | 7/2018 | Chen et al. |
| 10,121,553 | B2 | 11/2018 | Harari |
| 11,839,086 | B2 | 12/2023 | Petti et al. |
| 2004/0129987 | A1* | 7/2004 | Uchiyama ............ H10D 64/033 257/E21.208 |
| 2013/0237022 | A1 | 9/2013 | Rogers et al. |
| 2014/0340952 | A1 | 11/2014 | Ramaswamy et al. |
| 2017/0154999 | A1* | 6/2017 | Ramaswamy ......... H10B 41/30 |
| 2019/0147935 | A1 | 5/2019 | Yoo |
| 2020/0357821 | A1 | 11/2020 | Chen |
| 2022/0238551 | A1 | 7/2022 | Petti |
| 2023/0077181 | A1 | 3/2023 | Petti et al. |
| 2023/0262988 | A1 | 8/2023 | Harari |

OTHER PUBLICATIONS

Soliman, T., Chatterjee, S., Laleni, N. et al. First demonstration of in-memory computing crossbar using multi-level Cell FeFET. Nat Commun 14, 6348 (2023). https://doi.org/10.1038/s41467-023-42110-y, 9 pages.

Halid Mulaosanovic et al., "Ferroelectric field-effect transistors based on HfO2: a review," 2021 Nanotechnology 32 502002, published Sep. 22, 2021, 29 pages.

P. Meihar et al., "FeFET-based MirrorBit cell for High-density NVM storage," arXiv:2304.03124v3, https://doi.org/10.48550/arXiv.2304.03124, submitted on Apr. 6, 2023 (v1), last revised Sep. 14, 2023 (v3), 6 pages.

"PCT Search Report and Written Opinion, PCT/US2024/027536", Aug. 28, 2024, 28 pages.

* cited by examiner

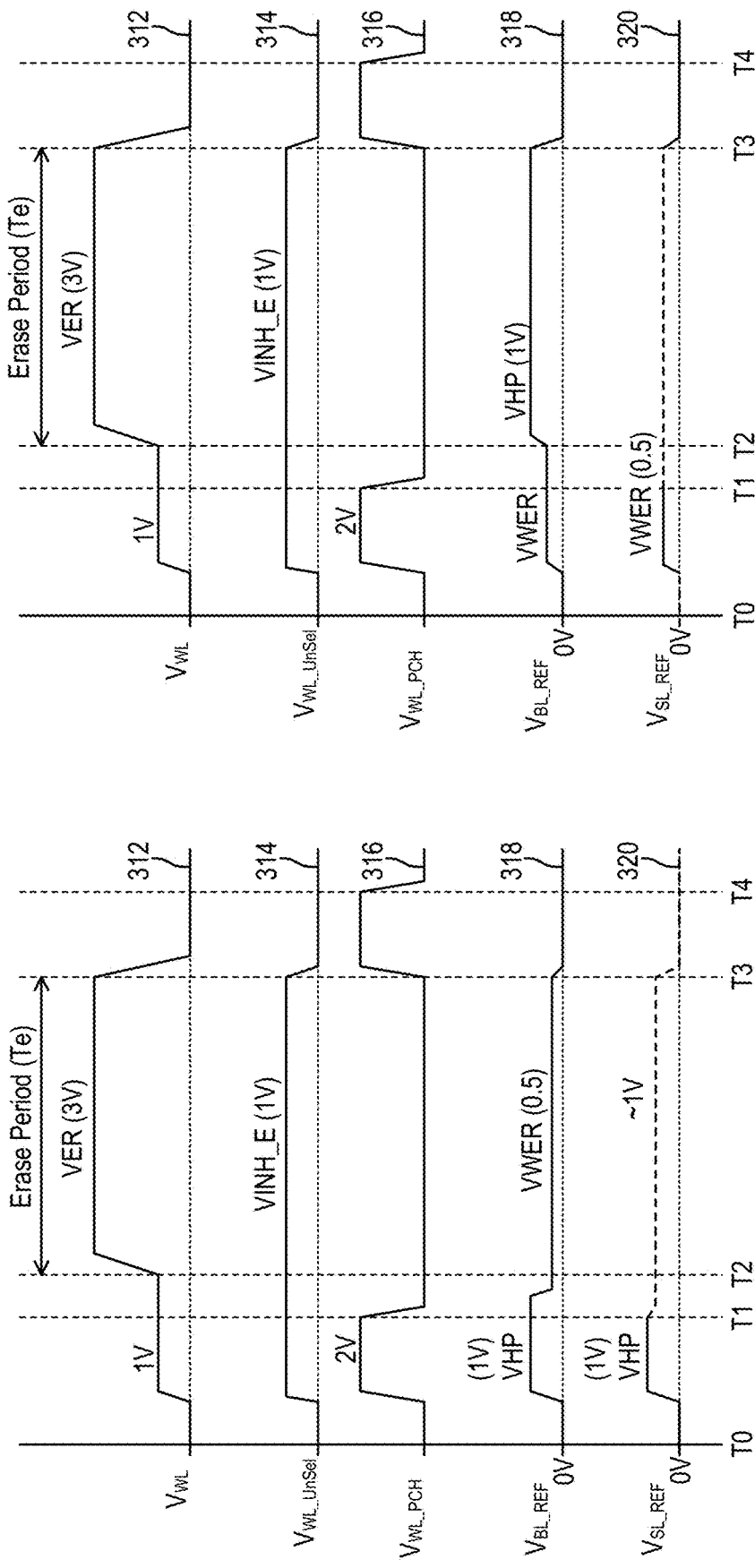

THREE-DIMENSIONAL NOR MEMORY ARRAY OF THIN-FILM FERROELECTRIC MEMORY TRANSISTORS IMPLEMENTING PARTIAL POLARIZATION

CROSS REFERENCE TO RELATED APPLICATIONS

This application claims priority to U.S. Provisional Patent Application No. 63/501,124, entitled Three-Dimensional NOR Memory Array of Thin-Film Ferroelectric Memory Transistors Implementing Partial Polarization for Reference Signal, filed May 9, 2023, which is incorporated herein by reference in its entirety for all purposes.

FIELD OF THE INVENTION

The invention relates to semiconductor memory devices and methods of operation. More specifically, the present invention relates to a three-dimensional memory array of thin-film ferroelectric memory transistors implementing partial polarization to provide additional polarization states, which can be applied for use as a reference signal or as additional data bits.

BACKGROUND OF THE INVENTION

High density memory arrays, such as 3-dimensional arrays of NOR memory strings ("3-D NOR memory arrays"), have been disclosed in, for example, U.S. Pat. No. 10,121,553 ("the '553 patent"), entitled "Capacitive-Coupled Non-Volatile Thin-film Transistor NOR Strings in Three-Dimensional Arrays," filed on Aug. 26, 2016, and issued on Nov. 6, 2018. The '553 patent disclosure is hereby incorporated by reference in its entirety for all purposes. In the '553 patent, storage or memory transistors are organized as 3-dimensional arrays of NOR memory strings formed above a planar surface of a semiconductor substrate. In the '553 patent, a NOR memory string includes numerous thin-film storage transistors that share a common bit line and a common source line. In one implementation, storage transistors in a NOR memory string are arranged along a direction (a "horizontal direction") that is substantially parallel to the planar surface of the semiconductor substrate. In such a 3-dimensional array, the NOR memory strings are provided on multiple planes (e.g., 8 or 16 planes) above the semiconductor substrate, with the NOR memory strings on each plane arranged in rows and one or more columns along two orthogonal horizontal directions. Data is stored in a charge-trapping layer (e.g., a silicon oxide-silicon nitride-silicon oxide triple layer) in each storage transistor. Each storage transistor of a NOR memory string is read, programmed, or erased by suitably biasing its associated word line and the common bit line it shares with other storage transistors in the NOR memory string.

In addition to providing high memory density and capacity, these 3-D NOR memory arrays may be operated to provide memory circuits at highly desirable speeds that rival conventional memory circuits of much lower circuit densities and significantly higher power dissipation, e.g., such as dynamic random-access memories ("DRAMs"). Furthermore, the memory circuits in the '553 patent are sometimes referred to as "quasi-volatile memory" or "QV memory." Like those of a non-volatile memory (NVM), the memory cells of a QV memory each store a data bit as an electric charge in a charge storage material (e.g., ONO). Because of the nature of its charge-storage layer, a typical QV memory cell has a much longer data retention time than a DRAM cell and, hence, requires a lower refresh rate than the DRAM cell. For example, a typical DRAM system is designed to be refreshed every 64 milliseconds; a QV memory with a comparable effective access performance, however, may be refreshed every 10 minutes. The reduced refresh rate provides the QV memory great advantages in a lower power requirement, a reduced heat dissipation, and a higher memory availability which delivers a better host performance.

Advances in electrically polarizable materials ("ferroelectric materials"), especially those that are being used in semiconductor manufacturing processes, suggest new potential applications in ferroelectric memory circuits. High density memory arrays implemented using 3-dimensional arrays of NOR memory strings of ferroelectric memory transistors have been disclosed in, for example, U.S. patent application Ser. No. 17/936,320, entitled "Memory Structure Including Three-Dimensional NOR Memory Strings Of Junctionless Ferroelectric Memory Transistors And Method Of Fabrication," filed Sep. 28, 2022 ("the '320 application"). The '320 application is hereby incorporated by reference in its entirety for all purposes. The '320 application describes a memory structure that includes randomly accessible ferroelectric memory transistors organized as horizontal NOR memory strings. The ferroelectric memory transistors include a polarizable ferroelectric material as the gate dielectric layer. The NOR memory strings are formed over a semiconductor substrate in multiple scalable memory stacks of thin-film memory transistors. In some examples, the three-dimensional memory stacks are manufactured in a process that includes forming operational trenches for vertical local word lines and forming auxiliary trenches to facilitate back-alley metal replacement and channel separation by a backside selective etch process. Three-dimensional arrays of NOR memory strings of thin-film ferroelectric memory transistors have also been disclosed in, for example, U.S. patent application Ser. No. 17/812,375, entitled "3-Dimensional Memory String Array Of Thin-Film Ferroelectric Transistors," of Christopher J. Petti et al., filed on Jul. 13, 2022, which application is incorporated herein by reference in its entirety.

Various aspects of the read, program or erase operation of the NOR memory string can be optimized to enhance the performance of the memory device.

SUMMARY OF THE INVENTION

The present disclosure discloses a memory device including three-dimensional arrays of NOR memory strings of junctionless ferroelectric memory transistors and method of operation, substantially as shown in and/or described below, for example in connection with at least one of the figures, as set forth more completely in the claims.

In some embodiments, a memory device includes an array of memory strings, each memory string including thin-film ferroelectric memory transistors ("memory cells") having drain terminals coupled to a common bit line, source terminals coupled to a common source line, and gate terminals coupled to respective word lines, ferroelectric memory transistors across multiple memory strings that are vertically aligned in the array being coupled to a common word line, each ferroelectric memory transistor including a ferroelectric gate dielectric layer that is polarizable in response to application of bias voltages to the drain, source and gate terminals. In response to being driven by a first set of bias voltages, the ferroelectric memory transistors provide a first polarization state in the ferroelectric gate dielectric layer, the first polarization state being associated with a first threshold voltage value, and in response to being driven by a second set of bias voltages, the ferroelectric memory transistors provide a second polarization state in the ferroelectric gate dielectric layer, the second polarization state being associated with a second threshold voltage value, the second threshold voltage value being greater than the first threshold voltage value. At least one memory transistor in a first memory string is designated as a reference memory transistor, and in response to being driven by a third set of bias voltages, the reference memory transistor provides a third polarization state ("reference polarization state") in the ferroelectric gate dielectric layer of the reference memory transistor, the third polarization state having a polarization level in the ferroelectric gate dielectric layer being between the first and second polarization states, the third polarization state being associated with a third threshold voltage value being between the first and second threshold voltage values.

In another embodiment, a method for sensing data in a memory device is described. The memory device is implemented as an array of memory strings of ferroelectric memory transistors ("memory cells"), each memory string including thin-film ferroelectric memory transistors having drain terminals coupled to a common bit line, source terminals coupled to a common source line, and gate terminals coupled to respective word lines, each ferroelectric memory transistor including a ferroelectric gate dielectric layer that is polarizable in response to application of bias voltages to the drain, source and gate terminals. The method includes biasing, using a first set of bias voltages, one or more ferroelectric memory transistors to provide a first polarization state in the ferroelectric gate dielectric layer, the first polarization state being associated with a first threshold voltage value; biasing, using a second set of bias voltages, one or more ferroelectric memory transistors to provide a second polarization state in the ferroelectric gate dielectric layer, the second polarization state being associated with a second threshold voltage value, the second threshold voltage value being greater than the first threshold voltage value; designating at least one ferroelectric memory transistor in a first memory string as a reference memory transistor; and biasing, using a third set of bias voltages, the reference memory transistor to provide a third polarization state ("reference polarization state") in the ferroelectric gate dielectric layer of the reference memory transistor, the third polarization state having a polarization level in the ferroelectric gate dielectric layer being between the first and second polarization states, the third polarization state being associated with a third threshold voltage value being between the first and second threshold voltage values.

In yet another embodiment, a memory device includes an array of memory strings, each memory string including thin-film ferroelectric memory transistors ("memory cells") having drain terminals coupled to a common bit line, source terminals coupled to a common source line, and gate terminals coupled to respective word lines, ferroelectric memory transistors across multiple memory strings that are vertically aligned in the array being coupled to a common word line, each ferroelectric memory transistor including a ferroelectric gate dielectric layer that is polarizable in response to application of bias voltages to the drain, source and gate terminals. The ferroelectric memory transistors are driven by a first set of bias voltages to provide a first polarization state in the ferroelectric gate dielectric layer, the first polarization state being associated with a first threshold voltage value, and further driven by a second set of bias voltages to provide a second polarization state in the ferroelectric gate dielectric layer, the second polarization state being associated with a second threshold voltage value, the second threshold voltage value being greater than the first threshold voltage value. A first ferroelectric memory transistor in the array is designated as a first reference memory transistor and a second ferroelectric memory transistor in the array is designated as a second reference memory transistor, the first reference memory transistor being driven by the first set of bias voltages to the first polarization state and the second reference memory transistor being driven by the second set of bias voltages to the second polarization state, bit line signals from the first and second reference memory transistors, indicative of respective first and second polarization states, are combined to generate a reference signal for reading the ferroelectric memory transistors to determine the logical state of the stored memory data.

In other embodiments of the present invention, the reference polarization state in the reference memory transistor is polarizable in response to application of bias voltages for the drain to gate terminals of the ferroelectric memory transistor that is different from the bias voltages for the source to gate terminals of the ferroelectric memory transistor. The differences in bias voltages can be realized as different voltage values applied or different duration of the applied bias voltages. More than one reproducible polarization states can thus be established in the same ferroelectric memory transistor, thereby making a ferroelectric multi-level cell. In some embodiments the polarizable states can be formed as a continuous ferroelectric analog memory cell.

In another embodiment, a dual-bit ferroelectric memory cell is formed by application of a first bias voltage at the drain to gate terminal and a second bias voltage, different from the first bias voltage, at the source to gate terminals, thereby forming two distinctly different polarization states in the memory cell—a first polarization state at the drain terminal of the memory cell and a second polarization state at the source terminal of the memory cell. Reading the two bits from the same memory cell can be performed in two steps, for example by first reading from source to drain and then reversing and reading from drain to source, thereby to sense the polarizations of the ferroelectric layers adjacent the drain and then sensing the polarization of the ferroelectric layer adjacent the source respectively. In the present description, reading from source to drain refers to biasing the source terminal of the memory transistor to sense the cell current flowing from source to drain terminals and reading from drain to source refers to biasing the drain terminal of the memory transistor to sense the cell current flowing from drain to source terminals.

In embodiments of the present invention, the reference signal schemes are described as providing a reference signal for the read operations in three-dimensional memory arrays of ferroelectric memory transistors. It is understood that the reference signal schemes can be readily applied in two dimensional memory arrays to provide a reference signal for read operations. For example, the reference signal schemes described herein can be applied to planar arrays of ferroelectric memory cells, including memory transistors built on the memory substrate.

These and other advantages, aspects and novel features of the present invention, as well as details of an illustrated embodiment thereof, will be more fully understood from the following description and drawings.

BRIEF DESCRIPTION OF THE DRAWINGS

Various embodiments of the invention are disclosed in the following detailed description and the accompanying drawings. Although the drawings depict various examples of the invention, the invention is not limited by the depicted examples. It is to be understood that, in the drawings, like reference numerals designate like structural elements. Also, it is understood that the depictions in the figures are not necessarily to scale.

FIGS. 10(a) and 10(b) are timing diagrams illustrating the voltage and timing conditions for performing a partial polarization operation to realize a partial polarization state in a reference memory transistor of the memory device in alternate embodiments of the present invention.

DETAILED DESCRIPTION OF THE INVENTION

Figure 1:
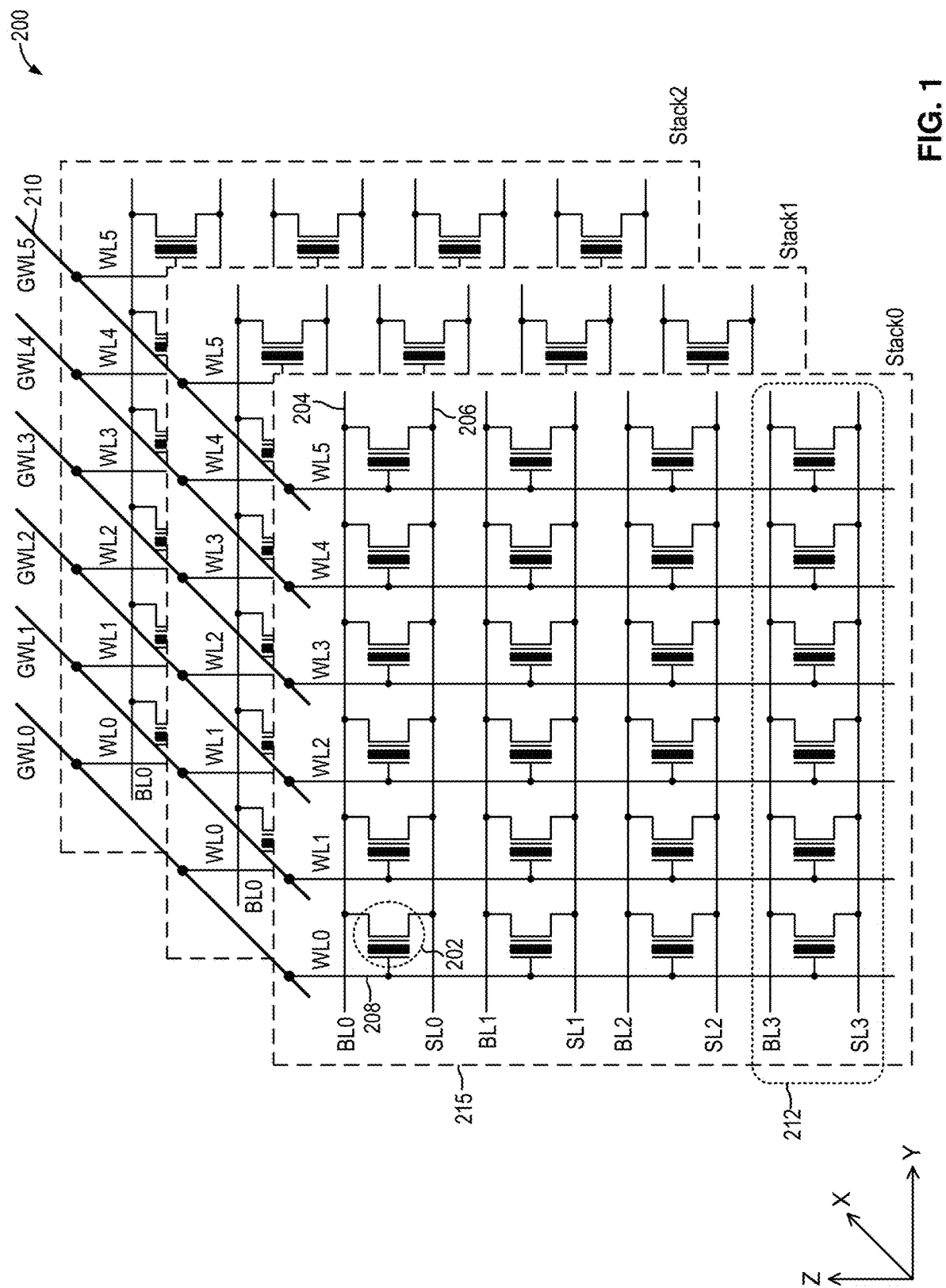
FIG. 1 is a schematic diagram of a memory device including a three-dimensional array of NOR memory strings in embodiments of the present invention.

In embodiments of the present disclosure, a semiconductor memory device including three-dimensional arrays of NOR memory strings of thin-film ferroelectric memory transistors implements a partial polarization scheme to provide a reference signal for enhanced read operation. In some embodiments, the partial polarization scheme is implemented to provide a reduced memory window in the ferroelectric memory transistors, thereby reducing the electrical stress on the ferroelectric memory transistor, which has the effect of improving erase and write endurance cycling of the transistor. In yet some other embodiments, the partial polarization scheme is implemented to realize multi-bit ferroelectric memory transistors that are configured to store more than one binary memory bit in each ferroelectric memory transistor. That is, using the partial polarization scheme described herein, each ferroelectric memory transistor can be configured to store more than two programmable memory states, resulting in storing 1.5 bits, 2.0 bits or more bits being stored in each memory transistor.

In a first aspect of the present invention, the partial polarization scheme is applied to provide a reference signal, also referred herein as a reference bit line signal or a reference source line signal. The reference signal realizes a third logical state distinguishable from the first and second logical stages in the ferroelectric memory transistor, such as associated with the program and erase states of the ferroelectric memory transistor in normal single-bit memory operations. In some embodiments, the reference bit line signal is generated by partially polarizing the ferroelectric memory transistors (i.e. partially programmed or partially erased) of one or more ferroelectric memory transistors designated as reference memory transistors. The partial polarization can be realized, for example, by modifying the program or erase voltage applied, or modifying the program and erase time duration used, relative to the program and erase voltages or program and erase time duration used for realizing the fully positive and fully negative polarization states in normal single-bit memory operations. In embodiments of the present disclosure, the partial polarization is performed to set a polarization level in the ferroelectric dielectric layer of the ferroelectric memory transistors that is between the polarization levels of the program and erase states of the ferroelectric memory transistors.

As thus configured, the programmable reference memory transistor typically retains its partial polarization state to the extent that the fully programmed and fully erased states of the memory transistors are also retained. To the extent that the program and erase polarization states shift, for example at elevated ambient temperatures, the reference memory transistor will shift correspondingly, thereby allowing the correct program and erase states to be read from the memory array. In all embodiments of the present invention, the ferroelectric reference memory transistor can be refreshed periodically, for example every few minutes or hours, to maintain the reference voltage threshold with respect to the programmed or erased threshold voltages.

It is instructive to note that the partial polarization scheme of the present invention enables any one or more ferroelectric memory transistors in the three-dimensional arrays of NOR memory strings to be designated as one or more reference memory transistors. That is, the reference memory transistors are implemented using the same thin-film ferroelectric memory transistors used for data storage. No additional processing or different materials are needed to provide the reference memory transistors.

According to another aspect of the present invention, a semiconductor memory device including three-dimensional arrays of NOR memory strings of thin-film ferroelectric memory transistors provides a reference signal for read operation by averaging a first signal associated with a program state and a second signal associated with an erased state of the ferroelectric memory transistor. The reference signal has a value distinguishable from the threshold voltages of program and erase states of the ferroelectric memory transistor and can be effectively applied in a read operation to determine the logical state of the ferroelectric memory transistor.

In some embodiments, the reference signal is coupled to a reference sense amplifier to generate a read reference signal, which can be used as a latch signal to latch the data being read out from an active bit line. In one example, during read operation, a memory transistor is selected for access by activating a word line and an active bit line associated with the selected memory transistor. The active bit line is coupled to a sense amplifier to generate a sense amplifier output signal. In one embodiment, the read reference signal, generated from the reference bit line signal, determines the time to latch the sense amplifier output signal where the latched sense amplifier output signal is provided as the read data for the selected memory transistor. In other embodiments, the sense amplifier associated with the active bit line is implemented as a differential sense amplifier and the reference signal is coupled to the differential sense amplifier for use as the sense reference signal for sensing the signal on the active bit line.

In other embodiments, the reference signal is applied in a write operation to set the threshold voltage of the selected memory transistor to a desired voltage value for the respective program or erase state. In some embodiments, the reference signal is applied during a calibration step, such as during the wafer sort process, to set the write conditions for the program state and the erase state. For example, the reference memory transistor is read to obtain the reference signal or the voltage value indicated by the reference signal. To write a selected memory transistor to the program state, the reference signal is applied to set the threshold voltage of the ferroelectric memory transistor to a voltage value greater than the reference signal. To write a selected memory transistor to the erase state, the reference signal is applied to set the threshold voltage of the ferroelectric memory transistor to a voltage value less than the reference signal. In some embodiments, the erase or program operating condition of each memory transistor is set up to closely track their close-proximity reference memory transistor.

In the present description, the terms "semiconductor memory die" or "memory die" or "semiconductor memory device" or "memory device" are used interchangeably to refer to a memory circuit of memory or storage transistors formed above or on a semiconductor substrate. In embodiments of the present disclosure, the semiconductor memory device includes three-dimensional arrays of storage transistors. In some embodiments, the semiconductor memory device is constructed using three-dimensional arrays of NOR memory strings formed over a semiconductor substrate, as described in the aforementioned '553 patent. Furthermore, in other embodiments, the semiconductor memory device is constructed using three-dimensional arrays of NOR memory strings of ferroelectric memory transistors formed over a semiconductor substrate, as described in the aforementioned '320 application. In embodiments of the present invention, the three-dimensional arrays of NOR memory strings of ferroelectric memory transistors can be applied to implement a non-volatile memory device or a quasi-volatile memory device. For example, a quasi-volatile memory has an average retention time of greater than 100 ms, such as about 10 minutes or a few hours, whereas a non-volatile memory device may have a minimum data retention time exceeding days or years. As a quasi-volatile memory, the ferroelectric storage transistor may require refresh from time to time to restore the intended programmed and erased polarization states. For example, the ferroelectric storage transistors may be refreshed every few minutes or hours. In particular, the ferroelectric storage transistors in the present disclosure can form a quasi-volatile memory device where the refresh intervals can be on the order of hours or days, significantly longer than the refresh intervals of DRAMs which require much more frequent refreshes, such as in tens of milli-seconds.

In the present description, a NOR-type memory string includes storage transistors formed above or within a planar surface of a semiconductor substrate that share a common source line and a common drain line, where each storage transistor can be individually addressed and accessed. In some examples, a three-dimensional array can be formed with the NOR memory strings provided on multiple planes (e.g., 8 or 16 planes) above the semiconductor substrate, with the NOR memory strings on each plane arranged in rows. In the present description, the term "memory device" is also sometimes referred to a single memory die or a set of multiple memory dies coupled to a memory controller.

In the present description, the term "storage transistor" is used interchangeably with "memory transistor" to refer to the data storage structure formed in the memory die described herein. In some examples, the semiconductor memory device of the present disclosure including NOR memory strings of randomly accessible storage transistors (or memory transistors) can have applications in computing systems as the main memory where the data storage locations are directly accessible by the processors of the computer systems, for instance, in a role served in the prior art by conventional random-access memories (RAMs), such as dynamic RAMs (DRAMS) and static RAMs (SRAMs). For example, the memory structure of the present disclosure can be applied in computing systems to function as a random-access memory to support the operations of microprocessors, graphical processors and artificial intelligence processors. In other examples, the memory structure of the present disclosure is also applicable to form a storage system, such as a solid-state drive or replacing a hard drive, for providing long term data storage in computing systems.

In embodiments of the present invention, the semiconductor memory device is formed using ferroelectric field-effect transistors as the memory transistors. More specifically, a ferroelectric field-effect transistor (referred herein as "FeFET" or "ferroelectric transistors") is formed by using a polarizable ferroelectric material as the gate dielectric layer between the gate conductor and the channel of a field-effect transistor. The ferroelectric transistor realizes memory function by storing data as polarization states in the ferroelectric gate dielectric layer (also referred to as the "ferroelectric dielectric layer"). In particular, a voltage applied to the gate conductor that is greater than the coercive field of the ferroelectric material induces electrical polarization in the ferroelectric dielectric layer, which polarization can be reversed with application of a voltage in the opposite polarity. In particular, a voltage greater than the coercive field of the ferroelectric material is applied to switch or reverse the polarization of the ferroelectric material. The induced polarization states of the ferroelectric dielectric layer change the threshold voltage of the ferroelectric transistor. The change or shift in the threshold voltage of the ferroelectric transistor due to the different polarization states can be used to represent data in different logical states. For example, two logical states (e.g., "0" and "1") can be represented by the higher and lower threshold voltages of the ferroelectric transistor as a result of two induced electrical polarization states in the ferroelectric dielectric layer. Multiple logical states (e.g. three states for 1.5 logical bits or four states for two logical bits) can be achieved by modulating the electric field to realize additional electrical polarization states (or polarization levels) between the 0 and 1 polarization states. In some cases, the polarization states in-between the 0 and 1 states can be continuous, making the stored data an analog signal.

In actual operation, electric potential differences among the gate, the source and the drain of the ferroelectric transistor are utilized to make the ferroelectric dielectric layer generate electric dipoles in response to the influence of electric fields. In one example, the electric potentials of the source and the drain are fixed and the polarization directions of the electric dipoles vary with the electric potential of the gate. Furthermore, the polarization directions of the electric dipoles directly determine the type of majority carriers in the channel of the ferroelectric transistor. For example, when the electric potential applied to the gate is a positive potential (+V), then the electric dipoles appear with negative poles being closer to the gate and positive poles being closer to the channel. The majority carriers in the channel are electrons because of attraction by the positive poles of the electric dipoles. When the electric potential applied to the gate is a negative potential (−V), then the electric dipoles appear with positive poles being closer to the gate and negative poles being closer to the channel. The majority carriers in the channel are holes because of attraction by the negative poles of the electric dipoles. In the present description, the polarization state of the ferroelectric layer in which the positive poles of the electric dipoles are closer to the channel is referred as the positive polarization state (+P) or the first polarization state. Meanwhile, the polarization state of the ferroelectric layer in which the negative poles of the electric dipoles are closer to the channel is referred as the negative polarization state (−P) or the second polarization state.

In one example, the ferroelectric transistors are n-type transistors. In response to a positive bias voltage being applied to the gate, the majority carriers in the channel are electrons and the threshold voltage of the ferroelectric transistors is lowered. Alternately, in response to a negative bias voltage being applied to the gate, the majority carriers in the channel are holes and the threshold voltage of the ferroelectric transistors is raised. The levels of the threshold voltage of the ferroelectric transistor, corresponding to the polarization states of the ferroelectric dielectric layer, can be used to denote different logical states of a memory cell.

In some embodiments, the ferroelectric dielectric layer is a doped hafnium oxide layer. In some examples, the doped hafnium oxide layer may include one or more of: zirconium-doped hafnium oxide (HZO), silicon-doped hafnium oxide (HSO), aluminum zirconium-doped Hafnium oxide (HfZrAlO), aluminum-doped hafnium oxide ($HfO_2$:Al), lanthanum-doped hafnium oxide ($HfO_2$:La), hafnium zirconium oxynitride (HfZrON), hafnium zirconium aluminum oxide (HfZrAlO) and any hafnium oxide that includes zirconium impurities.

In embodiments of the present invention, the 3-dimensional arrays of NOR memory strings is formed as junctionless ferroelectric memory transistors. That is, the ferroelectric memory transistors do not include p/n junction as the drain or source region in the channel. Instead, the drain and source regions are formed by conductive layers, such as a metal layer, and the semiconductor channel region is formed of an amorphous oxide semiconductor material, such as indium gallium zinc oxide (IGZO). In some examples, the source/drain conductive layers can be formed from a metal layer or a low resistivity metallic conductive material, such as molybdenum (Mo), tungsten (W), tungsten nitride (WN), ruthenium or titanium tungsten alloy (TiW). In some examples, the semiconductor channel region may be formed from other oxide semiconductor materials, such as indium zinc oxide (IZO), indium tungsten oxide (IWO), or indium tin oxide (ITO). The ferroelectric memory transistors include source and drain regions—both formed of a metallic conductive material—in electrical contact with the oxide semiconductor channel region. As thus constructed, the ferroelectric memory transistors are each a junctionless transistor without a p/n junction in the channel and in which the threshold voltage is changed by the polarization of the ferroelectric dielectric layer which in turn modulates the mobile carriers in the oxide semiconductor channel layer. The ferroelectric memory transistors in each NOR memory string are controlled by individual control gate electrodes formed in the local word line structures to allow each memory transistor to be individually addressed and accessed.

In the present description, the term "oxide semiconductor layer" (sometimes also referred to as a "semiconductor oxide layer" or "metal oxide semiconductor layer") as used herein refers to thin film semiconducting materials made from a conductive metal oxide, such as zinc oxide and indium oxide, or any suitable conductive metal oxides with charge-carriers having mobilities that can be modified or modulated using suitable preparation or inclusion of suitable impurities.

In the present description, to facilitate reference to the figures, a Cartesian coordinate reference frame is used, in which the Z-direction is normal to the planar surface of the semiconductor surface and the X-direction and the Y-direction are orthogonal to the Z-direction and to each other, as indicated in the figures. Furthermore, the drawings provided herein are idealized representations to illustrate embodiments of the present disclosure and are not meant to be actual views of any particular component, structure, or device. The drawings are not to scale, and the sizes and relative sizes and dimensions of layers and regions may be exaggerated for clarity. Variations from the shapes of the illustrations are to be expected. For example, a region illustrated as a box shape may typically have rough and/or nonlinear features. Sharp angles that are illustrated may be rounded. Like numerals refer to like components throughout.

FIG. 1 is a schematic diagram of a memory device including a three-dimensional array of NOR memory strings in embodiments of the present invention. Referring to FIG. 1, a memory structure device 200 includes multiple NOR memory strings organized in a three-dimensional array to form a high density memory structure. The three-dimensional array of NOR memory strings is organized as stacks 215 of NOR memory strings 212, with NOR memory strings 212 formed one on top of another in each stack 215 in a first direction (e.g. the Z-direction). In FIG. 1, three memory stacks 215—Stack0, Stack1, Stack2—are shown. The three-dimensional array of NOR memory strings is also organized as rows of NOR memory strings arranged in a second direction (e.g. the X-direction) forming a plane, with the rows of NOR memory strings arranged in one or more parallel planes that extend in the first direction (the Z-direction). Each memory string 212 includes a series of memory transistors 202 organized in a NOR configuration with the memory transistors connected in parallel with each other between a common bit line 204 and a common source line 206. The memory transistors form a horizontal NOR memory string (also referred to as "HNOR memory string") that extends in a third direction (e.g. the Y-direction). In the present embodiment, the memory transistors 202 are thin-film ferroelectric field-effect transistors (referred herein as "ferroelectric memory transistors"). Furthermore, in some embodiments, the memory transistors 202 are junctionless ferroelectric memory transistors formed with an oxide semiconductor channel.

Each ferroelectric memory transistor 202 in a respective memory string includes a drain terminal coupled to a respective bit line BLx (e.g. BL0, BL1, BL2, . . . ) and a source terminal coupled to a respective source line SLx (e.g. SL0, SL1, SL2, . . . ). The ferroelectric memory transistors 202 in a memory string 212 are therefore connected in parallel to a common bit line 204 and a common source line 206, forming the NOR memory string. Each ferroelectric memory transistor 202 in a respective memory string further includes a gate terminal coupled to a respective word line WLx (e.g. WL0, WL1, WL2, . . . ). The ferroelectric memory transistors 202 that are vertically aligned in a memory stack 215 across the several memory strings in the stack are connected to a common word line 208, referred herein as a local word line 208. The local word lines 208 across horizontally aligned memory transistors in the second direction (X-direction) are connected to a common global word line GWLx (e.g. GWL0, GWL1, GWL2, . . . ).

In some embodiments, the common source line 206 is electrically floating (that is, not connected to any electrical potential) and the source voltage is applied from the common bit line using pre-charge transistors (not shown). In other embodiments, the common bit line 204 and the common source line 206 are both electrically biased or driven, through a hardwire connection, by control circuits associated with the memory device 200. Implementing an electrically floating source line has the advantage of eliminating hardwire connections to mitigate the congestion of connector wires that may be needed at the staircase structures (not shown) of the three-dimensional array.

The ferroelectric memory transistors, as described herein, provide high endurance, long data retention, and relatively low voltage operations for both erase (e.g., under 5.0 volts) and program (e.g., under −5.0 volts) operations. By combining the ferroelectric or polarization characteristics with the 3-dimensional organization (e.g., as the thin-film NOR memory strings described herein), the memory device of ferroelectric memory transistors of the present invention achieves the additional benefits of high-density, low-cost memory arrays with the advantages of high-speed, randomly accessed memory circuits with low read latency.

In embodiments of the present invention, the three-dimensional array of NOR memory strings in memory device 200 is formed on a semiconductor substrate. To complete the memory circuit, various types of circuitry are formed in or at the surface of the semiconductor substrate to support the operations of the NOR memory strings formed on the semiconductor substrate. Such circuits are referred to as "circuits under array" ("CuA") and may include digital and analog circuitry such as decoders, drivers, sense amplifiers, sequencers, state machines, logic gates, memory caches, multiplexers, voltage level shifters, voltage sources, latches and registers, and connectors, that execute repetitive local operations such as processing random address and executing activate, erase, program, read, and refresh commands with the memory arrays formed above the semiconductor substrate. In some embodiments, the transistors in the CuA are built using a process optimized for the control circuits, such as an advanced manufacturing process that is optimized for forming low-voltage and faster logic circuits. In some embodiments, the CuA is built using fin field-effect transistors (FinFET) or gate-all-around field-effect transistors (GAAFET) to realize a compact circuit layer and enhanced transistor performance.

In some embodiments, the CuA provides the data path to and from the memory array and further to a memory controller that may be built on the same semiconductor substrate as the CuA. Alternatively, the memory controller may reside on a separate semiconductor substrate, in which case the CuA and the associated data path are electrically connected to the memory controller using various bonding techniques. In some examples, the memory controller includes control circuits for accessing and operating the memory transistors in the memory array connected thereto, performing other memory control functions, such as data routing and error correction, and providing interface functions with systems interacting with the memory array.

In the memory device 200, each memory transistor of a NOR memory string is read, programmed or erased by suitably biasing its associated word line 208 (WLx) and the common bit line 204 (BLy) it shares with other memory transistors in the NOR memory string 212. The memory transistor's associated word line is shared with memory transistors of NOR memory strings on other planes that are aligned with the memory transistor along the first direction (the Z-direction or "vertical direction"). Although not shown in FIG. 1, each word line may also be shared between two memory transistors from neighboring NOR memory strings on the same plane (the X-Y plane). In some embodiments, the common source line is normally electrically floating, that is, not hard-wire connected to any electrical potential. During read, program or erase operation, the common source line of the NOR memory string is typically provided a relatively constant voltage that is maintained either by a voltage source or by the charge in an associated capacitor ("virtual ground"), such as the parasitic capacitance of the common source line. For example, the common source line of the NOR memory string can be biased to a given voltage by a precharge operation where the desired voltage is provided on the common bit line and the common source line is charged to the voltage on the common bit line through one or more precharge transistors. To program or erase a selected memory transistor, for example, a sufficient voltage difference (e.g., 3V for ferroelectric memory transistor) is imposed across the word line and at least the common bit line. To mitigate disturb to a non-selected memory transistor, a predetermine voltage difference that is significantly less than the required voltage to program or erase may be imposed across the non-selected memory transistor's associated word line and its common bit line, so as to inhibit undesired erasing or programming of the non-selected memory transistor. To read a selected memory transistor, a read voltage (e.g. 1V for ferroelectric memory transistor) is applied to the word line and the bit line is biased to a positive voltage (e.g. ~0.05V to ~0.9V) to induce a current flow, if any, between the drain and source terminals of the selected memory transistor. The bit line current is sensed by a sense amplifier through a bit line selector to determine the logical state, or the stored data, of the selected memory transistor.

Figure 2:
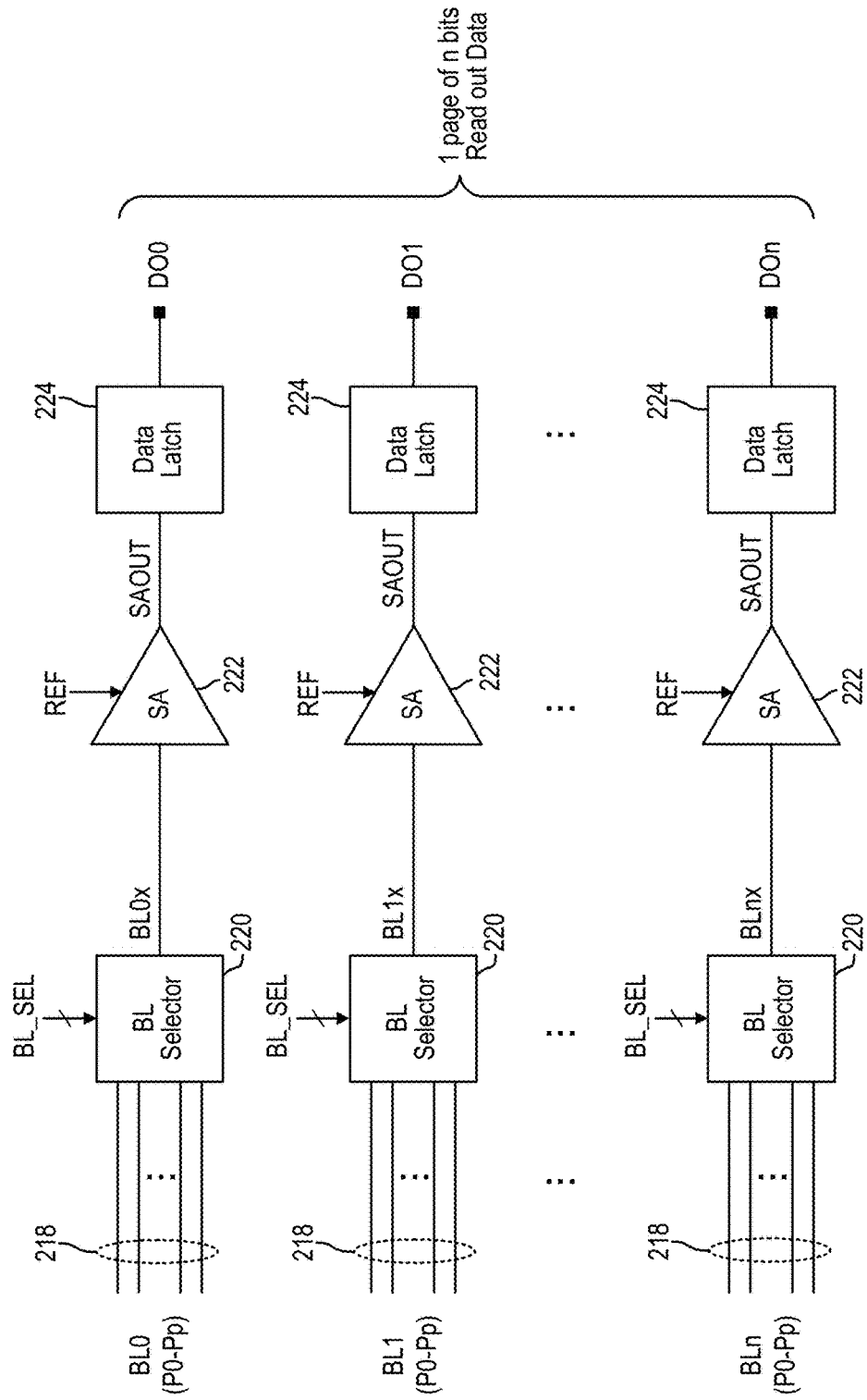
FIG. 2 is a circuit diagram illustrating exemplary support circuits connected to the bit lines of the NOR memory strings of the memory device in FIG. 1 in embodiments of the present disclosure.

FIG. 2 is a circuit diagram illustrating an exemplary support circuits connected to the bit lines of the NOR memory strings of the memory device in FIG. 1 in embodiments of the present disclosure. In particular, FIG. 2 illustrates the sense amplifier circuit and related circuit elements for performing memory read operations. Additional circuit elements and control signals are omitted to simplify the discussion. In the present discussion, a slice in the memory device 200 (FIG. 1) refers to memory transistors in the memory device 200 that are connected to the same global word line GWLx. In other words, a slice in the memory device refers to memory transistors arranged in an X-Z plane of the three-dimensional memory array of FIG. 1. In the present embodiment, each slice of memory transistors is organized into p+1 number of memory pages, each memory page including n+1 number of bits or n+1 number of bit lines. In the present description, each memory access from the host is based on an access unit of memory data, where the access unit is referred to as a page of memory data or a memory page. For example, each slice of memory may include 32 memory pages, each memory page including 512 bits or 512 bit lines. The bit lines in the memory device 200 (FIG. 1) are connected to support circuits for performing memory read operations. For instance, the support circuits are formed in the circuit under array in the semiconductor substrate of the memory device. FIG. 2 illustrates exemplary support circuitry for performing read operations in the memory device. Referring to FIG. 2, the bit lines of the NOR memory strings in the memory array are connected to bit line selectors 220. In particular, each bit line selector 220 is connected to p+1 number of bits lines to select one out of p+1 number of bit lines for sensing at an associated sense amplifier (SA) 222. For instance, each bit line selector 220 receives a select signal BL_SEL to select one bit line (e.g. BLy) out of the p+1 bit lines as the bit line BLyx for sensing by the sense amplifier 222. The select signal BL_SEL may be a multi-bit signal. Each set of bit lines 218 includes bit lines that are associated with the same data bit across the p+1 memory pages. For example, bit lines BL0 is associated with data bit 0 across memory pages P0 to Pp forming a set of bit lines 218. Each set of bit lines 218 is coupled to an associated bit line selector 220 to select one bit line out of the set. The set of n+1 bit line selectors 220, in response to the select signal BL_SEL, therefore selects n+1 number of bit lines BL0x to BLnx for sensing by respective sense amplifiers 222. In one example, a memory page, representing an access unit of memory data, includes 512 bits (or 64 bytes) of memory data, and 512 bit line selectors are provided to select the bit lines BL0x to BLnx of the selected memory page for access. Additional bits of memory data may be included, such as for error correction bits or other management function. A selected global word line activates p+1 number of memory pages (such as 32 memory pages) and the set of bit line selectors at each sense amplifier selects the bit lines associated with the selected memory page for access.

At the output of each bit line selector 220, the selected bit line (BL0x to BLnx) is connected to a respective sense amplifier 222. In a read operation, the sense amplifier 222 senses a voltage signal indicative of the bit line current on the selected bit line to determine a logical state of the selected memory transistor and generates a sense amplifier output SAOUT in response to the sensing. In the present embodiment, each sense amplifier output SAOUT is coupled to a data latch 224. The data latch 224 stores the sense amplifier output SAOUT as read data to be exchanged with the memory controller. The data latch 224 may further be used to store write data received from the memory controller to be written to the selected memory transistor in a memory write operation. The support circuits of the memory device may include additional data latches (not shown) for storing memory data for other operations, for example to store read data locally for refresh operations. It is instructive to note that the circuit configuration shown in FIG. 2 is illustrative only and not intended to be limiting. In other embodiments, the sense amplifier itself may be configured to incorporate data latching capability so that the sense amplifier 222 can itself function as a data latch to store the read data.

In a read operation, the sense amplifier 222 senses the voltage signal on the selected bit line which is indicative of the bit line current associated with the erased or programmed state of the selected memory transistor. The sense amplifier 222 makes the determination of the erased or programmed state of the selected memory transistor using a reference signal REF. The sense amplifier 222 generates the sense amplifier output signal SAOUT having a logical state indicative of the sensed bit line voltage signal. For instance, in response to a read voltage being applied to the selected word line of the selected memory transistor, the erased state of the memory transistor may be associated with a memory transistor in a conductive state and the programmed state of the memory transistor may be associated with a memory transistor in a non-conductive state. In operation, the sense amplifier 222 uses the reference signal REF to distinguish a conductive memory transistor from a non-conductive memory transistor. In a multi-level ferroelectric memory cell, the bit line signal is compared with more than one programmed reference signals REF1, REF2 etc. to determine the stored data value associated with one of the multiple polarization levels.

In one embodiment, the sense amplifier 222 is implemented as a single-ended sense amplifier circuit. In that case, the sense amplifier 222 sense the bit line current of the selected bit line and as the bit line signal develops, the reference signal REF is used to determine the time the sense amplifier output signal should be latched as the valid output signal. In other words, the reference signal REF indicates that time the bit line signal has been sufficiently developed and the reference signal REF triggers the latching of the sense amplifier output signal into the data latch 224. In another embodiment, the sense amplifier 222 is implemented as a differential sense amplifier circuit. In that case, the differential sense amplifier circuit compares the bit line signal of the selected memory transistor with the reference signal REF to trigger the sense amplifier output signal.

Embodiments of the present invention are directed to device structures and methods for providing a reference signal for the memory read operations in a memory device of three-dimensional NOR memory strings of ferroelectric memory transistors. In particular, embodiments of the present invention exploit the ferroelectric polarization characteristics of the ferroelectric memory transistors to generate a reference signal using partial polarization of reference ferroelectric memory transistors. A partial polarization state is realized in one or more reference ferroelectric memory transistors which is distinguishable from the erase state or the program state of the ferroelectric memory transistors. The partial polarization state can be used effectively as a reference signal to discern the erase or program state of a ferroelectric memory transistor. This is made possible due to the observation that electrically programmable partially polarized ferroelectric transistors exhibit steady threshold stability of the partially polarized state which can therefore be employed as a programmable reference memory transistor for long periods of time, even when exposed to elevated temperatures. During memory refresh operations, to correct for any drifting of the programmed reference transistor, the reference memory transistor can itself be refreshed to bring it back to its initial partially polarized/depolarized state.

In embodiments of present invention, the reference signal is generated using one or more ferroelectric memory transistors in the memory array designated as reference memory transistors. In some embodiments, the reference memory transistors are selected to be in close physical proximity to the memory transistors to be accessed in normal memory operations so that the reference memory transistors share the same device variations as the memory transistors. Accordingly, the reference signal tracks variations in the bit line signals of the memory transistors to be accessed, resulting in a highly accurate and reliable reference signal. In embodiments of the present invention, reference memory transistors can be provided in a reference plane, in a reference stack or in a reference slice, as will be described in more detail below.

Figure 3:
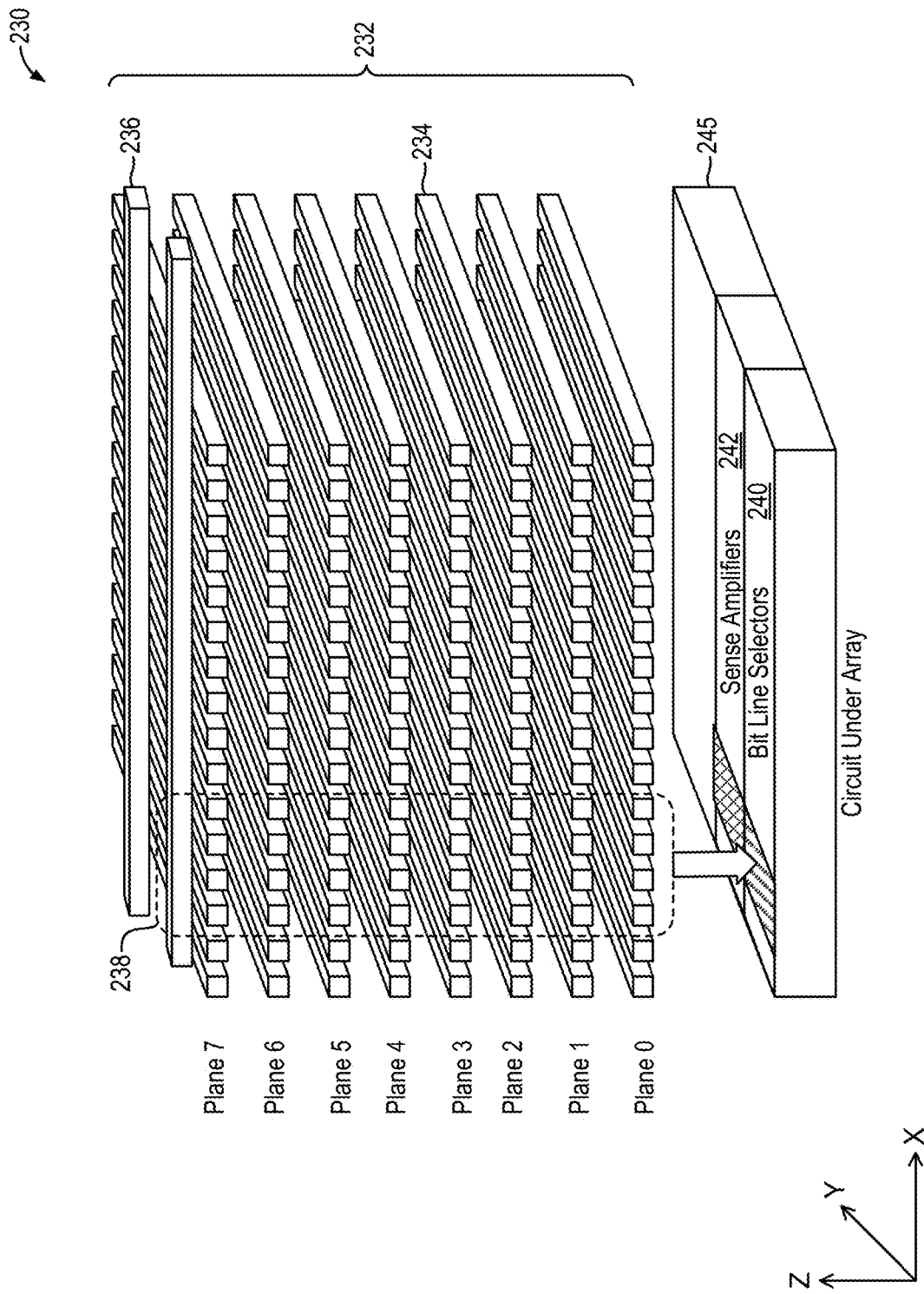
FIG. 3 is a perspective view of a memory device illustrating arrangement of the NOR memory strings in a three-dimensional array in some embodiments.

FIG. 3 is a perspective view of a memory device illustrating arrangement of the NOR memory strings in a three-dimensional array in some embodiments. More specifically, a memory structure 230 in FIG. 3 implements a portion of the memory device 200 of FIG. 1 and illustrates the arrangement of the three-dimensional array 232 of NOR memory strings 234 over a semiconductor substrate 245. In the illustration in FIG. 3, each NOR memory string 234 is represented by a rectangular box with ferroelectric memory transistors arranged in the NOR memory string and bit lines of the NOR memory strings extending in Y-direction. In the present illustration, the three-dimensional array 232 includes NOR memory strings formed in eight planes arranged in the vertical direction (Z-direction). In each plane (Plane 0 to Plane 7), the NOR memory strings 234 are arranged in a row along the X-direction. NOR memory strings 234 that are vertically aligned in the Z-direction across the multiple planes are referred herein as a memory stack. In the present example, each memory stack includes eight memory strings stacked one on top of another along the Y-Z plane. The semiconductor substrate 245 includes logic circuitry for operating the memory transistors, referred to as circuits under array, as described above. For instance, the circuitry under array may include bit line selectors 240 and sense amplifiers 242.

Global word lines 236 are formed above the memory array 232 and extending in a direction traverse to the memory strings 234, that is, in an X-direction. In the present embodiment, local word lines (not shown) connected to respective global word lines are formed in a vertical direction and can be provided between the memory stacks (in a side-wall transistor configuration) or within a memory stack (in a channel-all-around transistor configuration). Along the memory stacks, the local word lines are arranged in the Y-direction to be connected to respective global word lines 236.

In operation, a given global word line 236 is activated to select a section of memory transistors (also referred to as "a slice of memory transistors") that are connected to the local word lines across the planes of memory strings 234 and across all of the memory stacks. As described above, a slice of memory transistors includes p+1 memory pages and each memory operation selects one memory page out of the p+1 pages for access, each memory page representing an access unit of the memory operation. The bit lines BL associated with the selected memory page in the slice of memory transistors are selected to perform the memory operation. In particular, bit lines corresponding to the same data bit in the p+1 memory pages of the slice, such as the set of bit lines denoted by the dotted box 238, are connected to respective bit line selector 240 in the circuit under array formed in the semiconductor substrate 245. The bit line selectors 240 select one bit line out of the p+1 bit lines. For a memory read operation, the selected bit line is provided to a respective sense amplifier 242 for sensing of the bit line current and determination of the logical state of the memory transistor being accessed. For example, a slice of memory transistors may include 32 memory pages. In that case, 32 bit lines in the set 238 are coupled to the respective bit line selector 240 for sensing in a read operation to provide one bit of the read data. Other sets of bit lines corresponding to the remaining n databits are also coupled to their respective bit line selectors and sense amplifiers.

Figure 4:
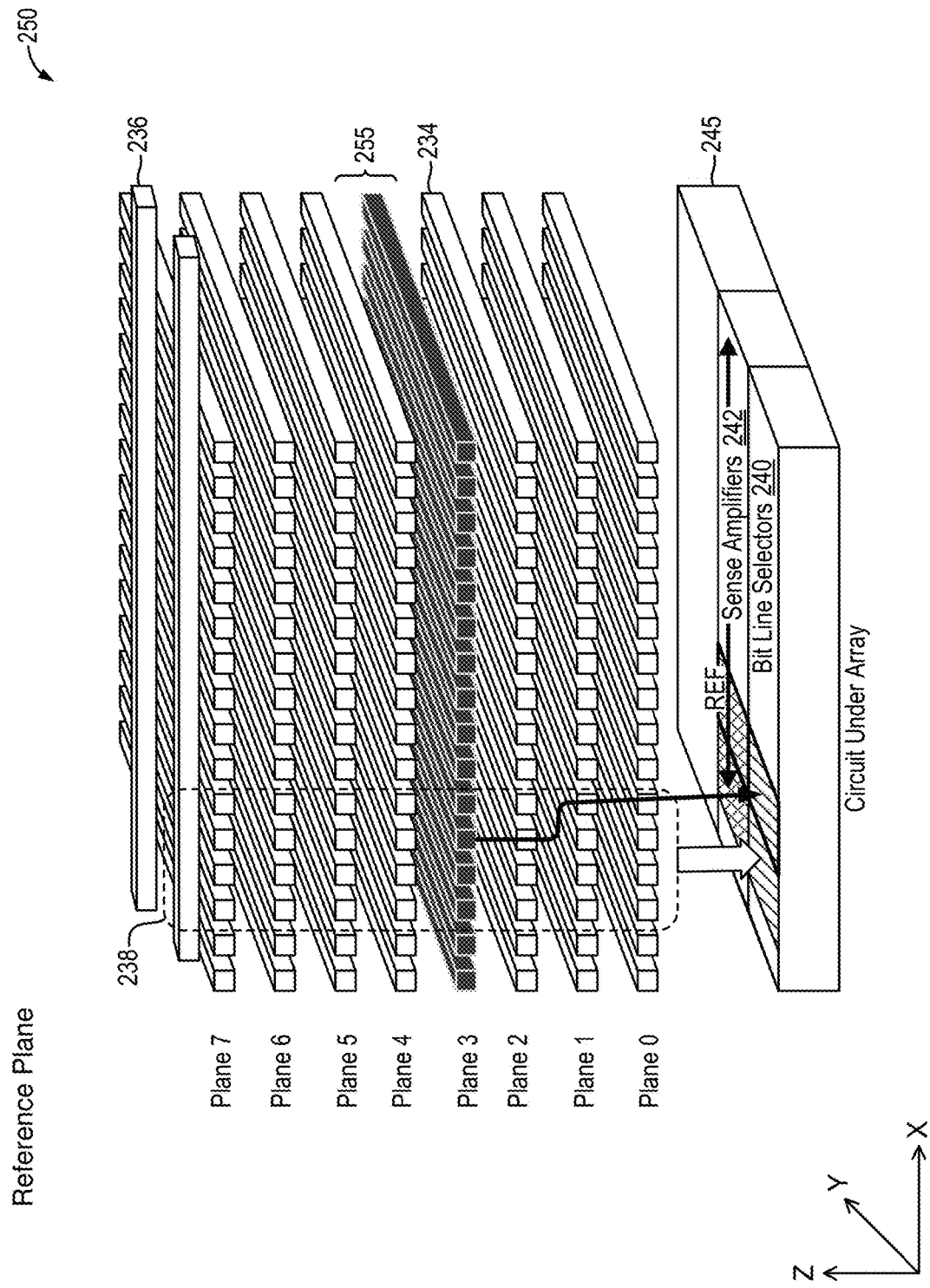
FIG. 4 illustrates a configuration for providing reference memory transistors in a reference plane in some embodiments.
Figure 5:
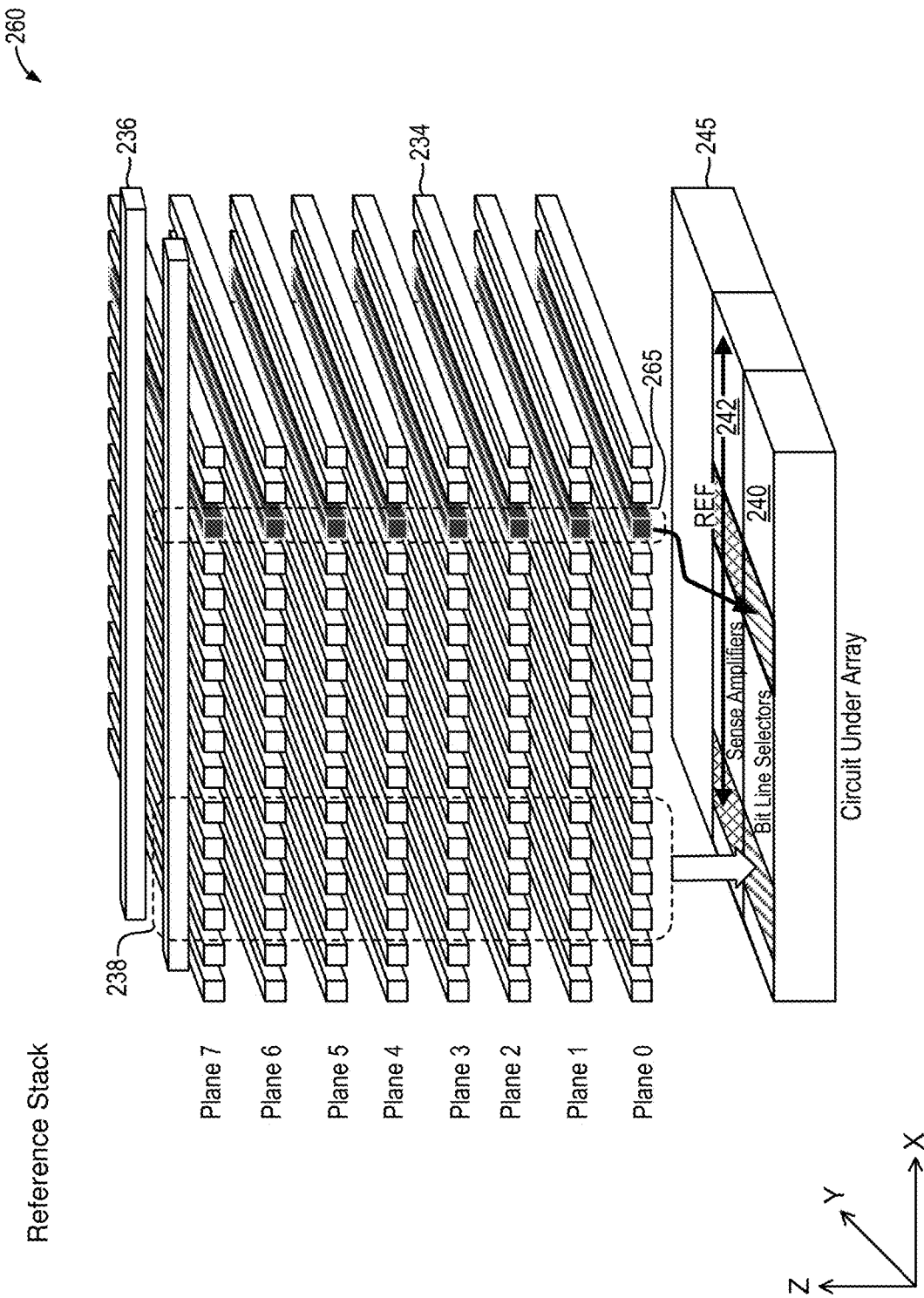
FIG. 5 illustrates a configuration for providing reference memory transistors in a reference stack in some embodiments.
Figure 6:
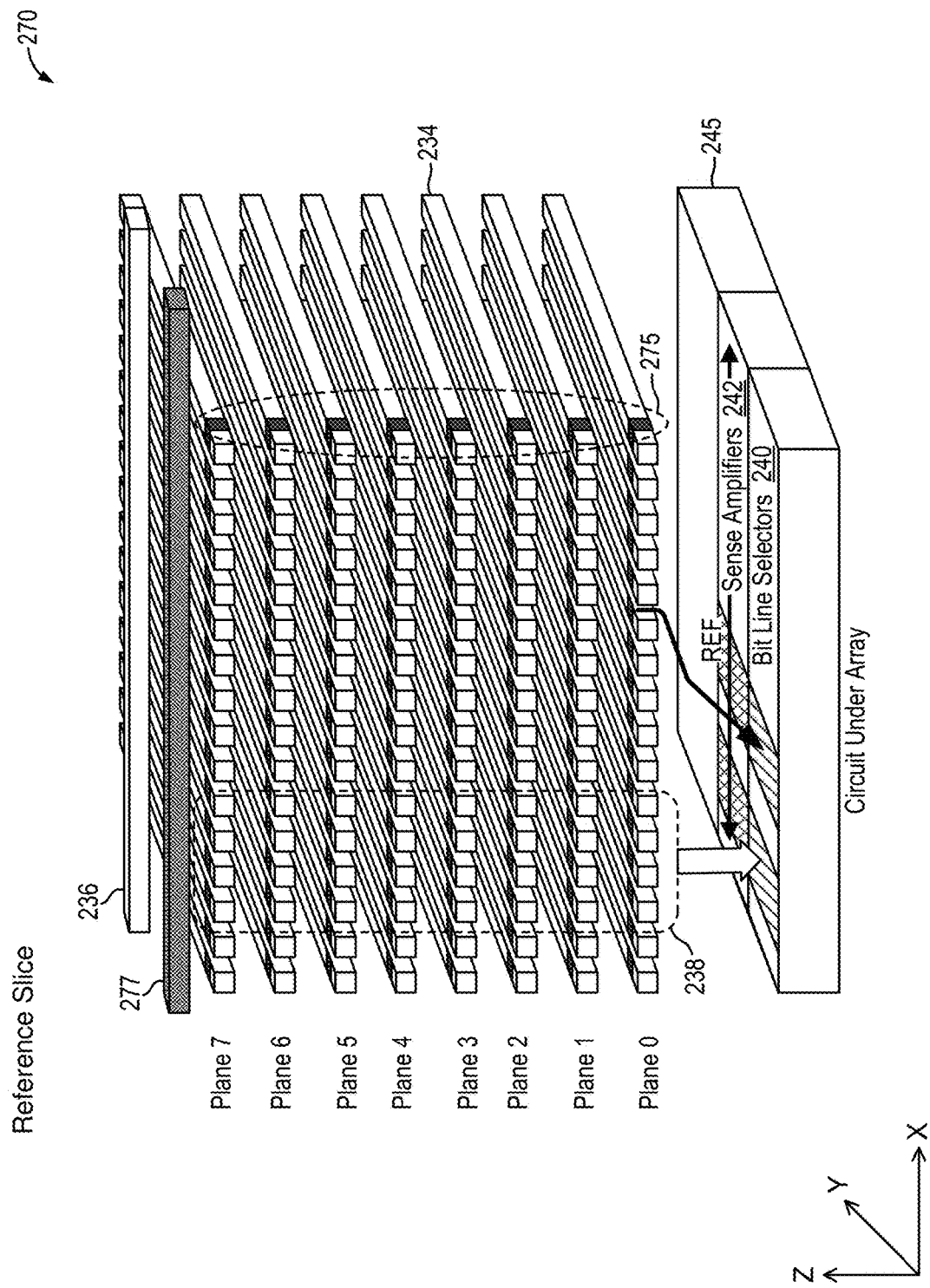
FIG. 6 illustrates a configuration for providing reference memory transistors in a reference slice in some embodiments.

The memory structure 230 in FIG. 3 illustrates a portion of the memory array of NOR memory strings. In some examples, the memory structure 230 in FIG. 3 forms a tile of memory transistors and a memory device is constructed using a two-dimensional array of tiles to realize a high capacity memory device. FIGS. 4-6 illustrate configurations in the memory array for providing a reference signal for memory read operations in embodiments of the present invention. Like elements in FIGS. 3-6 are given like reference numerals and like elements will not be further discussed. For example, FIGS. 4-6 may represent a tile of memory transistors in a memory device of two-dimensional array of tiles.

FIG. 4 illustrates a configuration for providing reference memory transistors in a reference plane in some embodiments. Referring to FIG. 4, a memory structure 250 includes eight memory planes and one of the planes in the memory array is designated as a reference plane 255 where the memory transistors are operated to provide a reference signal for read operations. The reference plane 255 includes some or all of the NOR memory strings that are arranged on the same plane (e.g. Plane 3). In a memory read operation, one bit line from a set of bit lines (denoted by dotted box 238) is selected by the bit line selector 240 for access and the selected bit line is provided to the associated sense amplifier 242. The reference signal generated by one or more reference memory transistors in the reference plane 255 is also provided to the sense amplifier 242 to use in the sensing of the bit line signal of the selected bit line. In some embodiments, the bit lines of the reference memory transistors are connected to one or more dedicated sense amplifiers, referred herein as "reference sense amplifiers," with or without going through a bit line selector. The reference sense amplifier generates the reference signal, such as a reference voltage signal (REF), which is distributed to the sense amplifiers 242 for reading data from the selected memory transistors, such as from the set 238, during the memory read operation.

In some examples, by providing a reference plane of reference memory transistors, a reference signal can be provided from memory transistors that are in the same stack as the selected bit line, reducing the variations in the reference signal relative to the bit line signal and increasing the sensing accuracy. In some embodiments, one or more reference memory transistors in the reference plane 255 within the set 238 are used to provide the reference signal for the data bit being read out of the set 238.

FIG. 5 illustrates a configuration for providing reference memory transistors in a reference stack in some embodiments. Referring to FIG. 5, a memory structure 260 includes multiple memory stacks and one of the stacks in the memory array is assigned as a reference stack 265 where the memory transistors are operated to provide a reference signal for read operations. The reference stack 265 includes the NOR memory strings that are arranged in the same stack across some or all of the memory planes Plane 0 to Plan 7. In a memory read operation, one bit line from a set of bit lines (denoted by dotted box 238) is selected by the bit line selector 240 for access and the selected bit line is provided to the associated sense amplifier 242. The reference signal generated by one or more reference memory transistors in the reference stack 265 is also provided to the sense amplifier 242 to use in the sensing of the bit line signal of the selected bit line. In some embodiments, the bit lines of the reference memory transistors are connected to one or more dedicated sense amplifiers, referred herein as "reference sense amplifiers," with or without going through a bit line selector. The reference sense amplifier generates the reference signal, such as a reference voltage signal (REF), which is coupled to the sense amplifiers 242 for reading data from the selected memory transistors, such as from the set 238, during the memory read operation.

In particular, the reference signal can be sensed periodically and stored at the reference sense amplifier or at a latch coupled to the reference sense amplifier. Alternately, the reference signal can be sensed concurrently with the sensing of the read data during the memory read operation. In some examples, by providing a reference stack of reference memory transistors, a reference signal can be provided from memory transistors that are on the same memory plane as the selected bit line, thereby minimizing signal variations and increasing sensing accuracy. More specifically, in some embodiments, the bit lines of the reference memory transistors in the reference stack 265 are connected to a bit line selector. The bit line selector selects the bit line of the reference memory transistors in the same plane as the memory transistor that is selected for read operation. The selected bit line is then provided to the reference sense amplifier to generate the reference signal. In this manner, the reference signal generated by the selected reference memory transistor has variations that track closely with variations of the bit line signal of the selected memory transistor for memory read operation.

FIG. 6 illustrates a configuration for providing reference memory transistors in a reference slice in some embodiments. Referring to FIG. 6, a memory structure 270 includes memory transistors in multiple memory slices, each memory slice being associated with a global word line. In memory structure 270, one of the memory slices is assigned as a reference slice 275 where the memory transistors are operated to provide a reference signal for read operations. The global word line 277 associated with the reference slice 275 is referred herein as a reference global word line. The reference slice 275 includes reference memory transistors that are arranged across all of the memory stacks and across some or all of the memory planes Plane 0 to Plan 7. In a memory read operation, one bit line from a set of bit lines (denoted by dotted box 238) is selected by the bit line selector 240 for access and the selected bit line is provided to the associated sense amplifier 242. The reference signal generated by one or more reference memory transistors in the reference slice 275 is also provided to the sense amplifier 242 to use in the sensing of the bit line signal of the selected bit line. In some embodiments, the reference memory transistor may be provided on the same memory string as the selected memory transistor being accessed and two read operations are performed in sequence to read out the bit line signal from the selected memory transistor and the reference signal from the reference memory transistor, as will be explained in more detail below.

In other embodiments, the bit lines of the reference memory transistors are connected to one or more dedicated sense amplifiers, referred herein as "reference sense amplifiers," with or without going through a bit line selector. The reference sense amplifier generates the reference signal, such as a reference voltage signal (REF), which is coupled to the sense amplifiers 242 for reading data from the selected memory transistors, such as from the set 238, during the memory read operation.

As thus configured, by providing a reference slice of reference memory transistors, a reference signal can be provided from memory transistors that are on the same memory string as the selected bit line, thereby minimizing signal variations and increasing sensing accuracy.

Figure 7:
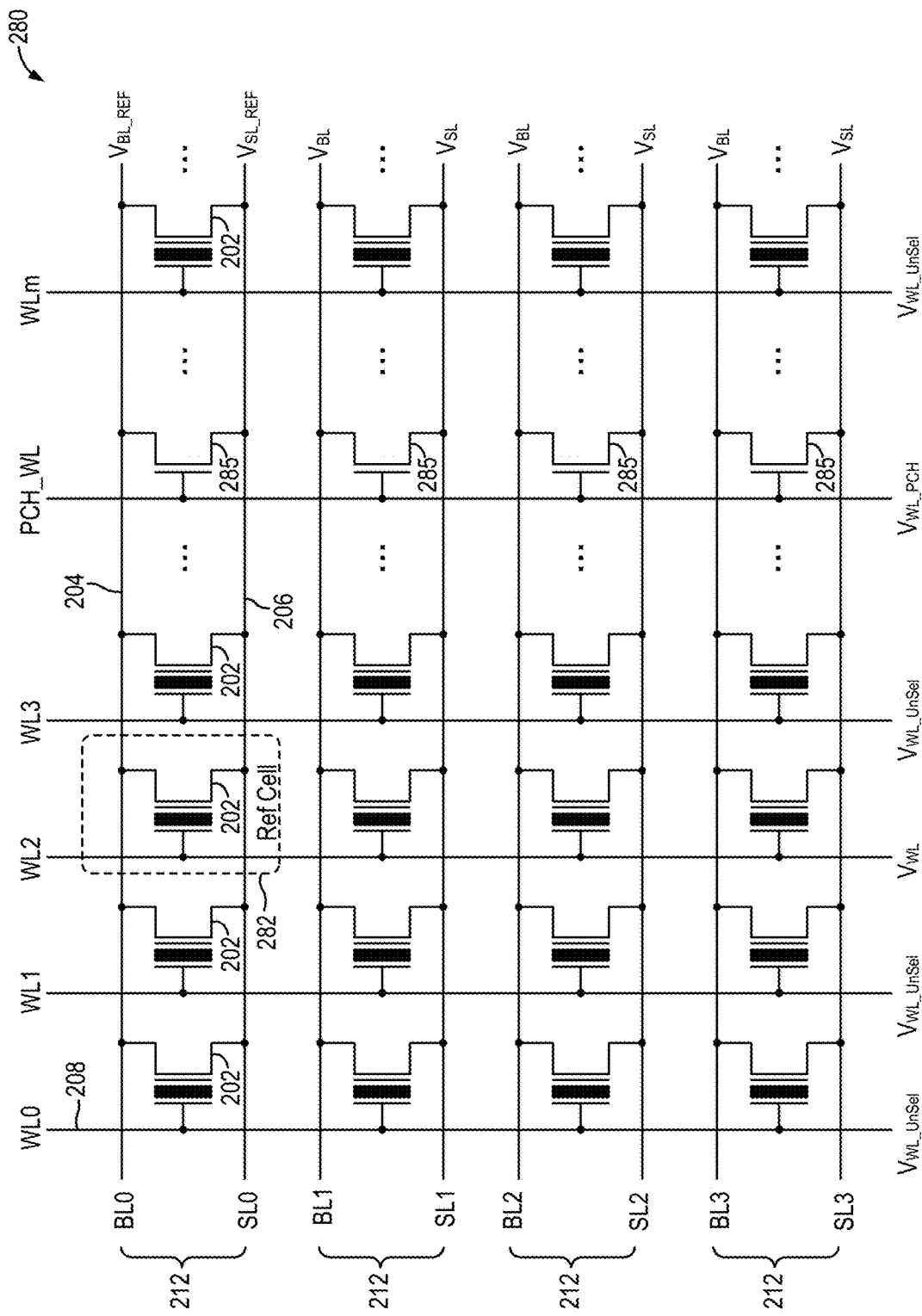
FIG. 7 is a schematic diagram of a memory array including a memory stack of NOR memory strings in embodiments of the present invention.

FIG. 7 is a schematic diagram of a memory array including a memory stack of NOR memory strings in embodiments of the present invention. For instance, a memory array 280 in FIG. 7 implements a portion of the memory device 200 of FIG. 1 and illustrates the arrangement of a stack of NOR memory strings of ferroelectric memory transistors as well as precharge transistors provided on each memory string. Referring to FIG. 7, the memory array 280 includes multiple memory strings 212 formed one on top of another to form a memory stack, each memory string 212 includes a series of memory transistors 202 connected in parallel with each other between a common bit line 204 and a common source line 206. The memory string 212 is sometimes referred to as a NOR memory string as the memory transistors are connected in parallel with each other in a NOR configuration. The NOR memory string 212 of memory transistors forms a basic building block from which a two-dimensional or three-dimensional array of memory transistors can be formed. That is, multiple strings of memory transistors can be used to form a two-dimensional array of memory transistors, such as a plane or a stack of memory transistors. A three-dimensional array of memory transistors can be formed by stacking multiple planes of the two-dimensional array of memory transistors. In the present description, the semiconductor memory device is implemented by an array or arrays of strings of memory transistors and the exact configuration or arrangement of the strings of memory transistors is not critical to the practice of the present invention.

Each memory transistor 202 is a thin-film memory transistor including a drain terminal connected to the bit line 204, a source terminal connected to the source line 206, a gate terminal or control terminal connected to a word line 208 and a data storage film in which data is stored for the memory transistor. In the present embodiment, the data storage film is a ferroelectric dielectric layer provided between the gate conductor layer forming the gate terminal and a channel layer. The drain and source terminals are in electrical contact with the channel layer. In the memory array configuration shown in FIG. 7, the gate terminals of the memory transistors 202 are driven by respective word lines (WLx) 208 where each word line WLx activates one storage transistor 202 in one NOR memory string 212, while simultaneously activating other memory transistors in other NOR memory strings, such as the other NOR memory strings in the same memory stack. As thus configured, when a word line WL is selected, all of the storage transistors 202 that are connected to the same word line (e.g. WLn) are activated. In operation, a selected word line activates p+1 number of memory pages, each memory page including n+1 number of memory transistors associated with n+1 number of NOR memory strings. The bit lines belonging to the selected memory page are selected for memory operation. Accordingly, a memory page is selected by a selected word line and selected bit lines to access n+1 number of storage transistors in the selected memory page.

In embodiments of the present invention, the memory device includes ferroelectric memory transistors (or "memory cells") that can be read, programmed or erased. The program and erase operations are sometimes collectively referred to as a write operation. The memory device implements memory operations including a read operation to read data from the memory transistors and a write operation to write data into the storage transistors. The memory device may implement other operations, such as a refresh operation, which will not be described in the present description. In the present description, the write operation includes two operations or two phases—the erase operation or the erase phase and the program operation or the program phase. In the present embodiment, the erase operation is associated with writing a first logical state (e.g. logical "1") into a memory cell and the program operation is associated with writing a second logical state (e.g. logical "0") into the memory cell. It is instructive to note that the specific logical state assigned to the erase or program operation is arbitrary and not critical to the practice of the present invention. In other embodiments, the erase step can be associated with writing a logical "0" into a memory cell and the program step is associated with writing a logical "1" into the memory cell.

Furthermore, in the present description, the first logical state (e.g. the erase state) is used to identify the first polarization state in the ferroelectric dielectric layer and the second logical state (e.g. program state) is used to identify the second polarization state in the ferroelectric dielectric layer of a ferroelectric memory transistor. For example, the first polarization state can be associated with the positive polarization state having a lower threshold voltage and a conducting memory cell in response to a read voltage applied to the gate terminal of the memory transistor. Meanwhile, the second polarization state can be associated with the negative polarization state having a higher threshold voltage and a non-conducting memory cell in response to the read voltage applied to the gate terminal of the memory transistor. As used herein, the positive (or first) polarization state and the negative (or second) polarization state refers to opposite polarization states in which the electric dipoles in the ferroelectric dielectric layer have opposite polarization directions. For example, the positive polarization state is associated with the erased state and the negative polarization state is associated with the programmed state.

To program or erase the ferroelectric memory transistor, for example, a substantial voltage difference (e.g., 3V for ferroelectric memory transistor) is imposed across the word line and the common bit line as well as the common source line. In one embodiment, to erase the memory cell, a positive voltage is imposed across the word line and the common bit line as well as the common source line. For example, a positive voltage (+3V) is applied to the word line while the common bit line and the common source line are at 0V. On the other hand, to program the memory cell, a negative voltage is imposed across the word line and the common bit line as well as the common source line. For example, the word line is at 0V and a positive voltage (+3V) is applied to the common bit line and the common source line, resulting in −3V being imposed across the word line relative to the common bit line and the common source line. To mitigate disturb to a non-selected memory transistor, a predetermine voltage difference that is significantly less than the required voltage to program or erase may be imposed across the non-selected memory transistor's associated word line and its common bit line/common source line, so as to inhibit undesired erasing or programming of the non-selected memory transistor.

In embodiments of the present invention, both the program and the erase operations can be achieved without the need for positive and negative bias voltages, such as by switching the positive voltage (+3V in this example) between either the word line or the common bit line/source, with 0V applied to the other transistor nodes. The positive voltage application to different transistor nodes is made easier in the present embodiments because the ferroelectric memory transistors are built on three-dimensional stacks that do not all share a common ground in the substrate. Also, not requiring positive and negative voltages on the same die saves fabrication cost and reducing device complexity, for example, eliminating the need to use a triple well process flow typically employed when positive and negative voltages are required to bias the memory transistors.

To read stored data from a selected memory transistor, a read voltage is applied to the selected word line to activate the selected memory transistor and a bit line voltage Vbit is applied to the common bit line. In one example, the read voltage is 1-2V and the voltage Vbit is 0.5V. Then the selected memory transistor is allowed to modulate the common bit line based on the conductive state of the memory transistor. In some embodiments, the bit line voltage is allowed to develop as a result of the logical state of the selected memory transistor and the read out data is latched or recorded after the bit line development period. After the bit line development period, the sense amplifier coupled to the bit line of the selected memory transistor senses the bit line current or voltage as indicative of the stored data.

In some embodiments, the common source line 206 is normally electrically floating, that is, not hard-wire connected to any electrical potential. During read, program or erase operation, the common source line 206 of the NOR memory string is set to a desired voltage value (such as the ground voltage) through a precharge operation using one or more precharge transistors 285 formed along the memory string and the source line is then left electrically floating after the precharge operation. The precharge voltage on the common source line 206 is maintained by the parasitic capacitance of the common source line, also referred to as a "virtual ground" voltage. In particular, the precharge operation sets the common bit line 204 to a desired voltage and then the precharge transistor 285 is momentarily turned on to short the common bit line 204 to the common source line 206 to transfer the bit line voltage to the source line. As a result, the common source line 206 is charged from the voltage on the common bit line 204 to a voltage equal to the bit line voltage. After the precharge operation is complete, the precharge transistor(s) 285 is turned off. The common source line 206 maintains a relatively constant voltage through the parasitic capacitance at the source terminals, such as the parasitic capacitance between the source terminals and the numerous local word line gate terminals of the memory transistors in the NOR memory string 212.

In some embodiments, each memory string 212 includes one or more precharge transistors 285 that are arranged dispersed throughout the memory string. The precharge transistors 285 are connected to a precharge word line PCH_WL which is asserted momentarily to turn on the precharge transistors and electrically short the associated common bit line to the common source line. Once the precharge word line PCH_WL is turned off, another voltage can be applied to the common bit line without disturbing the voltage established on the common source line. In the present embodiment, the precharge word line PCH_WL is asserted to activate the precharge transistors 285 in a memory stack. In embodiments of the present invention, the precharge transistors 285 are preferably non-memory field effect transistors. In alternate embodiments, the common source line 206 is configured with a hard-wire connection to a voltage source to be biased to the desired voltage values for read, program and erase operations. For example, the voltage source for the common source lines can be provided in the circuit under array.

In embodiments of the present invention, one or more ferroelectric memory transistors in the memory device are designated as reference memory transistors for providing a programmable reference signal for read operations. In FIG. 7, a memory transistor 202 in one of the memory string is designated as the reference memory transistor 282 (also referred to as a reference memory cell or reference cell). In practice, multiple memory transistors, such as all the memory transistors in a memory string, are designated as reference memory transistors to improve the quality of the reference signal. In particular, individual reference signals generated by multiple reference memory transistors can be averaged to yield a final reference signal with a desired narrow voltage distribution. In some embodiments, the final reference signal is generated by averaging individual reference signals from, for example, 6, 12 or 18 reference memory transistors.

In one embodiment, a memory string can be designated as a reference string and all the memory transistors in the reference string are used as reference memory transistors for providing the reference signal. For instance, a reference memory transistor 282 connected to word line WL2 can provide the reference signal for the memory transistors 202 in the same memory stack that are connected to the word line WL2. In this manner, local variations are minimized and the reference signal provided by the reference memory transistor 282 can be used to sense more accurately the read out signal from the selected memory transistors that are vertically aligned in the same memory stack. As discussed above, various configurations can be used to provide the reference memory transistors. For example, FIG. 4 illustrates a plane of memory strings being designated as a reference plane of reference memory transistors. In another example, FIG. 5 illustrates a stack of memory strings being designated as a reference stack of reference memory transistors. Finally, in another example, FIG. 6 illustrates a slice of memory transistors being designated as a reference slice of reference memory transistors.

In some embodiments, the reference signal is generated by partially polarizing the reference memory transistors. In the present description, partial polarization refers to biasing the ferroelectric memory transistor to realize a polarization level in the ferroelectric dielectric layer that is between the positive and negative polarization states associated with the respective erased state and programmed state of the ferroelectric memory transistor. As explained above, the positive and negative polarization states in the ferroelectric dielectric layer refer to polarization states with opposite polarization directions of the electric dipoles in the ferroelectric dielectric layer. In the present description, the term "polarization state" is used herein to refer to the polarization direction of the electric dipoles of the ferroelectric dielectric layer, which can be a positive polarization state or a negative polarization state, such as being associated with the erased state or the programmed state of the ferroelectric memory transistor. Furthermore, in the present description, the term "polarization level" refers to different amounts of polarization achieved in the ferroelectric dielectric layer, which is related to different threshold voltage values induced by the polarization. A given polarization level can be associated with the positive or negative polarization state in the ferroelectric dielectric layer. For example, a first polarization level of the negative polarization state can induce a threshold voltage value different from the threshold voltage value induced by a second polarization level of the negative polarization state. In the following description, the terms "polarization state" and "polarization level" are sometimes used interchangeably to refer to the different threshold voltage values induced by the polarization of the ferroelectric dielectric layer where the polarization can be in a positive polarization direction or in a negative polarization direction.

In operation, the polarization states as well as the polarization levels of each polarization state correspond to different threshold voltages in the ferroelectric memory cell. In some embodiments, in an erase operation, a positive bias is applied to the gate terminal of the ferroelectric memory transistor, relative to the drain and source terminals, to induce a positive polarization state in the ferroelectric dielectric layer. As a result, the memory transistor is set to a first threshold voltage (VTH1). Meanwhile, in some embodiments, in a program operation, a negative bias is applied to the gate terminal of the ferroelectric memory transistor, relative to the drain and source terminals, to induce a negative polarization state in the ferroelectric dielectric layer. As a result, the memory transistor is set to a second threshold voltage (VTH2). In the present embodiment, the second threshold voltage VTH2 has a voltage value greater than the first threshold voltage VTH1. In some embodiments, a reference voltage between the first and second threshold voltages is used to read the stored data to discriminate between an erased memory cell that is conducting and a programmed memory cell that is non-conducting.

In embodiments of the present invention, a reference memory transistor is partially polarized in a partial erase or partial program operation to set the threshold voltage of the reference memory transistor to a third threshold voltage value (VTH3) being between the first and second threshold voltage values. In other words, the reference signal generated by the reference memory transistors has a voltage value related to or indicative of the third threshold voltage value (VTH3) being between the first and second threshold voltage values. In one embodiment, the reference memory transistors are half polarized to generate the reference signal having a voltage value (VTH3) being mid-way between the first and second threshold voltage values. That is, the third threshold voltage value VTH3 is halfway between the first and second threshold voltage values, or VTH3=VTH1+(VTH2−VTH1)/2. In other embodiments, the third threshold voltage value (VTH3) may be closer to VTH1 or VTH2 and not necessarily mid-way between the two threshold voltage values.

In embodiments of the present invention, a ferroelectric memory transistor is referred to as being partially polarized when the ferroelectric dielectric layer of the memory transistor has a polarization level that is between the positive polarization state induced by the erase operation and the negative polarization state induced by the program operation. The partial polarization operation is performed to modify the polarization direction of the electric dipoles of the ferroelectric dielectric layer in a manner as to set a polarization level that is between the positive and the negative polarization states. That is, the partially polarized ferroelectric dielectric layer may include electric dipoles in both polarization directions to modulate the mobile carriers in the channel layer, setting the threshold voltage of the partially polarized memory transistor to a voltage level between the positive and negative polarization states.

Figures 8A, 8B:
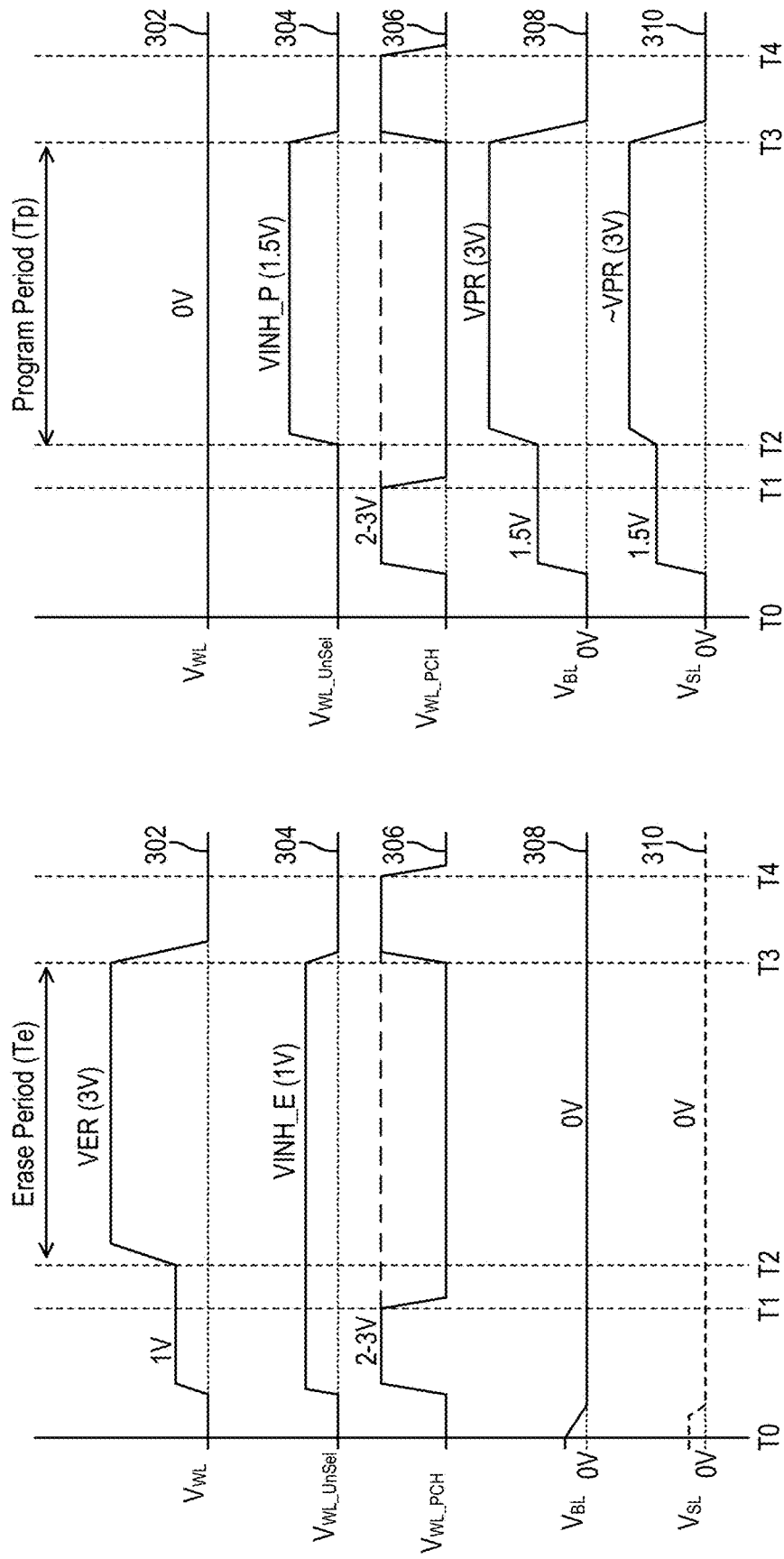
FIGS. 8(a) and 8(b) are timing diagrams illustrating the voltage and timing conditions for performing erase and program operations to realize positive and negative polarization states in the memory transistors of the memory device in embodiments of the present invention.

FIGS. 8(a) and 8(b) are timing diagrams illustrating the voltage and timing conditions for performing erase and program operations to realize the positive and negative polarization states in the memory transistors of the memory device in embodiments of the present invention. In FIGS. 8(a) and 8(b), a curve 302 depicts the word line voltage $V_{WL}$ to be applied to the word line WLx of a selected memory transistor for access, a curve 304 depicts the word line voltage $V_{WL\_UnSel}$ (also referred to as the "inhibit voltage") to be applied to the word lines of unselected memory transistors that share the same common bit line (i.e. on the same memory string) as the selected memory transistor, a curve 306 depicts the word line voltage $V_{WL\_PCH}$ to be applied to the word line of the precharge transistors associated with the selected memory transistor, a curve 308 depicts the bit line voltage of the common bit line associated with the selected memory transistor, and a curve 310 depicts the source line voltage of the common source line associated with the selected memory transistor. Inhibit voltages may also be applied to the unselected bit lines that share the same word line of the selected memory transistor as needed to avoid disturb of the stored data in those memory transistors.

Referring first to FIG. 8(a), to perform an erase operation, the word line voltage of the selected memory transistor is biased to a positive voltage (e.g. 3V) relative to the bit line and the source line voltage. In one example, to perform an erase operation to set the selected memory transistor to the positive polarization state, the selected memory transistor is biased with 3V at the gate terminal (word line) and 0V at the drain terminal (bit line) and the source terminal (source line). The erase operation starts with a set-up period from time T0 to T1 where the word line voltages are set up and the precharge operation is performed. For example, during the set-up period, the word line voltage $V_{WL}$ is first stepped up to an intermediate voltage (e.g. 1V) and the voltage $V_{WL\_UnSel}$ is also raised to the erase inhibit voltage VINH_E (e.g. 1-1.5V). To perform the precharge operation, the word line voltage $V_{WL\_PCH}$ is raised to a voltage value sufficient to turn on the precharge transistors (e.g. 2-3V) and the bit line voltage $V_{BL}$ is set to 0V. The common bit line of the selected memory string is now electrically connected to the common source line through one or more activated precharge transistors. The precharge operation sets the source line voltage $V_{SL}$ to the same voltage as the bit line, i.e. 0V. At time T1, the precharge word line voltage $V_{WL\_PCH}$ can be deasserted, such as to 0V, to turn off the precharge transistors. In the case the common source line is electrically floating, the source line voltage $V_{SL}$ is now held at 0V or at virtual ground by the parasitic capacitance between the common source line and the gate terminals of the memory transistors in the memory strings. In another embodiment, the precharge word line voltage $V_{WL\_PCH}$ is held at the turn-on voltage (2-3V), as shown by the dashed line in curve 306, so that the source line is actively biased to the bit line voltage during the entire erase period.

With the voltages thus set up, the erase period (Te) starts at time T2 with the word line voltage $V_{WL}$ raised to the erase voltage VER (e.g. 3V) and is held at the erase voltage until time T3. With the positive erase voltage being imposed between the gate terminal and the drain and source terminals of the selected memory transistor, the ferroelectric dielectric layer of selected memory transistor is induced to the first polarization state (the positive polarization state) in response to the positive bias being applied and the memory transistor is set to the first threshold voltage value VTH1. At the end of the erase period (time T3), the word line voltages $V_{WL}$ and $V_{WL\_UnSel}$ are brought down to 0V. The precharge word line $V_{WL\_PCH}$ is raised momentarily (from time T3 to T4) to equalize the bit line voltage and the source line voltage. The memory device is then ready for the next memory operation.

Referring first to FIG. 8(b), to perform a program operation, the word line voltage of the selected memory transistor is biased to a negative voltage (e.g. −3V) relative to the bit line and the source line. In one example, to perform a program operation to set the selected memory transistor to the negative polarization state, the selected memory transistor is biased with 0V at the gate terminal (word line) and 3V at the drain terminal (bit line) and the source terminal (source line). In this manner, no negative voltage is needed to perform the program operation. The program operation starts with a set-up period from time T0 to T1 where the precharge operation sets up the bit line voltage and the source line voltage to an intermediate voltage (e.g. 1.5V). That is, the precharge word line voltage $V_{WL\_PCH}$ is asserted (e.g. 2-3V) to turn on the precharge transistors. The bit line voltage VBL is set to the intermediate voltage (e.g. 1.5V) and the source line voltage $V_{SL}$ equalizes to the bit line voltage $V_{BL}$. Then, at time T1, the precharge word line voltage $V_{WL\_PCH}$ can be deasserted, such as to 0V. Alternately, the precharge word line voltage $V_{WL\_PCH}$ can be held at the turn-on voltage (2-3V), as shown by the dashed line in curve 306, so that the source line is actively biased to the bit line voltage during the entire program period.

With the voltages thus set up, the program period (Tp) starts at time T2 with the voltage $V_{WL\_UnSel}$ on the unselected word lines being raised to the program inhibit voltage VINH_P (e.g. 1.5-2V). In the present example, the program inhibit voltage VINH_P is 1.5V. The bit line voltage $V_{BL}$ is raised by the voltage value of the program inhibit voltage VINH_P by virtue of the coupling between the gate terminals of all of the unselected memory transistors and the common bit line in the memory string. As a result, the bit line voltage $V_{BL}$ is increased to the program voltage VPR of 3V, being the sum of the intermediate voltage (1.5V) and the program inhibit voltage VINH_P (1.5V). The source line voltage also increases to the program voltage of 3V, either by virtue of the coupling with the gate terminals of the unselected memory transistors or by being actively biased with the bit line voltage through the precharge transistors.

With the negative program voltage being imposed between the gate terminal and the drain and source terminals of the selected memory transistor, the ferroelectric dielectric layer of selected memory transistor is induced to the second polarization state (the negative polarization state) in response to the negative bias being applied and the memory transistor is set to the second threshold voltage value VTH2. At the end of the program period (time T3), the word line voltages $V_{WL\_UnSel}$ and the precharge word line $V_{WL\_PCH}$ are brought down to 0V. The bit line voltage and the source line voltage are also discharged, such as to 0V. The memory device is then ready for the next memory operation.

In the present illustration, the erase period Te and the program period Tp are both described as being between time T2 and T3. However, the erase period Te and the program period Tp may or may not have the same time duration. The time values T1 to T4 are used to indicate relative time periods only and not intended to indicate exact time durations.

In embodiments of the present invention, a reference signal primarily for read operation is generated by performing partial polarization operations on the reference memory transistors. The partial polarization can be implemented by partially erasing or partially programming the reference memory transistor. Several schemes for partially polarizing the reference memory transistors can be applied. In the following description, for ease of reference, the drain and source terminals of the ferroelectric memory transistors will be referred to as "current terminals" of the transistor. In some embodiments, the ferroelectric memory transistors in the memory device of the present invention have a symmetrical structure where the drain and source terminals are interchangeable in the transistor structure. In the present description, the drain terminal is the first current terminal and is connected to the common bit line and the source terminal is the second current terminal and is connected to the common source line.

In some embodiments, the partial polarization operation is implemented by performing the erase or program operation at only one current terminal (either the drain or source terminal) of the reference ferroelectric memory transistor. The other current terminal is inhibited from being erased or programmed. In the present description, the partial polarization operation is sometimes referred to as a partial erase operation or a partial program operation. In further embodiments, the partial polarization operation is implemented by performing erase or program operation at one current terminal with shortened erase/program duration. In other embodiments, the partial polarization operation is implemented by performing a weak erase operation or a weak program operation at the one current terminal. As a result, the reference ferroelectric memory transistor is erased or programmed to a partial polarization state where the ferroelectric dielectric layer has a polarization level that is between the positive polarization state of the erase operation and the negative polarization state of the program operation. As a result, the reference memory transistor has a third threshold voltage value (VTH3) between the first and second threshold voltage values associated with the positive and negative polarization states.

In another embodiment, the partial polarization operation is implemented by performing a weak erase or a weak program operation at both current terminals (drain and source) of the reference ferroelectric memory transistor.

It is instructive to note that before each partial polarization operation, the reference memory transistor may be pre-conditioned to the opposite polarization state. For example, the reference memory transistor may be first erased in an erase operation and then partially programmed using the partial polarization operation. Alternately, the reference memory transistor may be first programmed in a program operation and then partially erased using the partial polarization operation. Furthermore, it is instructive to note that the partially polarized reference memory transistors may be periodically refreshed to ensure the partial polarization state is maintained. The pre-conditioning or refreshing of the reference memory transistors may be implemented in numerous ways, as is understood by one skilled in the art.

In some embodiments, the reference memory transistors can be partially erased or programmed during the manufacturing process (so called one time programmable) or in the field. In large-scale memory arrays, statistical distributions or manufacturing variations can be expected to impact transistor parameters across long bit lines, long word lines, across each die, across each wafer or across wafer lots, resulting in variable threshold voltages, a range of on/off currents, and sensitivity to temperature variations, etc. In some embodiments, the reference memory transistors are built identical to the memory transistors, and electrically programmed or erased to an intermediate state between the programmed and erased states of the memory transistors. Furthermore, in some embodiments, the reference memory transistors are preferably physically placed as close as possible to the memory transistors. As thus configured, the reference memory transistors track the variations in the memory transistors across fabrication process variations or operating temperature variations. The reference memory transistors in embodiments of the present invention take advantage of the stability of the programmed and erased polarization states of each memory transistor. Such stability translates into relatively long-term retention of their programmed or erased transistor states, typically measured in minutes, hours, days, weeks or longer, even while operating at wide temperature range. In some embodiments, the reference memory transistors of the present invention are periodically refreshed by read followed by erase/program operations as needed to cure any threshold voltage drift that may occur over time.

Figures 9A, 9B:
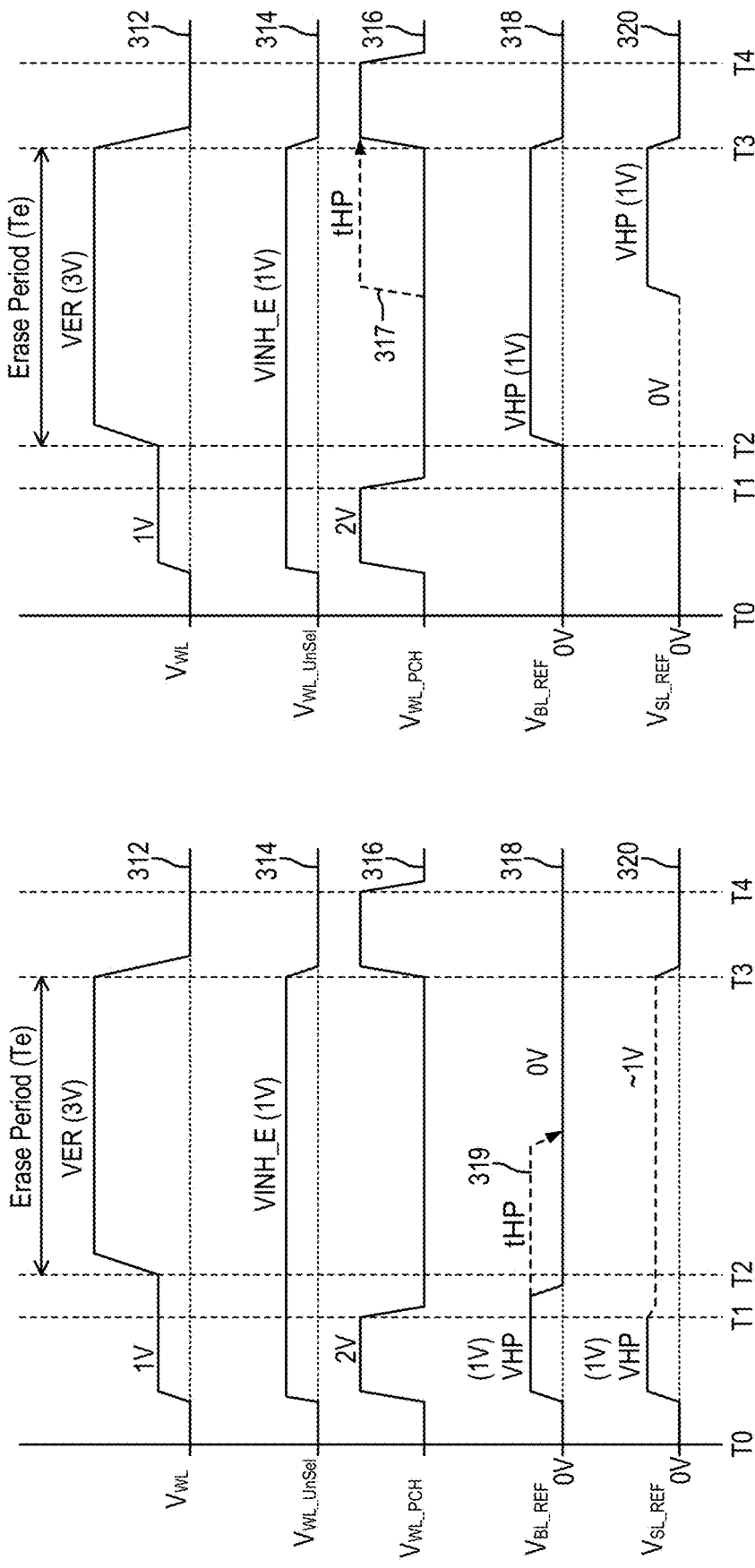
FIGS. 9(a) and 9(b) are timing diagrams illustrating the voltage and timing conditions for performing a partial polarization operation to realize a partial polarization state in a reference memory transistor of the memory device in embodiments of the present invention.

FIGS. 9(a) and 9(b) are timing diagrams illustrating the voltage and timing conditions for performing a partial polarization operation to realize a partial polarization state in a reference memory transistor of the memory device in embodiments of the present invention. In particular, FIGS. 9(a) and 9(b) illustrate the voltage and timing conditions which can be used to perform partial polarization by performing the erase operation at only one current terminal and further by shortening the erase/program duration. In FIGS. 9(a) and 9(b), a curve 312 depicts the word line voltage $V_{WL}$ to be applied to the word line WLx of a selected reference memory transistor for access, a curve 314 depicts the word line voltage $V_{WL\_UnSel}$ (also referred to as the "inhibit voltage") to be applied to the word lines of unselected memory transistors that share the same common bit line (i.e. on the same memory string) as the selected reference memory transistor, a curve 316 depicts the word line voltage $V_{WL\_PCH}$ to be applied to the word line of the precharge transistors associated with the selected reference memory transistor, a curve 318 depicts the bit line voltage of the common bit line associated with the selected memory transistor, and a curve 320 depicts the source line voltage of the common source line associated with the selected memory transistor. Inhibit voltages may also be applied to the unselected bit lines that share the same word line of the selected memory transistor as needed to avoid disturb of the stored data in those memory transistors.

FIG. 9(a) illustrates a partial erase operation by performing an erase operation at the drain terminal (the bit line) of the selected reference memory transistor in some embodiments. Referring to FIG. 9(a), to perform the partial erase operation, the word line voltage of the selected reference memory transistor is biased to a positive voltage (e.g. 3V) relative to the bit line to perform an erase operation at the drain terminal while the source line is biased to a voltage that inhibits the erase operation at the source terminal of the selected reference memory transistor. In one example, the selected reference memory transistor is biased with 3V at the gate terminal (word line) and 0V at the drain terminal (bit line) and 1-1.5V at the source terminal (source line). The partial erase operation starts with a set-up period from time T0 to T1 where the word line voltages are set up and the precharge operation is performed. During the set-up period, the word line voltage $V_{WL}$ is first stepped up to an intermediate voltage (e.g. 1V) and the voltage $V_{WL\_UnSel}$ is also raised to the erase inhibit voltage VINH_E (e.g. 1-1.5V).

To perform the precharge operation, the word line voltage $V_{WL\_PCH}$ is raised to a voltage value sufficient to turn on the precharge transistors (e.g. 2-3V). In the case of the erase operation being performed at the drain terminal, the precharge operation is used to set the source line voltage of the reference memory transistor $V_{SL\_REF}$ to a voltage value VHP that would inhibit erasing, that is, inhibiting setting the ferroelectric dielectric layer to the first polarization state. In the present embodiment, the voltage VHP is 1-1.5V. Accordingly, during the precharge operation, the bit line voltage of the reference memory transistor $V_{BL\_REF}$ is raised to the voltage VHP and with the precharge transistor turned on, the source line voltage $V_{SL\_REF}$ is equalized to the bit line voltage $V_{BL\_REF}$. Accordingly, the source line voltage $V_{SL\_REF}$ is raised to the voltage VHP.

At time T1, the precharge word line voltage $V_{WL\_PCH}$ is deasserted, such as to 0V. The common source line is electrically floating and the source line voltage $V_{SL}$ is held at voltage VHP by the parasitic capacitance between the common source line and the gate terminals of the memory transistors in the memory strings. The source line voltage may droop a little but will by and large be held at the VHP voltage value. After the end of the precharge operation (i.e., after time T1), the bit line voltage $V_{BL\_REF}$ of the reference memory transistor is discharged to 0V or ground.

With the voltages thus set up, the erase period (Te) starts at time T2 with the word line voltage $V_{WL}$ raised to the erase voltage VER (e.g. 3V) and is held at the erase voltage until time T3. The positive erase voltage is imposed between the gate terminal and the drain terminal only of the selected reference memory transistor. Accordingly, the ferroelectric dielectric layer of selected reference memory transistor is partially polarized by being set to the first polarization state near the drain terminal only. The source terminal is inhibited from being erased and the polarization state may remain at the opposite polarization state set by the pre-conditioning, such as the second polarization state. In this manner, the selected reference memory transistor is set to the third threshold voltage value VTH3. At the end of the erase period Te (time T3), the word line voltages $V_{WL}$ and $V_{WL\_UnSel}$ are brought down to 0V. The precharge word line $V_{WL\_PCH}$ is raised momentarily (from time T3 to T4) to equalize the bit line voltage and the source line voltage. As a result, the source line voltage $V_{SL\_REF}$ is brought down to 0V. The memory device is then ready for the next memory operation.

In an alternate embodiment, the partial erase operation is further enhanced by shortening the erase period at the drain terminal (the bit line). In one embodiment, the erase period is shortened by holding the bit line voltage $V_{BL\_REF}$ at the erase inhibit voltage VHP after time T2 for a tHP time duration, as indicated by the dashed line 319 in FIG. 9(a). By holding the bit line voltage $V_{BL\_REF}$ at the VHP voltage for the tHP duration, the drain terminal is inhibited from being erased for the tHP duration. The erase period starts when the bit line voltage $V_{BL\_REF}$ is finally dropped to 0V and lasts until time T3. In other words, the erase period Te, previously between time T2 and T3, is shortened by the time duration tHP. Shortening the erase duration results in partial polarization of the ferroelectric dielectric layer at the drain terminal and ensuring the third threshold voltage value VTH3 of the reference memory transistor is set between the first and second threshold voltage values.

FIG. 9(b) illustrates a partial erase operation by performing an erase operation at the source terminal (the source line) of the selected reference memory transistor in some embodiments. Referring to FIG. 9(b), to perform the partial erase operation, the word line voltage of the selected reference memory transistor is biased to a positive voltage (e.g. 3V) relative to the source line to perform an erase operation at the source terminal while the bit line is biased to the VHP voltage that inhibits the erase operation at the drain terminal of the selected reference memory transistor. In one example, the selected reference memory transistor is biased with 3V at the gate terminal (word line) and 0V at the source terminal (source line) and 1-1.5V at the drain terminal (bit line). The partial erase operation starts with a set-up period from time T0 to T1 where the word line voltages are set up and the precharge operation is performed. During the set-up period, the word line voltage $V_{WL}$ is first stepped up to an intermediate voltage (e.g. 1V) and the voltage $V_{WL\_UnSel}$ is also raised to the erase inhibit voltage VINH_E (e.g. 1-1.5V).

To perform the precharge operation, the word line voltage $V_{WL\_PCH}$ is raised to a voltage value sufficient to turn on the precharge transistors (e.g. 2-3V). In the case of the erase operation being performed at the source terminal, the precharge operation is used to set the source line voltage of the reference memory transistor $V_{SL\_REF}$ to 0V. Accordingly, the bit line of the reference memory transistor is set to 0V and with the precharge transistor turned on, the source line voltage $V_{SL\_REF}$ is equalized to the bit line voltage $V_{BL\_REF}$, i.e. 0V.

At time T1, the precharge word line voltage $V_{WL\_PCH}$ is deasserted, such as to 0V. The common source line is electrically floating and the source line voltage $V_{SL}$ is held at 0V or virtual ground by the parasitic capacitance between the common source line and the gate terminals of the memory transistors in the memory strings. At time T2, the bit line voltage $V_{BL\_REF}$ of the reference memory transistor is raised to the voltage VHP (e.g. 1V) which inhibits erase operation at the drain terminal of the reference memory transistor.

With the voltages thus set up, the erase period (Te) starts at time T2 with the word line voltage $V_{WL}$ raised to the erase voltage VER (e.g. 3V) and is held at the erase voltage until time T3. The positive erase voltage is imposed between the gate terminal and the source terminal only of the selected reference memory transistor. Accordingly, the ferroelectric dielectric layer of selected reference memory transistor is partially polarized by being set to the first polarization state near the source terminal only. The drain terminal is inhibited from being erased and the polarization state may remain at the opposite polarization state set by the pre-conditioning, such as the second polarization state. In this manner, the selected reference memory transistor is set to the third threshold voltage value VTH3. At the end of the erase period Te (time T3), the word line voltages $V_{WL}$ and $V_{WL\_UnSel}$ are brought down to 0V. The bit line voltage $V_{BL\_REF}$ of the reference memory transistor is also brought down to 0V. The precharge word line $V_{WL\_PCH}$ is raised momentarily (from time T3 to T4) to equalize the bit line voltage and the source line voltage. As a result, the source line voltage $V_{SL\_REF}$ is set to 0V. The memory device is then ready for the next memory operation.

In an alternate embodiment, the partial erase operation can be implemented by shortening the erase period at the source terminal (the source line). In one embodiment, the erase period is shortened by asserting the precharge word line $V_{WL\_PCH}$ before time T3 to end the erase period earlier than time T3. For example, the source erase period can be ended earlier by a tHP time duration by asserting the precharge word line $V_{WL\_PCH}$, as shown by the dashed line 317. The precharge transistor is turned on and the source line voltage $V_{SL\_REF}$ of the reference memory transistor is equalized to the bit line voltage $V_{BL\_REF}$ which is set to the erase inhibit voltage VHP. In this manner, the source line voltage $V_{SL\_REF}$ is increased to the VHP voltage and the erase operation at the source terminal is terminated. Shortening the erase duration results in partial polarization of the ferroelectric dielectric layer at the source terminal and ensuring the third threshold voltage value VTH3 of the reference memory transistor is set between the first and second threshold voltage values.

FIGS. 10(a) and 10(b) are timing diagrams illustrating the voltage and timing conditions for performing a partial polarization operation to realize a partial polarization state in a reference memory transistor of the memory device in alternate embodiments of the present invention. Like elements in FIGS. 9(a), 9(b), 10(a) and 10(b) are given like reference numerals and will not be further described. In particular, FIGS. 10(a) and 10(b) illustrate the voltage and timing conditions which can be used to perform partial polarization by performing weak erase operation at only one current terminal of the reference memory transistor. For instance, FIG. 10(a) illustrates a partial erase operation by performing a weak erase operation at the drain terminal (the bit line) of the selected reference memory transistor in some embodiments. The weak erase operation at the drain terminal is implemented in a similar manner to the partial erase operation at the drain terminal as discussed above in FIG. 9(a). Referring to FIG. 10(a), to realize a weak erase operation at the drain terminal, at the end of the precharge period (i.e. after time T1), the bit line voltage $V_{BL\_REF}$ is not brought down to 0V as shown in FIG. 9(a). Rather, as shown in FIG. 10(a), the bit line voltage $V_{BL\_REF}$ is brought down to a weak erase voltage VWER greater than 0V. For example, the weak erase voltage VWER is 0.5V. In this manner, during the erase period, the voltage imposed across the reference memory transistor (between the gate and drain terminals) is not the full erase voltage VER of 3V, but instead the erase voltage is reduced by the weak erase voltage VWER to 2.5V. As thus configured, the amount of polarization of the ferroelectric dielectric layer at the drain terminal is reduced and the reference memory transistor is set to an intermediate threshold voltage VTH3 between the first and second threshold voltage VTH1 and VTH2.

FIG. 10(b) illustrates a partial erase operation by performing a weak erase operation at the source terminal (the source line) of the selected reference memory transistor in some embodiments. The weak erase operation at the source terminal is implemented in a similar manner to the partial erase operation at the source terminal as discussed above in FIG. 9(b). In FIG. 9(b), the bit line voltage $V_{BL\_REF}$ is set to 0V during the precharge period to equalize the source line voltage $V_{SL\_REF}$ to 0V. Referring to FIG. 10(b), to realize a weak erase operation at the source terminal, during the precharge period (between time T0 and T1), the bit line voltage $V_{BL\_REF}$ is set to a weak erase voltage VWER greater than 0V (such as 0.5V). The source line voltage $V_{SL\_REF}$ is equalized to the bit line voltage $V_{BL\_REF}$ at the weak erase voltage (e.g. 0.5V). After the precharge period ends (after time T1), the bit line voltage $V_{BL\_REF}$ is raised to the erase inhibit voltage VHP (e.g. 1V) to prevent erasing at the drain terminal. In this manner, during the erase period, the voltage imposed across the reference memory transistor (between the gate and source terminals) is not the full erase voltage VER of 3V, but instead the erase voltage is reduced by the weak erase voltage VWER to 2.5V. As thus configured, the amount of polarization of the ferroelectric dielectric layer at the source terminal is reduced and the reference memory transistor is set to an intermediate threshold voltage VTH3 between the first and second threshold voltage VTH1 and VTH2.

Figures 11A, 11B:
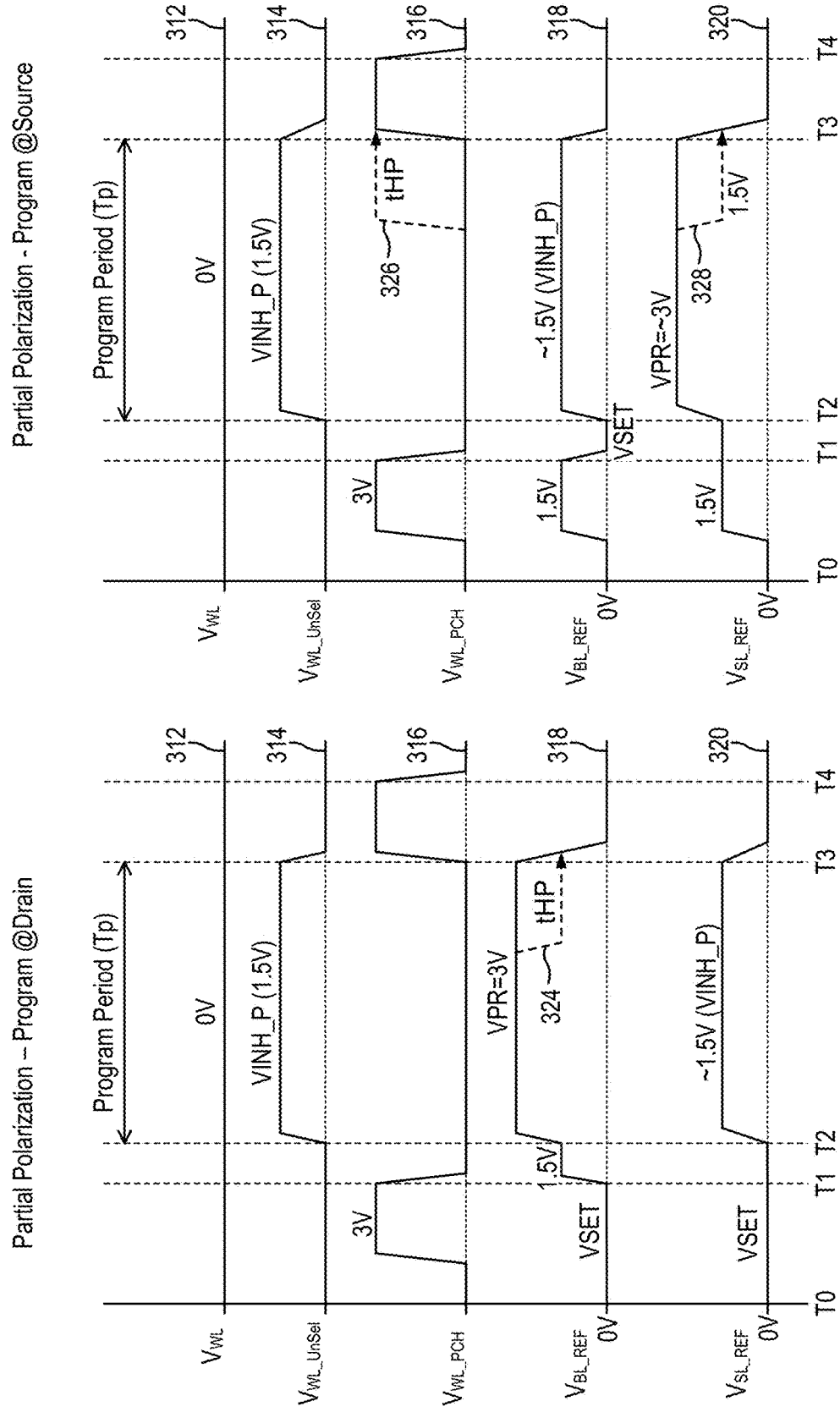
FIGS. 11(a) and 11(b) are timing diagrams illustrating the voltage and timing conditions for performing a partial polarization operation to realize a partial polarization state in a reference memory transistor of the memory device in embodiments of the present invention.

FIGS. 11(a) and 11(b) are timing diagrams illustrating the voltage and timing conditions for performing a partial polarization operation to realize a partial polarization state in a reference memory transistor of the memory device in embodiments of the present invention. Like elements in FIGS. 9(a), 9(b), 11(a) and 11(b) are given like reference numerals and will not be further described. In particular, FIGS. 11(a) and 11(b) illustrate the voltage and timing conditions which can be used to perform partial polarization by performing the program operation at only one current terminal.

FIG. 11(a) illustrates a partial program operation by performing a program operation at the drain terminal (the bit line) of the selected reference memory transistor in some embodiments. Referring to FIG. 11(a), to perform the partial program operation, the word line voltage of the selected reference memory transistor is biased to a negative voltage (e.g. −3V) relative to the bit line to perform a program operation at the drain terminal while the source line is biased to a voltage that inhibits the program operation at the source terminal of the selected reference memory transistor. In one example, the selected reference memory transistor is biased with 0V at the gate terminal (word line) and 3V at the drain terminal (bit line) and 1.5V at the source terminal (source line). The program operation starts with a set-up period from time T0 to T1 where the precharge word line $V_{WL\_PCH}$ is asserted (e.g. 3V) to turn on the precharge transistors to initiate the precharge operation. The precharge operation sets the bit line voltage $V_{BL\_REF}$ to a set voltage VSET lower than the intermediate voltage (e.g. 1.5V) used in the program operation. For example, the voltage VSET can be 0V. The source line voltage $V_{SL\_REF}$ is equalized to the bit line voltage $V_{BL\_REF}$ as a result of the precharge transistors being turned on. Then, at time T1, the precharge word line voltage $V_{WL\_PCH}$ is deasserted, such as to 0V. After the precharge operation has ended, the bit line voltage $V_{BL\_REF}$ is brought up to the intermediate voltage (e.g. 1.5V). The source line voltage $V_{SL\_REF}$ remains at the set voltage VSET (e.g. 0V).

With the voltages thus set up, the program period (Tp) starts at time T2 with the voltage $V_{WL\_UnSel}$ on the unselected word lines being raised to the program inhibit voltage VINH_P (e.g. 1.5-2V). In the present embodiment, the program inhibit voltage VINH_P is set to 1.5V. The bit line voltage $V_{BL\_REF}$ of the reference memory transistor is raised by the voltage value of the program inhibit voltage VINH_P by virtue of the coupling between the gate terminals of all of the unselected memory transistors and the common bit line in the memory string. As a result, the bit line voltage $V_{BL\_REF}$ is increased to the program voltage VPR of 3V, being the sum of the intermediate voltage (1.5V) and the program inhibit voltage VINH_P (1.5V). Meanwhile, the source line voltage increases from the VSET voltage (0V) to the program inhibit voltage VINH_P (e.g. 1.5V), by virtue of the coupling with the gate terminals of the unselected memory transistors. As a result, the source terminal is inhibited from being programmed and programming of the reference memory transistor occurs only at the drain terminal. In this manner, the ferroelectric dielectric layer of selected reference memory transistor is partially polarized by being set to the second polarization state near the drain terminal only. The selected reference memory transistor is thus set to the third threshold voltage value VTH3. At the end of the program period Tp (time T3), the word line voltage $V_{WL\_UnSel}$ and the bit line voltage $V_{BL\_REF}$ are brought down to 0V. The precharge transistor is turned on by asserting the precharge word line $V_{WL\_PCH}$ to equalize the source line voltage $V_{SL\_REF}$ to the bit line voltage $V_{BL\_REF}$. The memory device is then ready for the next memory operation.

In an alternate embodiment, the partial program operation is further enhanced by shortening the program period at the drain terminal (the bit line). In one embodiment, the program period is shortened by lowering the bit line voltage $V_{BL\_REF}$ to the program inhibit voltage VINH_P (1.5V) at a tHP time duration before time T3, as indicated by the dashed line 324 in FIG. 11(a). By lowering the bit line voltage $V_{BL\_REF}$ to the program inhibit voltage for the tHP duration, the drain terminal is inhibited from being programmed for the tHP duration. In other words, the program period Tp, previously between time T2 and T3, is shortened by the time duration tHP. Shortening the program duration results in partial polarization of the ferroelectric dielectric layer at the drain terminal and ensuring the third threshold voltage value VTH3 of the reference memory transistor is set between the first and second threshold voltage values.

FIG. 11(b) illustrates a partial program operation by performing a program operation at the source terminal (the source line) of the selected reference memory transistor in some embodiments. Referring to FIG. 11(b), to perform the partial program operation, the word line voltage of the selected reference memory transistor is biased to a negative voltage (e.g. −3V) relative to the source line to perform a program operation at the source terminal while the bit line is biased to the program inhibit voltage to inhibit the program operation at the drain terminal of the selected reference memory transistor. In one example, the selected reference memory transistor is biased with 0V at the gate terminal (word line) and 3V at the source terminal (source line) and 1.5V at the drain terminal (bit line). The program operation starts with a set-up period from time T0 to T1 where the precharge word line $V_{WL\_PCH}$ is asserted (e.g. 3V) to turn on the precharge transistors to initiate the precharge operation. The precharge operation sets the bit line voltage $V_{BL\_REF}$ to the intermediate voltage (e.g. 1.5V). The source line voltage $V_{SL\_REF}$ is equalized to the bit line voltage $V_{BL\_REF}$ as a result of the precharge transistors being turned on. Then, at time T1, the precharge word line voltage $V_{WL\_PCH}$ is deasserted, such as to 0V. After the precharge operation has ended, the bit line voltage $V_{BL\_REF}$ is brought down to a set voltage VSET (e.g. 0V) lower than the intermediate voltage (1.5V). The source line voltage $V_{SL\_REF}$ remains at the intermediate voltage (e.g. 1.5V).

With the voltages thus set up, the program period (Tp) starts at time T2 with the voltage $V_{WL\_UnSel}$ on the unselected word lines being raised to the program inhibit voltage VINH_P (e.g. 1.5-2V). In the present embodiment, the program inhibit voltage VINH_P is set to 1.5V. The bit line voltage $V_{BL\_REF}$ of the reference memory transistor is raised from the VSET voltage by the voltage value of the program inhibit voltage VINH_P by virtue of the coupling between the gate terminals of all of the unselected memory transistors and the common bit line in the memory string. As a result, the bit line voltage $V_{BL\_REF}$ is increased to the program inhibit voltage VINH_P (e.g. 1.5V). Meanwhile, the source line voltage increases from the intermediate voltage (1.5V) to the program voltage VPR of 3V being the sum of the intermediate voltage (1.5V) and the program inhibit voltage VINH_P (1.5V), by virtue of the coupling with the gate terminals of the unselected memory transistors. As a result, the drain terminal is inhibited from being programmed and programming of the reference memory transistor occurs only at the source terminal. In this manner, the ferroelectric dielectric layer of selected reference memory transistor is partially polarized by being set to the second polarization state near the source terminal only. The selected reference memory transistor is set to the third threshold voltage value VTH3. At the end of the program period Tp (time T3), the word line voltage $V_{WL\_UnSel}$ and the bit line voltage $V_{BL\_REF}$ are brought down to 0V. The precharge transistor is turned on by asserting the precharge word line $V_{WL\_PCH}$ to equalize the source line voltage $V_{SL\_REF}$ to the bit line voltage $V_{BL\_REF}$. The memory device is then ready for the next memory operation.

In an alternate embodiment, the partial program operation is further enhanced by shortening the program period at the source terminal (the source line). In one embodiment, the program period is shortened by asserting the precharge word line voltage $V_{WL\_PCH}$ (e.g. 3V) at a tHP time duration before time T3, as indicated by the dashed line 326 in FIG. 11(b). As a result, the precharge transistors are turned on and the source line voltage $V_{SL\_REF}$ is equalized to the bit line voltage $V_{BL\_REF}$, which is at the program inhibit voltage of 1.5V. As a result, the source line voltage $V_{SL\_REF}$ is lowered to the program inhibit voltage of 1.5V, as indicated by the dashed line 328 in FIG. 11(b). By lowering the source line voltage $V_{SL\_REF}$ to the program inhibit voltage for the tHP duration, the source terminal is inhibited from being programmed for the tHP duration. In other words, the program period Tp, previously between time T2 and T3, is shortened by the time duration tHP. Shortening the program duration results in partial polarization of the ferroelectric dielectric layer at the source terminal and ensuring the third threshold voltage value VTH3 of the reference memory transistor is set between the first and second threshold voltage values.

Figures 12A, 12B:
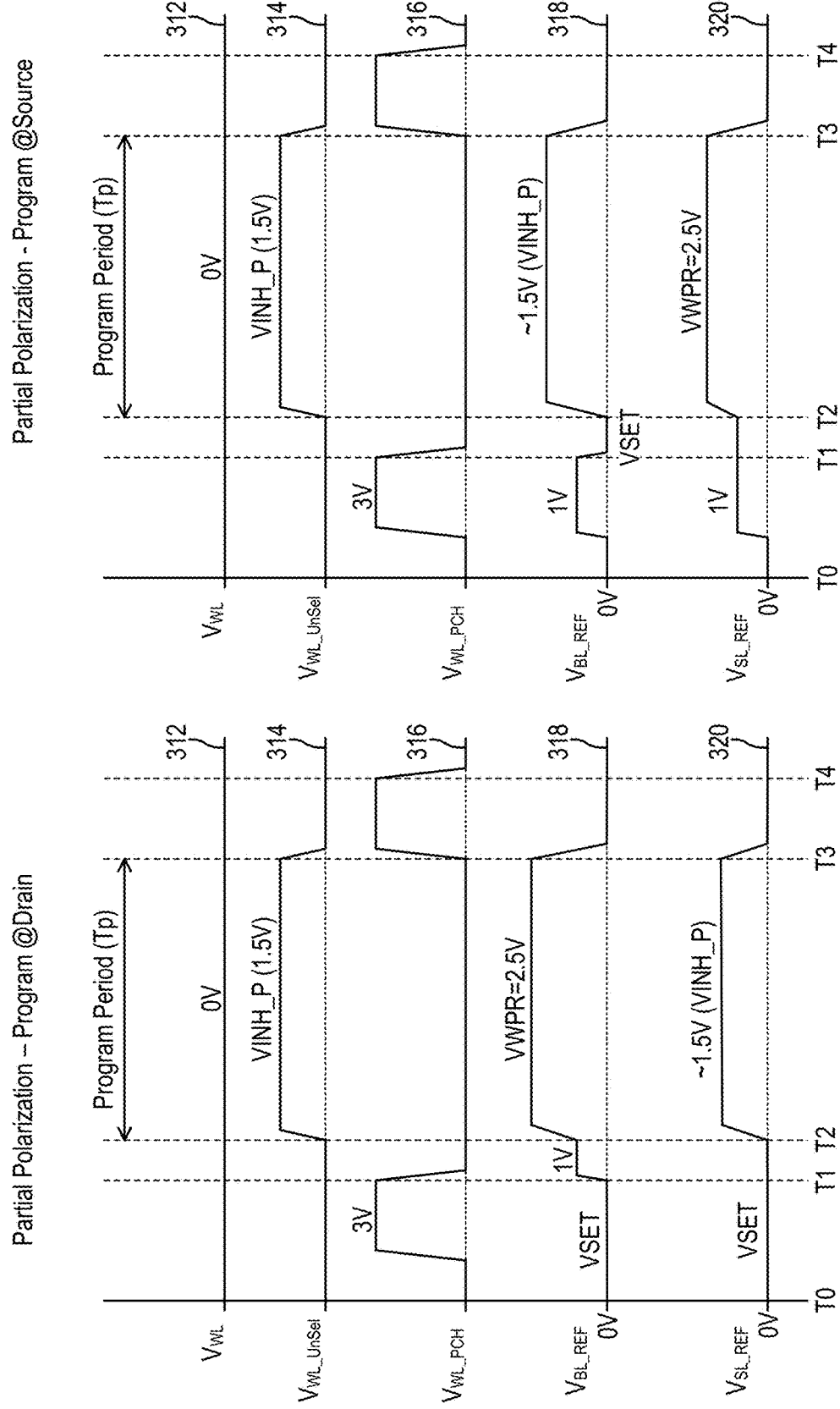
FIGS. 12(a) and 12(b) are timing diagrams illustrating the voltage and timing conditions for performing a partial polarization operation to realize a partial polarization state in a reference memory transistor of the memory device in alternate embodiments of the present invention.

FIGS. 12(a) and 12(b) are timing diagrams illustrating the voltage and timing conditions for performing a partial polarization operation to realize a partial polarization state in a reference memory transistor of the memory device in alternate embodiments of the present invention. Like elements in FIGS. 9(a), 9(b), 12(a) and 12(b) are given like reference numerals and will not be further described. In particular, FIGS. 12(a) and 12(b) illustrate the voltage and timing conditions which can be used to perform partial polarization by performing weak program operation at only one current terminal of the reference memory transistor. For instance, FIG. 12(a) illustrates a partial program operation by performing a weak program operation at the drain terminal (the bit line) of the selected reference memory transistor in some embodiments. The weak program operation at the drain terminal is implemented in a similar manner to the partial program operation at the drain terminal as discussed above in FIG. 11(a). Referring to FIG. 12(a), to realize a weak program operation at the drain terminal, at the end of the precharge period (i.e. after time T1), the bit line voltage $V_{BL\_REF}$ is not brought to the intermediate voltage (1.5V) as shown in FIG. 11(a). Rather, as shown in FIG. 12(a), the bit line voltage $V_{BL\_REF}$ is brought to a reduced intermediate voltage (e.g. 1V) less than the intermediate voltage. In this manner, during the program period, the voltage imposed across the reference memory transistor (between the gate and drain terminals) is not the full program voltage VPR of −3V, but instead the program voltage is reduced to a weak program voltage of −2.5V. As thus configured, the amount of polarization of the ferroelectric dielectric layer at the drain terminal is reduced and the reference memory transistor is set to an intermediate threshold voltage VTH3 between the first and second threshold voltage VTH1 and VTH2.

FIG. 12(b) illustrates a partial program operation by performing a weak program operation at the source terminal (the source line) of the selected reference memory transistor in some embodiments. The weak program operation at the source terminal is implemented in a similar manner to the partial program operation at the source terminal as discussed above in FIG. 11(b). In FIG. 11(b), the bit line voltage $V_{BL\_REF}$ is set to the intermediate voltage of 1.5V during the precharge period to equalize the source line voltage $V_{SL\_REF}$ to 1.5V. Referring to FIG. 12(b), to realize a weak program operation at the source terminal, during the precharge period (between time T0 and T1), the bit line voltage $V_{BL\_REF}$ is set to a reduced intermediate voltage (such as 1V). The source line voltage $V_{SL\_REF}$ is equalized to the bit line voltage $V_{BL\_REF}$ at the reduced intermediate voltage (e.g. 1V). After the precharge period ends (after time T1), the bit line voltage $V_{BL\_REF}$ is lowered to the set voltage VSET (e.g. 0V). In this manner, during the program period, the voltage imposed across the reference memory transistor (between the gate and source terminals) is not the full program voltage VPR of −3V, but instead the program voltage is reduced to the weak program voltage VWPR to −2.5V. As thus configured, the amount of polarization of the ferroelectric dielectric layer at the source terminal is reduced and the reference memory transistor is set to an intermediate threshold voltage VTH3 between the first and second threshold voltage VTH1 and VTH2.

Figures 13A, 13B:
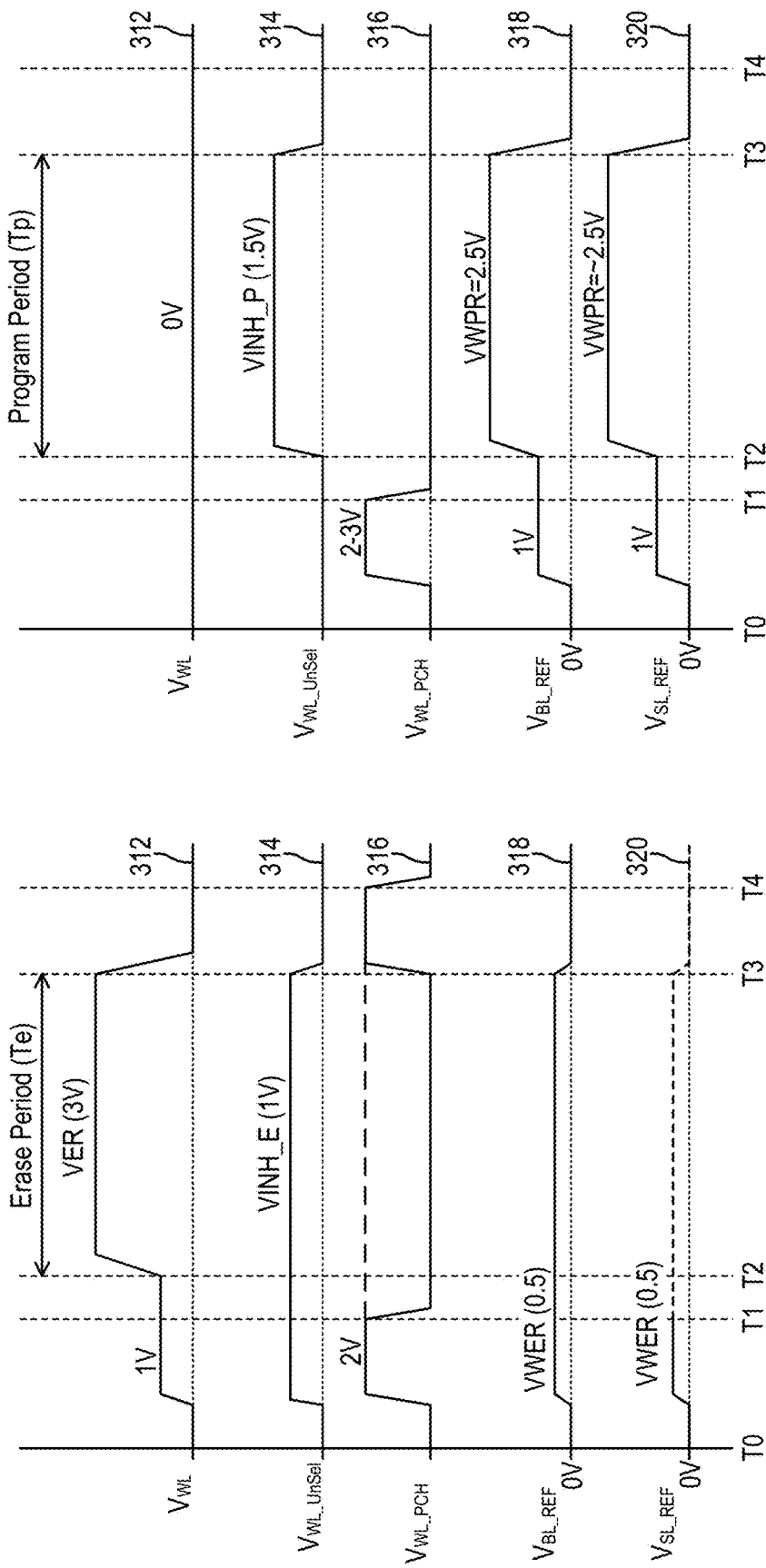
FIGS. 13(a) and 13(b) are timing diagrams illustrating the voltage and timing conditions for performing a partial polarization operation to realize a partial polarization state in a reference memory transistor of the memory device in alternate embodiments of the present invention.

FIGS. 13(a) and 13(b) are timing diagrams illustrating the voltage and timing conditions for performing a partial polarization operation to realize a partial polarization state in a reference memory transistor of the memory device in alternate embodiments of the present invention. Like elements in FIGS. 9(a), 9(b), 13(a) and 13(b) are given like reference numerals and will not be further described. In particular, FIGS. 13(a) and 13(b) illustrate the voltage and timing conditions which can be used to perform partial polarization by performing weak erase or weak program operation at both current terminals of the reference memory transistor. For instance, FIG. 13(a) illustrates a partial erase operation by performing a weak erase operation at the drain and source terminals (the bit line and the source line) of the selected reference memory transistor in some embodiments. The weak erase operation at the drain and source terminals is implemented in a similar manner to the partial erase operation at the drain terminal as discussed above in FIG. 9(a) or 10(a). Referring to FIG. 13(a), to realize a weak erase operation at the drain and source terminals, during the precharge period (between time T0 and T1), the bit line voltage $V_{BL\_REF}$ is raised to the weak erase voltage VWER that is less than the erase inhibit voltage VINH_E. For example, the weak erase voltage VWER is 0.5V. The source line voltage $V_{SL\_REF}$ is equalized to the bit line voltage $V_{BL\_REF}$ and is therefore also biased to the weak erase voltage VWER. At the end of the precharge period (i.e. after time T1), the precharge word line voltage $V_{WL\_PCH}$ can be discharged or it can remain asserted (dashed line). During the erase period (time T2 to T3), the voltage imposed across the reference memory transistor (between the gate and drain and source terminals) is not the full erase voltage VER of 3V, but instead the erase voltage is reduced by the weak erase voltage VWER to 2.5V at both the drain and the source terminals. As thus configured, the polarization level of the ferroelectric dielectric layer at the drain and source terminals is lowered and the reference memory transistor is set to an intermediate threshold voltage VTH3 between the first and second threshold voltage VTH1 and VTH2.

FIG. 13(b) illustrates a partial program operation by performing a weak program operation at the drain and source terminals (the bit line and the source line) of the selected reference memory transistor in some embodiments. The weak program operation at the drain and source terminals is implemented in a similar manner to the partial program operation at the source terminal as discussed above in FIG. 12(b). Referring to FIG. 13(b), to realize a weak program operation at the drain and source terminals, during the precharge period (between time T0 and T1), the bit line voltage $V_{BL\_REF}$ is set to a reduced intermediate voltage (such as 1V). The source line voltage $V_{SL\_REF}$ is equalized to the bit line voltage $V_{BL\_REF}$ at the reduced intermediate voltage (e.g. 1V). After the precharge period ends (after time T1), the bit line voltage $V_{BL\_REF}$ is not lowered, as in FIG. 12(b). Instead, at the start of the program period (at time T2), the voltage $V_{WL\_UnSel}$ on the unselected word lines is raised to the program inhibit voltage VINH_P (e.g. 1.5V) and both the bit line voltage $V_{BL\_REF}$ and the source line voltage $V_{SL\_REF}$ are raised from the reduced intermediate voltage to the weak program voltage (e.g. 2.5V), being the sum of the reduced intermediate voltage and the program inhibit voltage VINH_P, by virtue of the coupling between the bit line and the source line and the gate terminals of all of the unselected memory transistors in the memory string.

In this manner, during the program period, the voltage imposed across the reference memory transistor (between the gate and the drain and source terminals) is not the full program voltage VPR of −3V, but instead the program voltage is reduced by the weak program voltage VWPR to −2.5V. As thus configured, the amount of polarization of the ferroelectric dielectric layer at the drain and source terminals is reduced and the reference memory transistor is set to an intermediate threshold voltage VTH3 between the first and second threshold voltage VTH1 and VTH2.

Figure 14:
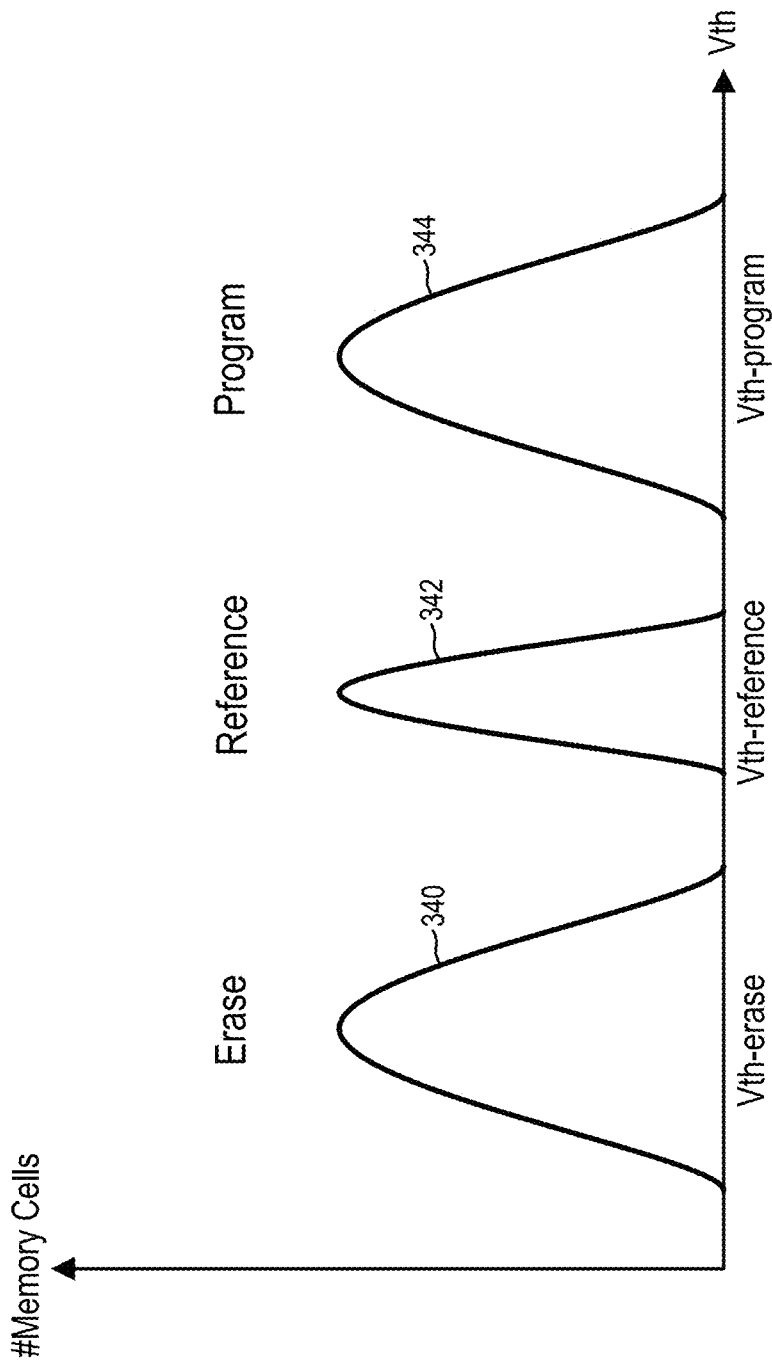
FIG. 14 depicts an exemplary threshold voltage distribution in a memory device illustrating three polarization states in some embodiments.

In embodiments of the present invention, the memory device uses the partial polarization operations described above to set one or more reference memory transistors to a partially polarized state with a threshold voltage that is between the threshold voltages of erased and programmed memory transistors. In the present description, the partial polarized state refers to a polarization level of the ferroelectric dielectric layer that is between the positive polarization state associated with the erased state and the negative polarization state associated with the programmed state. The partially polarized state of the reference memory transistors is used as a reference signal for reading the stored memory data from the memory transistors. FIG. 14 depicts an exemplary threshold voltage distribution in a memory device illustrating three polarization states in some embodiments. Referring to FIG. 14, a curve 340 represents the distribution of memory cells that have been erased and having threshold voltage values around the erase threshold voltage Vth-erase. A curve 344 represents the distribution of memory cells that have been programmed and having threshold voltage values around the program threshold voltage Vth-program. In particular, the erase threshold voltage Vth-erase and the program threshold voltage Vth-program represent erase and program operations to realize the positive and negative polarization states in the ferroelectric memory transistor. A curve 342 represents the distribution of memory cells that have been partially erased or partially programmed. The partially polarized memory cells have threshold voltage values around the reference threshold voltage Vth-reference. In particular, the partially polarized memory cells have a polarization level in the ferroelectric dielectric layer that is between the positive polarization state and the negative polarization state. By appropriately partially erasing or partially programming the reference memory transistor, a reference threshold voltage can be established with sufficient separation from the erase and program threshold voltages to allow the reference threshold voltage to be used as a reference signal in the read operation to distinguish between the erase state and the program state of the memory transistors.

The partial programming and partial erasing of the memory transistors of the current invention can be used to store more than one binary bit of information per each memory transistor. For example, the intermediate memory states associated with threshold voltages VTH1 (e.g. Vth-erase), VTH2 (e.g. Vth-program), and VTH3 (e.g. Vth-reference) can present 1.5 bits of information, improving the memory density by 50%. This is made possible because of the relative stability of each one of the three polarization states VTH1, VTH2 and VTH3. Similarly, the ferroelectric memory transistor in embodiments of the present invention can store 2.0 bits per transistor or more by adjusting the pulse widths (in time) or pulse magnitudes, so long as all the states lie within the polarization window of the memory transistor. In some embodiments, the ferroelectric memory transistor can be erased or programmed at fine granularity to deliver semi-analog memory storage.

Alternatively, the endurance (maximum number of erase/program operations of each memory transistor), particularly in single-bit ferroelectric memory transistor can be improved by avoiding polarizing and reverse-polarizing of the memory transistor to the full memory window. For example, if the fully polarized memory polarization window spans between 0.0V and 1.0V, then operating the memory transistors at between 0.2V and 0.8V will reduce the polarization stress, thereby extending the transistor endurance and mitigate other ferroelectric adverse conditions, such as memory layer imprint.

Circuits and methods for using the reference signal generated by the partial polarization operation in a read operation will now be described. In particular, the reference signal is used by the sense amplifier circuit of the memory device to distinguish between an erased memory cell and a programmed memory cell.

Figure 15A:
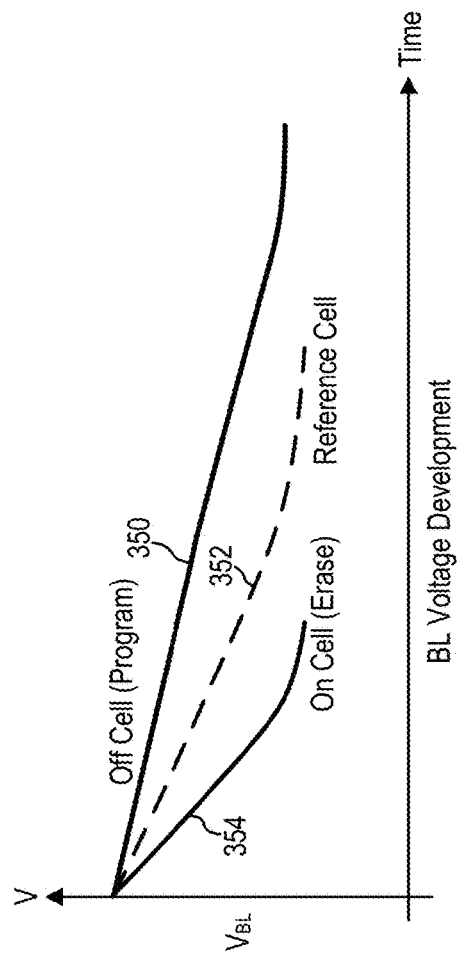
FIG. 15(a) is a plot illustrating the bit line signal development during a read operation in some embodiments.

In a first example embodiment, the memory device uses the reference signal as a timing signal to determine when the sense amplifier circuit should latch the sensed bit line signal as the valid sense amplifier output signal. In embodiments of the present invention, the memory transistors in the memory device is read by applying a read voltage (e.g. 2V) to the word line of the selected memory transistor and the common bit line is charged up to a given voltage Vbit (e.g. 0.5V). Then the selected memory transistor is allowed to modulate the common bit line based on the conductive state of the memory transistor. The bit line signal develops on the common bit line which is sensed by the associated sense amplifier as the read out data. FIG. 15(*a*) is a plot illustrating the bit line signal development during a read operation in some embodiments. Referring to FIG. 15(*a*), a curve 350 depicts the bit line signal associated with a programmed memory cell, which has a higher threshold voltage and should be non-conducting in response to the read voltage applied to the gate terminal. In the present description, the programmed memory cell is also referred to as an "Off Cell" to indicate that the memory cell is non-conducting in response to the read voltage being applied to the gate terminal. In the ideal case, the bit line signal for the Off Cell should be at a constant voltage level of Vbit as the memory cell is non-conducting. However, in actual practice, the bit line signal of the Off Cell will decrease over time due to leakage current, as shown by curve 350 in FIG. 15(*a*).

In FIG. 15(*a*), a curve 354 depicts the bit line signal associated with an erased memory cell, which as a lower threshold voltage and should be conducting in response to the read voltage applied to the gate terminal. In the present description, the erased memory cell is also referred to as an "On Cell" to indicate that the memory cell is conducting in response to the read voltage being applied to the gate terminal. With the read voltage being applied to the gate terminal, the conducting On Cell discharges the bit line and the bit line signal of the On Cell decreases at a first rate over time, as shown by curve 354 in FIG. 15(*a*). Over a given signal development time period, a voltage difference is developed between the erased memory cell (On Cell) and the programmed memory cell (Off Cell).

FIG. 15(*a*) further illustrates a bit line signal (curve 352) from a reference memory transistor (Reference Cell) that has been partially erased or partially programmed using one or more of the partial polarization operations described above. The bit line signal of the Reference Cell has a threshold voltage that is between the erased and programmed memory cells in response to the read voltage applied to the gate terminal. With the read voltage being applied to the gate terminal, the Reference Cell discharges the bit line and the bit line signal of the Reference Cell decreases at a second rate over time, as shown by curve 352 in FIG. 15(*a*). In particular, the bit line signal of the Reference Cell decreases at a rate slower than the bit line signal of the On Cell and faster than the bit line signal of the Off Cell. As a result, over a given signal development time period, the bit line signal of the Reference Cell has a signal value between bit line signals of the erased memory cell and the programmed memory cell and can be used as a reference signal to distinguish between the erased or programmed state of the memory cell.

FIG. 15(*b*) is a plot illustrating sense amplifier operation using the reference signal of a reference cell for determining the latch time of the sense amplifier output signal in some embodiments. Referring to FIG. 15(*b*), during the sensing phase of the read operation, the sense amplifier input node senses the bit line signal and the sense amplifier output signal (SAOUT) changes logical state or flips when the bit line signal reaches a given sensing threshold. For an erased memory cell that is conducting bit line current, the sense amplifier output signal SAOUT_ON (curve 364) will change state earlier in time as compared to a programmed memory cell that is not conducting. The sense amplifier output signal SAOUT_OFF (curve 360) of a programmed cell will eventually change state due to the leakage current discharging the bit line signal.

Figure 15B:
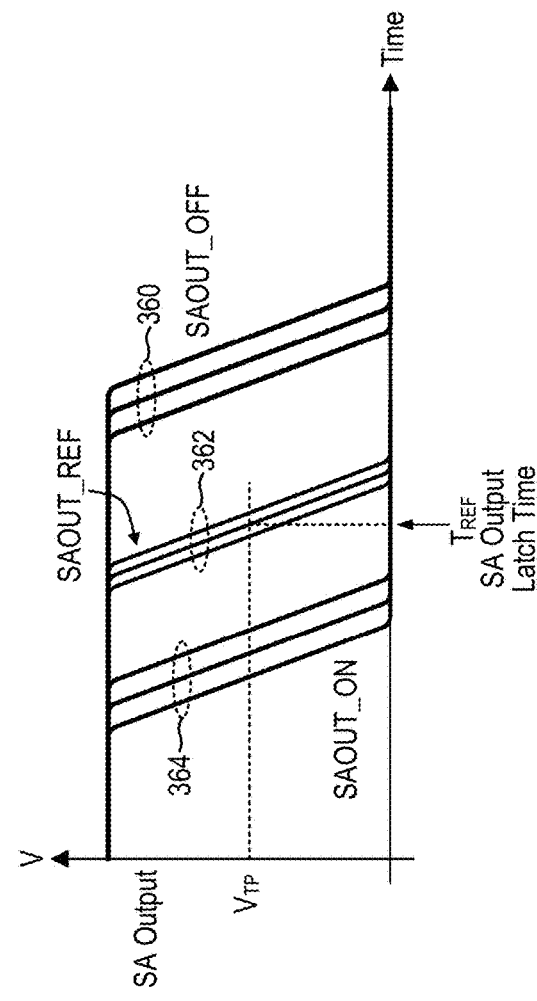
FIG. 15(b) is a plot illustrating sense amplifier operation using the reference signal of a reference cell for determining the latch time of the sense amplifier output signal in some embodiments.

FIG. 15(b) further illustrates the sense amplifier output signal SAOUT_REF (curve 362) of the reference cell. The reference cell, being partially polarized, discharges the bit line at a slower rate than the erased cell. Therefore, the sense amplifier output signal SAOUT_REF will change state later than the signal SAOUT_ON but before the signal SAOUT_OFF. In embodiments of the present invention, the logical state of the sense amplifier output signal SAOUT_REF is used as a reference signal to latch the sense amplifier output for the memory cells. In other words, in response to the sense amplifier output signal SAOUT_REF changing logical state, the sense amplifier circuit of the memory device latches the logical value of the memory cell being read. An erased memory cell would have a sense amplifier output signal that has changed state but a programmed memory cell would have a sense amplifier output signal that has not yet changed state.

Figure 16:
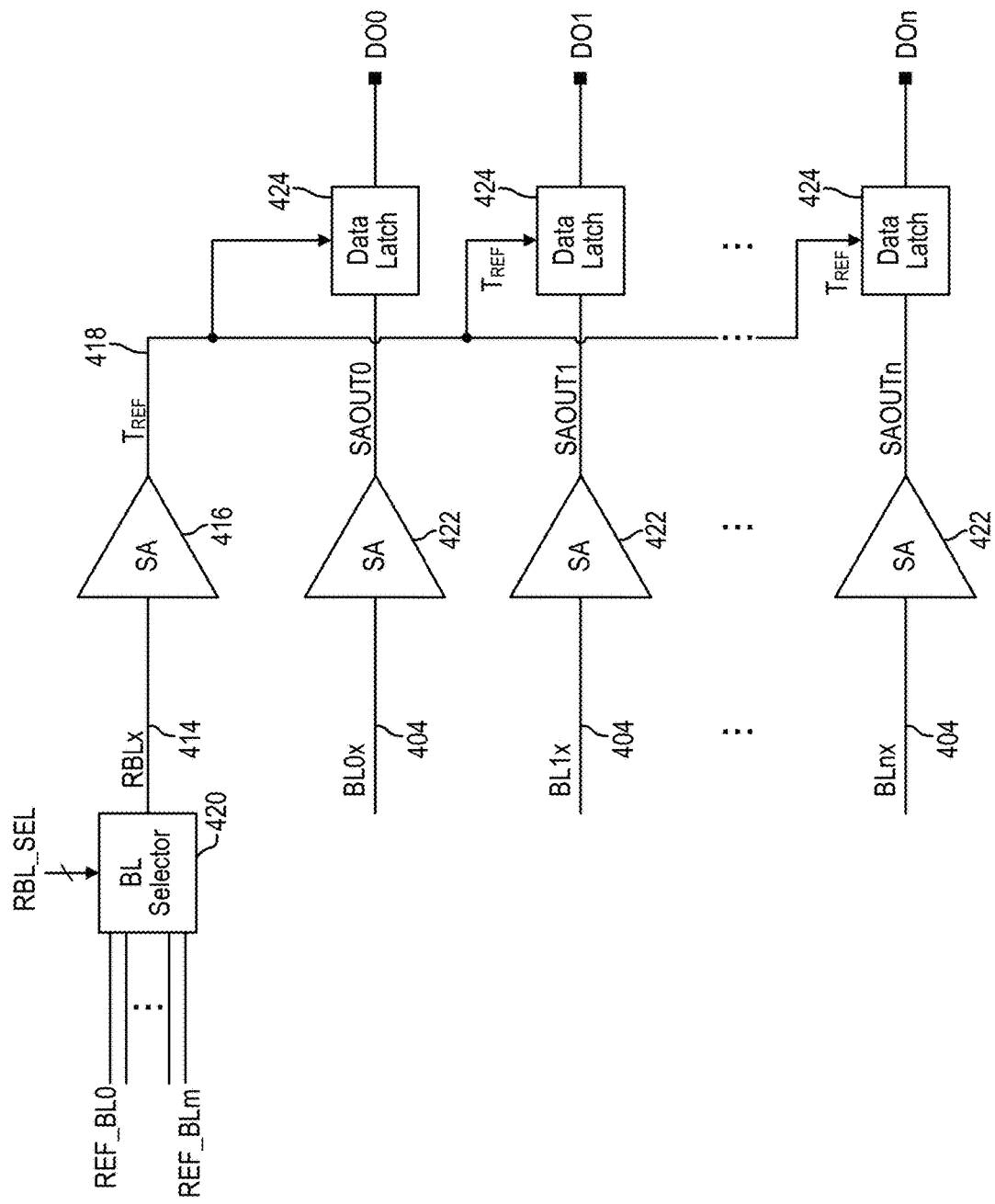
FIG. 16 is a schematic diagram of a sense amplifier circuit using a reference signal as a sense amplifier latch signal in some embodiments.

FIG. 16 is a schematic diagram of a sense amplifier circuit using a reference signal as a sense amplifier latch signal in some embodiments. Referring to FIG. 16, a sense amplifier circuit includes sense amplifiers 422 coupled to bit lines 404, such as selected bit lines from respective bit line selectors 220 (FIG. 2). In operation, the memory transistors to be accessed are activated by the associated word line signals and the associated bit lines are selected by the bit line selectors in response to the bit line select signals. Each sense amplifier 422 senses the respective bit line 404 and generates sense amplifier output signal SAOUT, such as output signals SAOUT0 to SAOUTn. The sense amplifier output signals SAOUT are provided to respective data latches 424. Each data latch 424 latches the respective sense amplifier output signal SAOUT in response to a latch signal to generate the data output signal DO (such as DO0 to 0).

A sense amplifier 416 ("reference sense amplifier") is provided to sense a reference signal RBLx (node 414) generated by one or more reference memory transistors where the reference memory transistors are partially polarized to have a threshold voltage that is between the erase and program threshold voltages of the memory transistors. In operation, the reference memory transistors are activated for access by the associated reference word line signals and the reference bit line signals are provided on the associated common bit lines. In some embodiments, multiple reference memory transistors are used and the bit line signals from the multiple reference memory transistors are combined and averaged to generate the reference signal RBLx. For instance, the multiple reference memory transistors may be partially polarized to a third threshold voltage between the erase and program threshold voltages of the memory transistors and are activated for access by asserting the respective reference word lines. In the present embodiment, reference bit lines REF_BL0 to REF_BLm associated with the multiple reference memory transistors are coupled to a bit line selector 420. In response to the reference select signal RBL_SEL, the bit line selector 420 selects multiple reference bit lines from the bit lines REF_BL0 to REF_BLm and connects all of the selected reference bit lines to the reference signal node 414. With the multiple reference bit lines activated and connected to the reference signal node 414, charging sharing occurs between the activated reference bit lines to yield an average signal as the reference signal RBLx. Averaging multiple reference bit lines has the benefits of generating a more accurate reference signal.

With the reference signal RBLx (node 414) thus generated, the reference sense amplifier 416 generates the sense amplifier output signal (node 418) which is used as the latch signal $T_{REF}$ for the data latches 424. In particular, the reference sense amplifier 416 senses the reference signal RBLx and the output signal $T_{REF}$ changes logical state in response to the partial polarization state of the selected reference memory transistors (as selected by the bit line selector 420). The output signal $T_{REF}$ is used by the data latches 424 to indicate the time to latch the sense amplifier output signals SAOUT to generate the data output signals DO (such as DO0 to DOn).

In the embodiment of FIG. 16, the sense amplifiers 422 are implemented as single-ended sense amplifiers and the reference signal is used as a timing signal to latch the sense amplifier output signals at a given time after the start of the bit line signal development. In other embodiments, the sense amplifiers can be implemented as differential sense amplifiers and the reference signal is used as a sense amplifier reference to compare against the sensed bit line signal.

Figure 17:
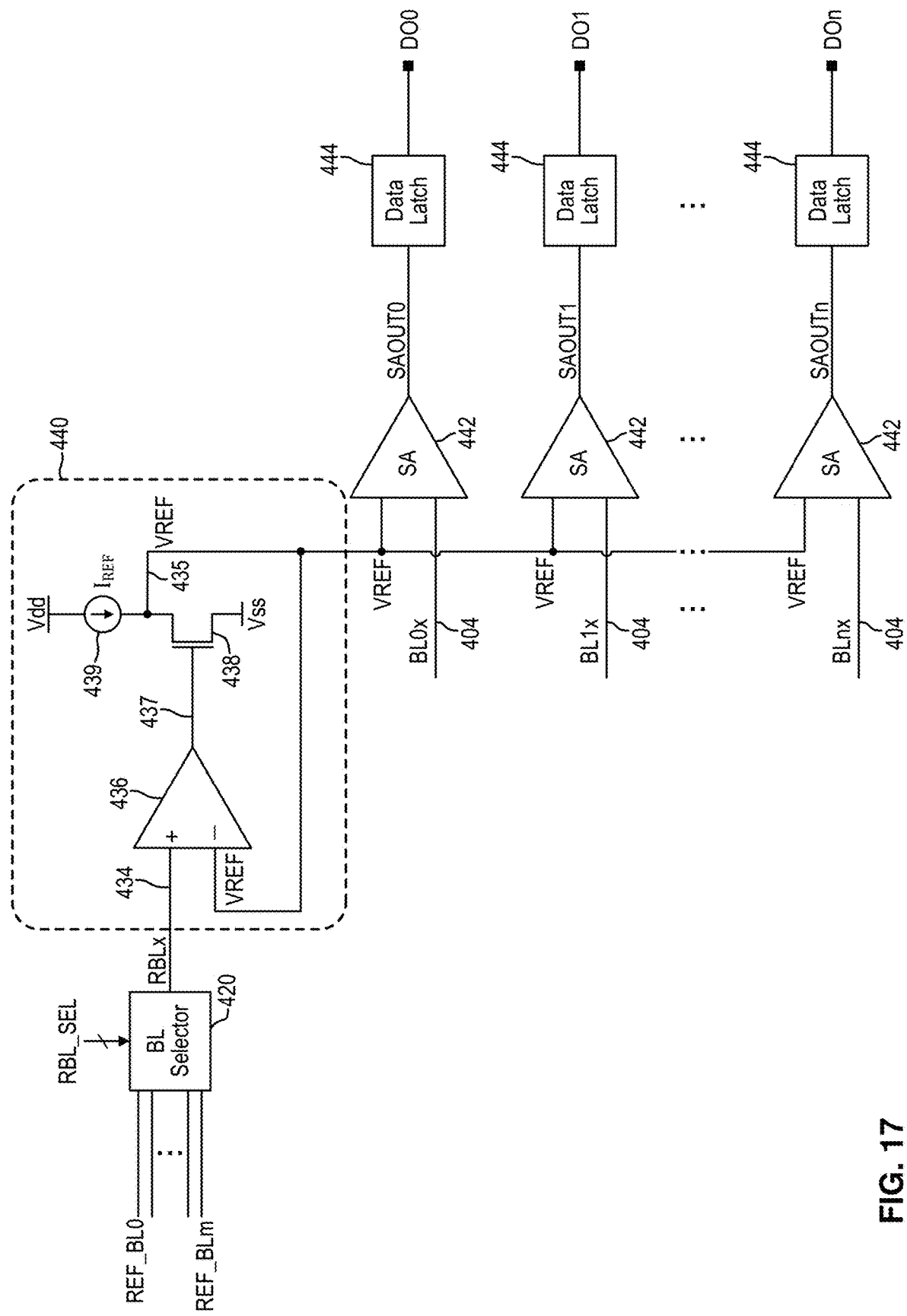
FIG. 17 is a schematic diagram of a sense amplifier circuit including differential sense amplifiers using the reference signal as a sense amplifier reference in some embodiments.

FIG. 17 is a schematic diagram of a sense amplifier circuit including differential sense amplifiers using the reference signal as a sense amplifier reference in some embodiments. Referring to FIG. 17, a sense amplifier circuit includes sense amplifiers 442 coupled to bit lines 404, such as selected bit lines from respective bit line selectors 220 (FIG. 2). Each sense amplifier 442 is a differential sense amplifier receiving the respective bit line 404 as a first input and receiving a sense amplifier reference VREF as a second input. Each sense amplifier 442 senses the respective bit line 404 and generates sense amplifier output signal SAOUT, such as output signals SAOUT0 to SAOUTn, by comparing the sensed bit line signal to the sense amplifier reference signal. The sense amplifier output signals SAOUT are provided to respective data latches 444. Each data latch 444 latches or stores the respective sense amplifier output signal SAOUT to provide as the data output signal DO (such as DO0 to DOn).

In the present embodiment, the sense amplifier reference VREF is generated from the reference signal RBLx being the reference signal generated from one or more partially polarized reference memory transistors where the reference memory transistors are partially polarized to have a threshold voltage that is between the erase and program threshold voltages of the memory transistors. In some embodiments, multiple reference memory transistors are used and the bit line signals from the multiple reference memory transistors are combined and averaged to generate the reference signal RBLx, as described above with reference to FIG. 16. For instance, reference bit lines REF_BL0 to REF_BLm associated with the multiple reference memory transistors are coupled to a bit line selector 420. In response to the reference select signal RBL_SEL, the bit line selector 420 selects multiple reference bit lines from the bit lines REF_BL0 to REF_BLm and connects all of the selected reference bit lines to the reference signal node 434. With the multiple reference bit lines activated and connected to the reference signal node 434, charging sharing occurs between the activated reference bit lines to yield an average signal as the reference signal RBLx.

In the present embodiment, the reference signal RBLx (node 434) is buffered or amplified by an opamp circuit 440 to create copies of the reference signal to use as the sense amplifier reference VREF. In some embodiments, the opamp circuit 440 includes an opamp (operational amplifier) 436 receiving the reference signal RBLx on the non-inverting input terminal. The inverting input terminal is connected in a negative feedback loop. The opamp 436 drives the gate terminal of an NMOS transistor 438. The drain terminal (node 435) of the NMOS transistor 438 is biased by a current source 439 which is coupled to the positive power supply voltage Vdd. The current source 439 provides a current $I_{REF}$. The source terminal of the NMOS transistor 438 is coupled to the negative power supply voltage or Vss or to a ground voltage. The drain terminal (node 435) of the NMOS transistor 438 provides the reference signal VREF which is coupled through a feedback loop to the inverting input terminal of the opamp 436. The reference VREF is copied or distributed to the second input terminal of the several sense amplifiers 442 for sensing the bit line signals of the memory transistors selected for read out.

In the above-described embodiments, the reference memory transistors can be formed from one or more memory strings, such as memory strings provided in a reference plane (FIG. 4) or memory strings provided in a reference stack (FIG. 5). In these cases, the common bit line associated with the reference memory string is a dedicated reference bit line, connected only to reference memory transistors. In some embodiments, the reference memory transistors are formed as a reference slice (FIG. 6) where one or more memory transistors in a memory string are designated as reference memory transistors. In that case, a memory string includes both memory transistors and reference memory transistors where the memory transistors and reference memory transistors on the same memory string share the same common bit line. In some embodiments, a sequential read method is used to access the memory transistors and reference memory transistors that share the same common bit line.

Figure 18A:
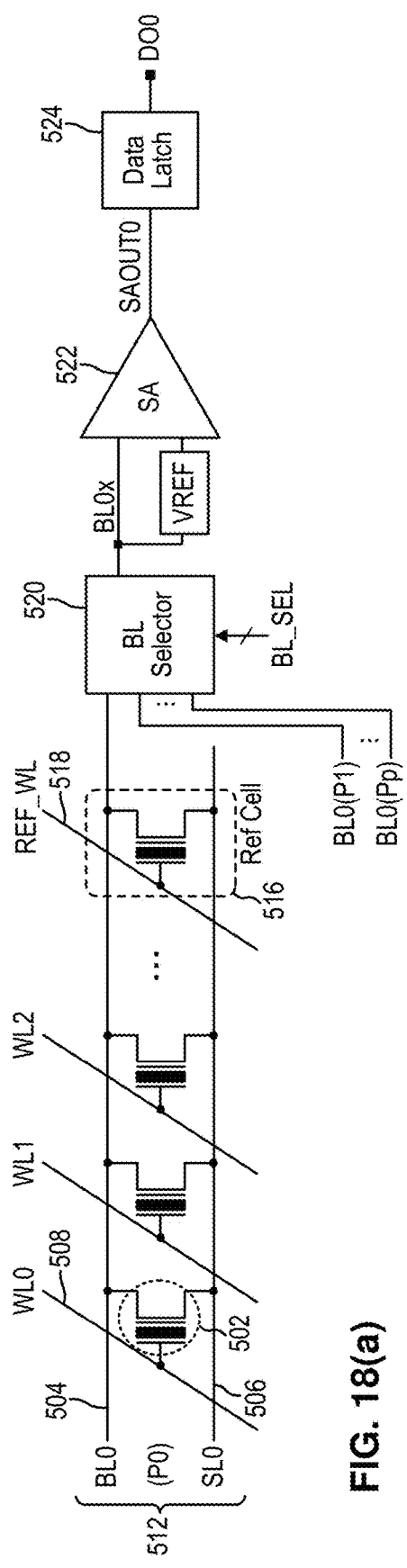
FIG. 18(a) is a schematic diagram of a memory circuit including reference memory transistors in a reference slice in embodiments of the present invention.
Figure 18B:
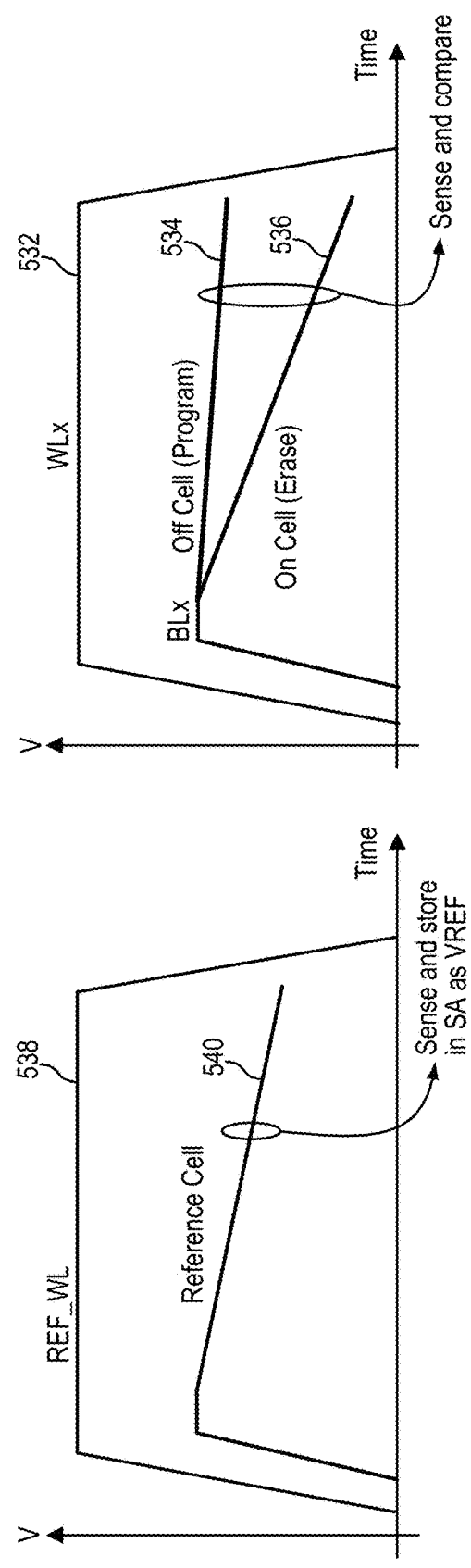
FIG. 18(b) is a timing diagram illustrating the sequential read method in embodiments of the present invention.

FIG. 18(a) is a schematic diagram of a memory circuit including reference memory transistors in a reference slice in embodiments of the present invention. FIG. 18(b) is a timing diagram illustrating the sequential read method in embodiments of the present invention. Referring first to FIG. 18(a), in a reference slice configuration, a memory string 512 of memory transistors 502 may include one or more memory transistors that are designated as reference memory transistors 516 (also referred to as "reference memory cell"). Accordingly, the reference memory cells 516 share the same common bit line 504 and the same common source lines 506 as the memory transistors 502. Each memory transistor is accessed by an associated word line 508 (e.g. WL0, WL1, WL2 . . . ). The reference memory transistor is accessed by a reference word line REF_WL 518.

The common bit line 504 is connected to a bit line selector 520. In particular, the bit line selector 520 is connected to all of the bit lines that are associated with the same data bit across the p+1 memory pages (e.g. memory pages P0 to Pp). The bit line selector 520 selects one bit line in response to the select signal BL_SEL as the selected bit line signal BL0x to be coupled to the sense amplifier circuit for sensing. In the present example, the sense amplifier circuit is implemented as a differential sense amplifier 522 generating a sense amplifier output signal SAOUT0 on output node 524.

In embodiments of the present invention, the reference signal for the read operation is read out sequentially with the memory data in a sequential read operation. In particular, the reference memory transistor may be partially polarized using a partial erase or partial program operation described above so that the partial polarization state of the reference memory transistor may be used as a reference signal for the read operation of the other memory transistors in the same memory string. The operation of the sequential read operation is described with reference to FIG. 18(b). In the example shown in FIG. 18(b), the read operation is performed by reading the reference memory transistor and reading the selected memory transistor in a sequential order. For example, the reference memory transistor may be read first, followed by reading the selected memory transistor. The read sequence in FIG. 18(b) is illustrative only and not intended to be limiting. In other embodiments, the read operation may be performed by reading one or more memory transistors first and then reading the reference memory transistor subsequently.

In the sequential read operation shown in FIG. 18(b), the memory device first accesses the reference memory transistor 516 by asserting the associated word line REF_WL (curve 538). The bit line signal develops as a result of the partial polarization of the reference memory transistor (curve 540). The BL selector 520 selects the bit line BL0 for access and the sense amplifier 522 senses the bit line signal. The sensed data value is stored at the sense amplifier circuit 522 as the sense amplifier reference signal VREF. For example, the sense amplifier reference signal VREF may be stored at one of the differential input nodes of the differential sense amplifier 522.

Then, the word line REF_WL (curve 538) is deasserted and the word line WLx associated with the selected memory transistor 502 is asserted, as represented by curve 532. The bit line signal develops as a result. For a programmed memory transistor, the bit line will be discharged only by the leakage current and the bit line signal (curve 534) will have a small downward slope. For an erased memory transistor, the bit line will be discharged by the conducting memory transistor and the leakage current and the bit line signal (curve 536) will have a larger downward slope. After the bit line development time, the sense amplifier 522 senses the bit line signal and compares the sensed bit line signal to the sense amplifier reference signal VREF already stored at the sense amplifier to generate the sense amplifier output signal SAOUT. The sense amplifier output signal SAOUT is provided to a data latch 524. The data latch 524 latches or stores the sense amplifier output signal SAOUT to provide as the data output signal DO.

It is instructive to note that the reference signal VREF does not have to be read for each read operation of a memory transistor in the memory string 512. Once the reference signal VREF is read out and stored at the sense amplifier 522, the reference signal VREF may be used for comparing with the sensed bit line signals of multiple memory transistors. The stored reference signal VREF may be updated periodically, such as during periodic refresh of the reference memory transistor.

Furthermore, in some embodiments, the memory transistors in a memory string that are closer to the bit line selector may be designated as the reference memory transistors. In this manner, the reading of the bit line signal from the reference memory transistors may be faster than reading of the bit line signal from the memory transistors further down the memory string, reducing the latency of the sequential read operation.

Average Signal as Reference Signal

In another aspect of the present invention, a semiconductor memory device including three-dimensional arrays of NOR memory strings of thin-film ferroelectric memory transistors provides a reference signal for read operation by averaging a first signal associated with a program state and a second signal associated with an erased state of the ferroelectric memory transistor. The reference signal has a value distinguishable from the threshold voltages of program and erase states of the ferroelectric memory transistor and can be effectively applied in a read operation to determine the logical state of the ferroelectric memory transistor.

Figure 19A:
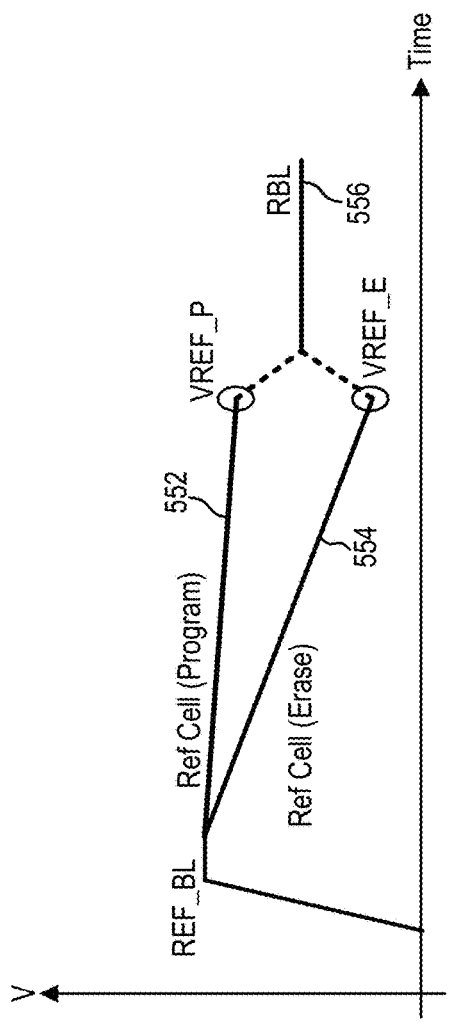
FIG. 19(a) is a plot illustrating the generation of a reference signal for read operation using an averaging method in some embodiments.
Figure 19B:
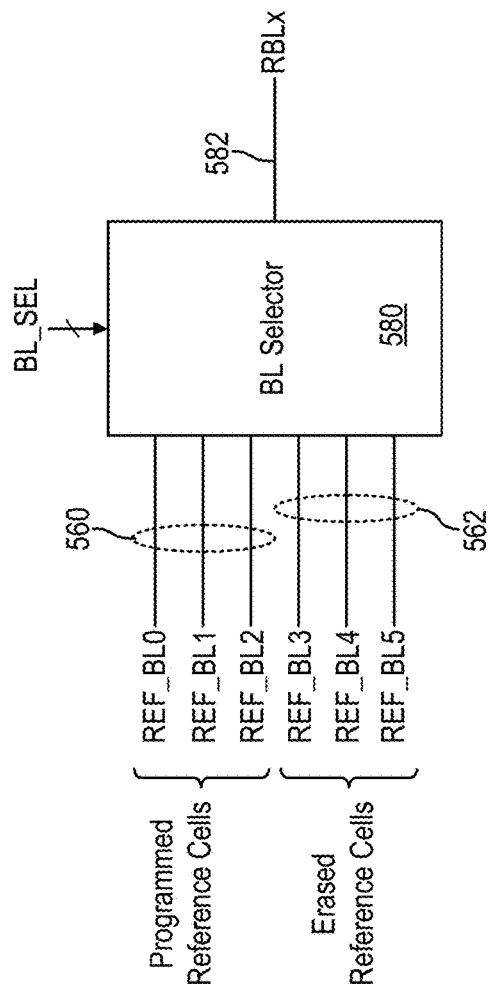
FIG. 19(b) is a schematic diagram illustrating implementing of the averaging method in some embodiments.

FIG. 19(a) is a plot illustrating the generation of a reference signal for read operation using an averaging method in some embodiments. FIG. 19(b) is a schematic diagram illustrating implementing of the averaging method in some embodiments. Referring to FIG. 19(a), under the averaging scheme, a reference signal for read operation can be generated by averaging one or more programmed memory cells and one or more erased memory cells. In some embodiments, the same number of programmed memory cells and erased memory cells are used. For example, a first set of one or more memory transistors may be designated as reference memory transistors and are programmed. A second set of one or more memory transistors may be designated as reference memory transistors and are erased. When a programmed reference memory transistor is read, the bit line signal shown in curve 552 results. When an erased reference memory transistor is read, the bit line signal shown in curve 554 results. The programmed bit line signal and the erased bit line signal can be averaged to generate a reference signal RBL (curve 556) having a signal value being halfway between the programmed and erased bit line signal values. The reference signal RBL can be used as a reference signal for read operation reliably to distinguish between a programmed memory transistor and an erased memory transistor. For example, the reference signal RBL can be applied in a single-end sense amplifier circuit arrangement (FIG. 16) or a differential sense amplifier circuit arrangement (FIG. 17), as discussed above, to effectuate sensing of the bit line signals of memory transistors to be accessed.

FIG. 19(b) illustrates a method of implementing the averaging scheme using the bit line selector. Referring to FIG. 19(b), a bit line selector 580 is coupled to a first set 560 of bit lines REF_BL0 to REF_BL2 that are associated with designated reference memory transistors that have been placed in the program state. The bit line selector 580 is further coupled to a second set 562 of bit lines REF_BL3 to REF_BL5 that are associated with designated reference memory transistors that have been placed in the erase state. In the present example, each set of bit lines includes three bit lines. The bit line selector 580, in response to the select signal BL_SEL, selects some or all of the bit lines connected thereto. In particular, to realize the averaging scheme, the bit line selector 580 receives the select signal BL_SEL that selects or activates at least one programmed bit line from the first set 560 and at least one erased bit line from the second set 562. With the two bit lines selected and connected to the output node 582, charge sharing between the two bit lines occur and an average signal of the programmed bit line and the erased bit line is generated as the reference signal RBLx on node 582.

In practice, multiple bit lines are selected from each set to improve the accuracy of the reference signal and to reduce the variation of the reference signal values. For example, the select signal BL_SEL may direct the bit line selector 580 to select the three bit lines in the first set 560 and the three bit lines in the second set 562 for averaging. In one embodiment, the same number of programmed bit lines and erased bit lines are used to generate a reference signal that is halfway between the programmed bit line signal value and the erased bit line signal value. In other embodiments, a different ratio of programmed to erased bit lines can be used to generate a reference signal that may be closer to the programmed bit line signal or the erased bit line signal.

As described above, the reference signal RBLx can be applied in a single-end sense amplifier circuit arrangement (FIG. 16) or a differential sense amplifier circuit arrangement (FIG. 17) to effectuate sensing of the bit line signals of memory transistors to be accessed.

Reduced Memory Window

According to yet another aspect of the present invention, the ferroelectric memory transistors can be operated such that their memory window is less than the saturated (or fully polarized) memory window between the programmed and erased states of the ferroelectric memory transistor. In the present description, the term "memory window" refers to the difference in threshold voltage values between the erased state and the programmed state of the ferroelectric memory transistor. In one example, the memory window (MW) of a ferroelectric memory transistor is given as: MW=VT(program)−VT(erase), where VT(program) denotes the threshold voltage of the ferroelectric memory transistor in the programmed state (e.g. negative polarization) and VT(erase) denotes the threshold voltage of the ferroelectric memory transistor in the erased state (e.g. positive polarization). Typically, the memory window is established by the erased threshold voltage at the low end of the voltage window and the programmed threshold voltage at the high end of the voltage window. In typical operations, a large memory window is desired and the memory window is extended as much as possible, such as by exposing the ferroelectric dielectric layer to relatively high programming or erasing voltages to fully polarize the ferroelectric dielectric layer. In other words, typically, the memory transistor is programmed to realize a program threshold voltage to be as large as possible and is erased to realize an erase threshold voltage to be as small as possible. This practice may overstress the polarized phase of the ferroelectric dielectric material which can in turn lead to the necessity of using an excessively high erase voltage to bring the memory transistor to its erased state. The use of the excessively high erase or program voltages may expose the memory cell to excess electric field stress, which may limit the device's endurance. In the present description, the memory transistor's "endurance" refers to the number of erase-program cycles before the memory transistor no longer supports the polarization cycling of the ferroelectric memory transistor. Excessive electric fields across the memory transistor can also result in a phenomenon called "imprint" which may change the memory behavior.

Embodiments of the present invention provides a novel operation mode for ferroelectric memory transistors, which has the benefits of lessening or obviating the deterioration of the ferroelectric memory transistors due to overstressing. In the standard operation mode, a ferroelectric memory transistor is erased to the erased state (e.g. the erase polarization state) or the memory transistor is programmed to the programmed state (e.g. the program polarization state) to store memory data in two logical states. In embodiments of the present invention, under the novel operation mode, the ferroelectric memory transistors are biased to be placed in the program or erase polarization state, with different degrees of polarization level within the given polarization state used to represent different stored data values. In other words, the different polarization levels associated with a given polarization state (program or erase polarization state) are used to represent different binary states of memory cell, such as the first and second logical values of the stored data. The threshold voltage values associated with the different polarization levels fall within the memory window that would be created by the erased and program polarization states. In the present description, the different polarization levels associated with a given polarization state (program or erase polarization state) are sometimes referred herein as weak and strong polarization states, where weak and strong are used to denote different polarization levels within the given polarization state. The polarization levels are retained for sufficiently long durations in the memory cell, provided that care is taken to avoid disturbs from erase or program operations in adjacent cells in the memory array.

Essentially, the binary states (e.g. logical "0" and "1") of the memory cell is established by first erasing the memory cell and then programming the memory cell into a weak polarization state (e.g. logical "0") or into a stronger polarization state (e.g. logical "1"). For example, if the polarization threshold voltage is at 1.5V between the gate and drain or source (or both drain and source), then the weak polarization state (0) can be formed by a short pulse of 2.0V between the gate and drain/source and the stronger polarization state (1) can be formed by a short pulse of 3.0V between the gate and the drain/source, or, alternatively, the magnitude of the pulse can be the same (e.g. 2.5V) for both 0 and 1 but the duration of the pulse can for example, be 0.5 microsecond for the weaker polarization and hence a lower signal (0) and 1 microsecond for the stronger polarization and hence a corresponding larger signal (1). Long term retention of the 0 or 1 signals may require periodic read-refresh operations, for example once every 10 minutes or every one hour or once a day etc.

Multi-Level Cell

According to another aspect of the present invention, the partial polarization scheme is applied to implement a multi-bit ferroelectric memory transistor, sometimes referred to as a multi-level cell or MLC. In the present description, a single-bit memory cell (or single-level cell) refers to a memory cell configured to store one binary bit of memory data, associated with two distinct ferroelectric polarization states of the memory cell, typically represented by logical values 0 and 1. On the other hand, a multi-bit memory cell refers to a memory cell configured to store more than one binary bit of memory data, such as 1.5 bits or 2 or more bits, associated with three or more distinct ferroelectric polarization states (or polarization levels) in the memory cell, which can be represented by logical values 00, 01, 10, for example. To write a multi-level cell, memory transistors are polarized, using the partial polarization scheme, to one of several programmable polarization levels for one or more polarization states. To read the multi-level cell, the bit line current of the memory transistor is compared to a set of reference signals to determine the stored data value of the memory transistor. In one embodiment, the set of reference signals are generated by multiple reference memory transistors that are partially polarized to respective programmable reference polarization levels used to distinguish between the multiple programmable polarization levels or states of the memory transistor. For example, the bit line current from a multi-level cell can be compared with two reference signals to determine the stored data value of a 1.5 bits memory cell. This principle can be extended in a continuous range of programmable analog states.

In embodiments of the present invention, a multi-level ferroelectric memory transistor is implemented using the partial polarization scheme to support more than one binary bit per memory cell. For example, three polarization states (or polarization levels) stored on one memory transistor represent 1.5 bits of information, while four polarization states (or polarization levels) stored on the memory transistor represent two bits per memory cell. In some embodiments, the multiple polarization levels are realized by programming or erasing only at one current terminal of the ferroelectric memory transistor, in accordance with the partial polarization schemes described above.

In one exemplary embodiment, three polarization states in the same ferroelectric memory transistor are realized by: (1) applying a 3V pulse on the gate and 0V on both drain and source to implement the first polarization state, (2) applying 0V on the gate and a 3V pulse on both drain and source to implement the second polarization state; and (3) applying a 3V pulse on the gate and one of the current terminals (drain or source) and 0V on the other current terminal (source or drain) to implement the third polarization state. In other words, the third polarization state is realized by erasing only at one current terminal (source or drain) and inhibiting the erase operation at the other current terminal.

In some embodiments, to support the read operation in the multi-level ferroelectric memory transistors, multiple copies of the reference signal can be generated to use to distinguish between the various polarization states implemented in the memory transistors. For example, in the case where the single-ended sensing of FIG. 16 is used, additional instances of the BL selector 420 and the reference sense amplifier 416 are provided to generate reference latch signals $T_{REF}$ at different signal levels. For instance, different reference latch signals $T_{REF}$ are generated from reference bit lines associated with reference memory transistors having different polarization levels. The reference latch signal $T_{REF}$ with different signal values are provided to distinguish between the multiple logical states of the multi-level cells. In particular, the reference latch signals $T_{REF}$ are provided to the data latches 424 to detect the sense amplifier output value at different time intervals. More specifically, each data latch 424 latches the sense amplifier output value at different time intervals as indicated by the reference latch signals $T_{REF}$ to generate an encoded data as the output data. The encoded multi-bit data represents the signal level of the multi-level memory transistor being accessed in the read operation.

In another example, in the case where the differential sensing of FIG. 17 is used, additional instances of the BL selector 420 and the op-amp 440 are provided to generate additional reference voltage signals $V_{REF}$. For instance, different reference voltage signal levels are generated from reference bit lines associated with reference memory transistors having different polarization levels. The reference voltage signals $V_{REF}$ with different signal levels are provided to the sense amplifiers 442 for detecting the different polarization states of the multi-level cells during a memory read operation. More specifically, each sense amplifier 442 compares the respective bit line signal BLx (node 404) to the set of reference voltage signals $V_{REF}$ having different reference signal levels to generate an encoded data as the sense amplifier output signal, which is then stored in the data latch 444. The encoded multi-bit data represents the signal level of the multi-level memory transistor being accessed in the read operation.

In another exemplary embodiment, a two-bit per cell memory transistor can be derived by applying strong (00), weak (01), weaker (10) and near zero (11) polarization electric fields across the memory transistor channel at its drain and source. Typically, the polarizing electric field is strongest in the ferroelectric dielectric layer between the gate and drain and between the gate and source. To a lesser extent, the fringing field adjacent to the drain, and the fringing field adjacent the source, together play a major role in providing partial polarization extending into the transistor channel area. If only one of the source or drain of the ferroelectric memory transistor contributes their fringing field polarization, this will cause the memory window to have a reduced memory window, which in turn will change the threshold voltage levels of the memory transistor and the read current detected. Thus, a carefully controlled voltage modulation of the bit line or the source line, or both, relative to their gate, can be used to program/erase the memory cell into distinct threshold voltage levels, detectable by the transistor read current. In some embodiments, the reading of the multi-bit stored data can be performed in two steps, first sensing the channel adjacent the drain, then sensing the channel adjacent the source by switching between the source and drain to detect two distinct memory bits in the same transistor. More specifically, sensing the channel adjacent the drain can be implemented by biasing the drain terminal or the common bit line to a slightly positive voltage (e.g. 0.5V) and detecting the cell current flowing from the drain terminal to the source terminal of the memory transistor. Alternately, sensing the channel adjacent the source can be implemented by biasing the source terminal or the common source line to a slightly positive voltage (e.g. 0.5V) and detecting the cell current flowing from the source terminal to the drain terminal of the memory transistor.

Figure 20:
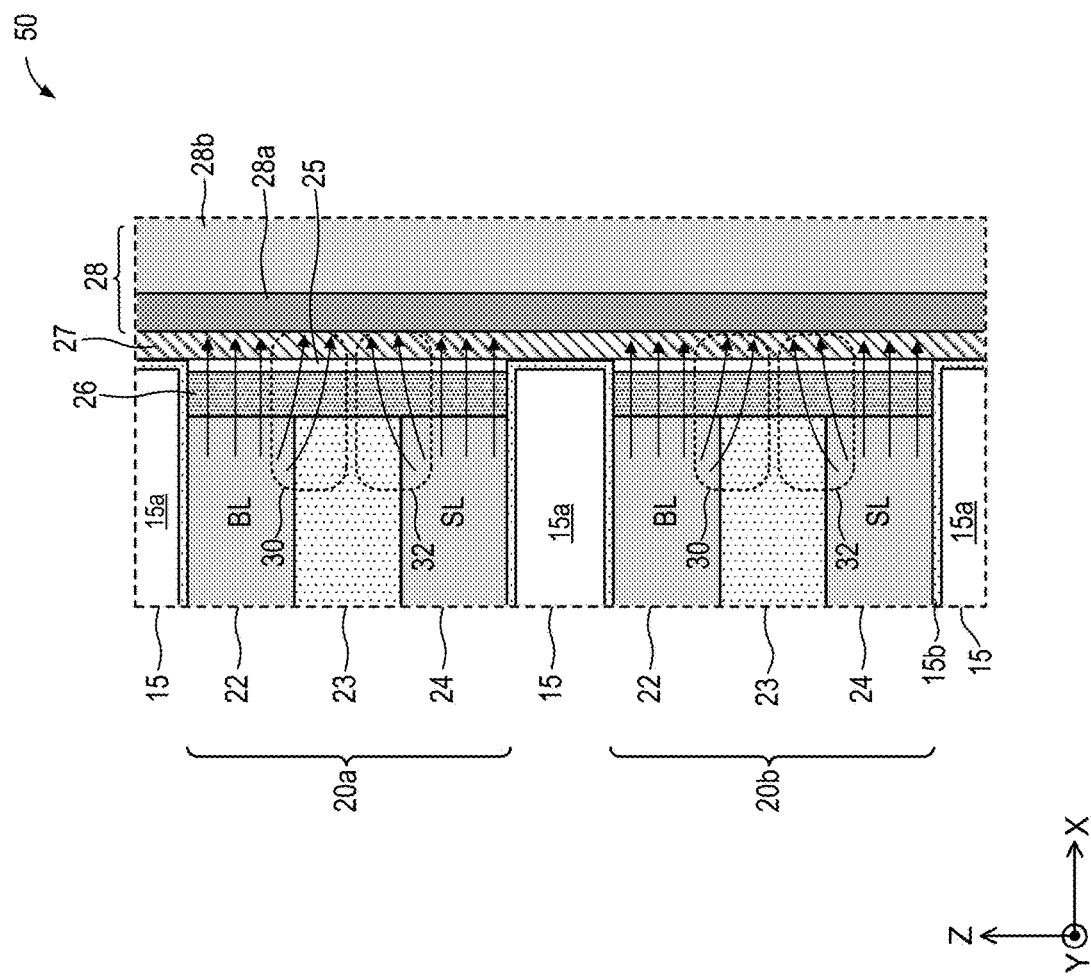
FIG. 20 is a cross-sectional view of a pair of ferroelectric memory transistors which may be used to form the memory transistors in the memory array of FIGS. 1 and 7 in some embodiments.

FIG. 20 is a cross-sectional view of a pair of ferroelectric memory transistors which may be used to form the memory transistors in the memory array of FIGS. 1 and 7 in some embodiments. In particular, FIG. 20 illustrates a memory structure 50 including a pair of memory transistors 20a and 20b (collectively "memory transistor 20") in two adjacent planes of a memory stack. Referring to FIG. 20, the memory transistor 20 (transistor 20a or 20b) includes a first conductive layer 22 forming the drain terminal (the common drain line or the common bit line) and a second conductive layer 24 forming the source terminal (the common source line), the conductive layers being spaced apart by a channel spacer dielectric layer 23. The memory transistor 20 further includes a channel layer 26 formed vertically along the sidewall of the memory stack and in contact with both the first conductive layer 22 and the second conductive layer 24. A ferroelectric gate dielectric layer 27 and a gate conductor layer 28 are formed on the sidewall of the channel layer 26. The gate conductor layer 28 may include a conductive adhesion layer 28a, such as a titanium nitride layer, and a bulk conductive layer 28b, such as tungsten. An optional interfacial layer 25 may be provided between the channel layer 26 and the ferroelectric gate dielectric layer 27. The memory transistor 20 is isolated from adjacent storage transistors in the stack by an inter-layer isolation layer 15. As thus configured, along an active strip (in the Y-direction), the memory transistors that share the common source line and the common bit line form a NOR memory string (referred herein as a "Horizontal NOR memory string" or "HNOR memory string").

In embodiments of the present disclosure, the common bit line 22 and the common source line 24 of the memory transistor 20 are interchangeable such that either one can be operated as the drain or the source of the memory transistor. As a result, the interchangeable drain/source feature allows the ferroelectric polarization through electrical fringing field at just the channel region 26 adjacent to the drain (denoted by dotted circle 30 in FIG. 20), or just the channel region 26 adjacent to the source (denoted by dotted circle 32 in FIG. 20), or fringing field adjacent both the drain and the source (dotted circles 30 and 32). In practice, a memory window MW1 (i.e. the threshold voltage differences between the programmed and erased state of the memory transistor) generated by fringing field 30 and the memory window MW2 generated by fringing field 32 can have more or less the same width, provided that the drain and source are held at the same voltage relative to their gate 28. In this case, both the source and drain are activated and the total polarization window $MW_{TOT}$ is $MW_{TOT}$=MW1+MW2. If only the source provides the fringing field, with the drain held at an inhibit voltage, such as the same voltage as the gate, then the total polarization window is just MW2 which is ½$MW_{TOT}$. Therefore, in accordance with the partial polarization schemes described herein, a ferroelectric memory transistor can be partially polarized, or half-polarized as shown in the present embodiment, to realize a native reference polarization state close to half of the full polarization state.

Alternatively, both source and drain channel regions can be polarized to a different degree. For example, fringing field at the drain (dotted box 30) can be set at a 3.0V maximum polarization pulse while fringing field at the source (dotted box 32) can be set at a 1.5V polarization-inhibit pulse, thereby avoiding applying the full 3 volts between drain and source of the memory transistor. In contrast, regular program and erase operations typically have 3V or 0V applied to both the bit line and the source line, to realize a maximum memory window. In the regular program and erase case, the memory window (MW) can be twice as wide as the memory window when only the source or only the drain are biased. One advantage of having the source and the drain lines independently contributing to the ferroelectric reference polarization is that any ferroelectric transistor in a memory array can be electrically programmed to any one of intermediate reference polarization states, where the intermediate reference polarization state has a relatively long retention time. Another advantage of the programmable intermediate reference polarization state in a memory transistor is that the memory transistor can be employed to use as a reference signal for read operations but also as a reference signal for write operations, to set the erase and program threshold voltages relative to the reference signal.

Another advantage of operating the source fringing field as independent from the drain fringing field is that four distinct polarization states can be provided for each ferroelectric memory transistor: first one with reading the drain as acting as drain, second with reading the source as acting as drain, third with reading both source and drain at 0V and fourth with reading source and drain at 3V. The four different polarization states can be read in two sequential reads of each ferroelectric memory transistor to correspond to two distinct bits, equivalent to 00, 01, 10, 11.

In this detailed description, spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that when an element or layer is referred to as being "on," "connected to" or "coupled to"

another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

In this detailed description, process steps described for one embodiment may be used in a different embodiment, even if the process steps are not expressly described in the different embodiment. When reference is made herein to a method including two or more defined steps, the defined steps can be carried out in any order or simultaneously, except where the context dictates or specific instruction otherwise are provided herein. Further, unless the context dictates or express instructions otherwise are provided, the method can also include one or more other steps carried out before any of the defined steps, between two of the defined steps, or after all the defined steps.

In this detailed description, various embodiments or examples of the present invention may be implemented in numerous ways, including as a process; an apparatus; a system; and a composition of matter. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. A memory device, comprising:
an array of memory strings, each memory string including thin-film ferroelectric memory transistors having drain terminals coupled to a common bit line, source terminals coupled to a common source line, and gate terminals coupled to respective word lines, ferroelectric memory transistors across multiple memory strings that are vertically aligned in the array being coupled to a common word line, each ferroelectric memory transistor including a ferroelectric gate dielectric layer that is polarizable in response to application of bias voltages to the drain, source and gate terminals,
wherein in response to being driven by a first set of bias voltages, the ferroelectric memory transistors provide a first polarization state in the ferroelectric gate dielectric layer, the first polarization state being associated with a first threshold voltage value, and in response to being driven by a second set of bias voltages, the ferroelectric memory transistors provide a second polarization state in the ferroelectric gate dielectric layer, the second polarization state being associated with a second threshold voltage value, the second threshold voltage value being greater than the first threshold voltage value; and
wherein at least one memory transistor in a first memory string is designated as a reference memory transistor, and in response to being driven by a third set of bias voltages, the reference memory transistor provides a third polarization state in the ferroelectric gate dielectric layer of the reference memory transistor, the third polarization state having a polarization level in the ferroelectric gate dielectric layer being between the first and second polarization states, the third polarization state being associated with a third threshold voltage value being between the first and second threshold voltage values.

2. The memory device of claim 1, wherein the first polarization state comprises a positive polarization state in the ferroelectric gate dielectric layer and the second polarization state comprises a negative polarization state in the ferroelectric gate dielectric layer, the third polarization state having a polarization level in the ferroelectric gate dielectric layer being between the positive and negative polarization states.

3. The memory device of claim 2, wherein the first polarization state is associated with memory data of a first logical state being stored in a respective ferroelectric memory transistor, the second polarization state is associated with memory data of a second logical state being stored in a respective ferroelectric memory transistor, and a reference signal indicative of the third polarization state in the reference memory transistor is provided for reading from the other ferroelectric memory transistors to determine the logical state of the stored data.

4. The memory device of claim 2, wherein the first set of bias voltages comprises a positive bias being applied to the gate terminal of the ferroelectric memory transistor relative to the drain and source terminals to induce the first polarization state in the ferroelectric gate dielectric layer and the second set of bias voltages comprises a negative bias being applied to the gate terminal of the ferroelectric memory transistor relative to the drain and source terminals to induce the second polarization state in the ferroelectric gate dielectric layer.

5. The memory device of claim 4, wherein the second set of bias voltages comprises a positive bias being applied to the drain and source terminals of the ferroelectric memory transistor relative to the gate terminal to induce the second polarization state in the ferroelectric gate dielectric layer.

6. The memory device of claim 1, wherein a plurality of memory transistors in one or more memory strings are designated as reference memory transistors and are driven by the third set of bias voltages to each provide the third polarization state in the ferroelectric gate dielectric layer, signals indicative of the third polarization state in the plurality of reference memory transistors are combined to generate a reference signal for reading the stored memory data from the other ferroelectric memory transistors to determine the logical state of the stored data.

7. The memory device of claim 6, wherein the signals indicative of the third polarization state in the plurality of reference memory transistors comprises bit line signals from the plurality of reference memory transistors and the bit line signals are combined and averaged to generate the reference signal.

8. The memory device of claim 6, wherein the array of memory strings comprises a three-dimensional array of memory strings, including memory strings arranged one on top of another in the vertical direction to form a memory stack and memory strings arranged in a row in a first horizontal direction to form a memory plane, the ferroelectric memory transistors being arranged in each memory string along a second horizontal direction, orthogonal to the first horizontal direction, ferroelectric memory transistors across the three-dimensional array of memory strings forming a memory slice provided in a plane in the vertical direction and the first horizontal direction.

9. The memory device of claim 8, wherein a first memory plane in the three-dimensional array of memory strings is designated as a reference memory plane, the ferroelectric memory transistors in the memory strings of the first memory plane being driven by the third set of bias voltages to provide a reference signal indicative of the third polarization state for reading from the ferroelectric memory transistors in the other memory strings to determine the logical state of the stored memory data.

10. The memory device of claim 8, wherein a first memory stack in the three-dimensional array of memory strings is designated as a reference memory stack, the ferroelectric memory transistors in the memory strings of the first memory stack being driven by the third set of bias voltages to provide a reference signal indicative of the third polarization state for reading the stored memory data from the ferroelectric memory transistors in the other memory strings to determine the logical state of the stored memory data.

11. The memory device of claim 8, wherein a first memory slice in the three-dimensional array of memory strings is designated as a reference memory slice, the ferroelectric memory transistors in the memory strings of the first memory slice being driven by the third set of bias voltages to provide a reference signal indicative of the third polarization state for reading from the ferroelectric memory transistors in the other memory strings to determine the logical state of the stored memory data.

12. The memory device of claim 1, wherein the common bit lines of the array of memory strings of ferroelectric memory transistors are coupled to a plurality of sense amplifiers, each sense amplifier receiving a bit line signal associated with a memory transistor being accessed to read the stored data and generating a sense amplifier output signal indicative of the stored data; and wherein the reference memory transistor provides a reference bit line signal indicative of the third polarization state, the reference bit line signal being provided to a reference sense amplifier to generate a read reference signal, the read reference signal being applied to latch the sense amplifier output signal generated by the sense amplifier connected to a bit line associated with a memory transistor being selected for access by a respective word line.

13. The memory device of claim 1, wherein the common bit lines of the array of memory strings of ferroelectric memory transistors are coupled to a plurality of differential sense amplifiers, each differential sense amplifier receiving a bit line signal associated with a memory transistor being accessed and receiving a sense amplifier reference signal, each differential sense amplifier generating a sense amplifier output signal indicative of the stored data; and wherein the reference memory transistor provides a reference bit line signal indicative of the third polarization state, the reference bit line signal being provided to the plurality of differential sense amplifiers as the sense amplifier reference signal.

14. The memory device of claim 13, wherein the reference bit line signal is read from the reference memory transistor and stored at the differential sense amplifiers for comparison with the bit line signals associated with the memory transistors being accessed.

15. The memory device of claim 1, wherein one or more ferroelectric memory transistors in a first memory string are designated as reference memory transistors and the common bit line of the first memory string is coupled to a first sense amplifier, wherein the reference memory transistor on the first memory string is selected for access and provides a reference bit line signal to the first sense amplifier to generate a reference signal, the reference signal being stored at a first differential input terminal of the first sense amplifier, and wherein a second memory transistor on the first memory string is selected for access and provides a bit line signal to a second differential input terminal of the first sense amplifier, the first sense amplifier generating a sense amplifier output signal by comparing the bit line signal with the reference signal already stored at the first sense amplifier.

16. The memory device of claim 5, wherein the third set of bias voltages comprises a positive bias being applied to the gate terminal of the reference memory transistor relative to the drain terminal or the source terminal to induce the third polarization state in the ferroelectric gate dielectric layer.

17. The memory device of claim 16, wherein the first set of bias voltages comprises the positive bias of a first voltage value being applied to the gate terminal of the ferroelectric memory transistor relative to the drain and source terminals to induce the first polarization state; and the third set of bias voltages comprises a positive bias of a second voltage value being applied to the gate terminal of the reference memory transistor relative to the drain terminal or the source terminal to induce the third polarization state in the ferroelectric gate dielectric layer, the second voltage value being less than the first voltage value.

18. The memory device of claim 5, wherein the first set of bias voltage comprises the positive bias being applied for a first time duration and the third set of bias voltages comprises the positive bias being applied for a second time duration to the gate terminal of the reference memory transistor relative to the drain terminal or the source terminal to induce the third polarization state in the ferroelectric gate dielectric layer, the second time duration being shorter than the first time duration.

19. The memory device of claim 5, wherein the third set of bias voltages comprises a positive bias being applied to the drain terminal or the source terminal of the ferroelectric memory transistor relative to the gate terminal to induce the third polarization state in the ferroelectric gate dielectric layer.

20. The memory device of claim 19, wherein the second set of bias voltages comprises the positive bias of a third voltage value being applied to the drain and source terminals of the ferroelectric memory transistor relative to the gate terminal to induce the second polarization state; and the third set of bias voltages comprises a positive bias of a fourth voltage value being applied to the drain terminal or the source terminal of the reference memory transistor relative to the gate terminal to induce the third polarization state in the ferroelectric gate dielectric layer, the fourth voltage value being less than the third voltage value.

21. The memory device of claim 5, wherein the second set of bias voltage comprises the positive bias being applied to the drain and source terminals of the ferroelectric memory transistor relative to the gate terminal for a third time duration and the third set of bias voltages comprises a positive bias being applied for a fourth time duration to the drain terminal or the source terminal of the reference memory transistor relative to the gate terminal to induce the third polarization state in the ferroelectric gate dielectric layer, the fourth time duration being shorter than the third time duration.

22. The memory device of claim 5, wherein the first set of bias voltages comprises the positive bias of a first voltage value being applied to the gate terminal of the ferroelectric memory transistor relative to the drain and source terminals to induce the first polarization state; and the third set of bias voltages comprises a positive bias of a second voltage value being applied to the gate terminal of the reference memory transistor relative to the drain terminal and the source terminal to induce the third polarization state in the ferroelectric gate dielectric layer, the second voltage value being less than the first voltage value.

23. The memory device of claim 5, wherein the second set of bias voltages comprises the positive bias of a third voltage value being applied to the drain and source terminals of the ferroelectric memory transistor relative to the gate terminal to induce the second polarization state; and the third set of bias voltages comprises a positive bias of a fourth voltage value being applied to the drain terminal and the source terminal of the reference memory transistor relative to the gate terminal to induce the third polarization state in the ferroelectric gate dielectric layer, the fourth voltage value being less than the third voltage value.

24. The memory device of claim 1, wherein the third threshold voltage associated with the third polarization state tracks variations in the first and second threshold voltage values associated with the first and second polarization state due to temperature changes.

25. A method for sensing data in a memory device being implemented as an array of memory strings of ferroelectric memory transistors, each memory string including thin-film ferroelectric memory transistors having drain terminals coupled to a common bit line, source terminals coupled to a common source line, and gate terminals coupled to respective word lines, each ferroelectric memory transistor including a ferroelectric gate dielectric layer that is polarizable in response to application of bias voltages to the drain, source and gate terminals, the method comprising:
    biasing, using a first set of bias voltages, one or more ferroelectric memory transistors to provide a first polarization state in the ferroelectric gate dielectric layer, the first polarization state being associated with a first threshold voltage value;
    biasing, using a second set of bias voltages, one or more ferroelectric memory transistors to provide a second polarization state in the ferroelectric gate dielectric layer, the second polarization state being associated with a second threshold voltage value, the second threshold voltage value being greater than the first threshold voltage value;
    designating at least one ferroelectric memory transistor in a first memory string as a reference memory transistor; and
    biasing, using a third set of bias voltages, the reference memory transistor to provide a third polarization state in the ferroelectric gate dielectric layer of the reference memory transistor, the third polarization state having a polarization level in the ferroelectric gate dielectric layer being between the first and second polarization states, the third polarization state being associated with a third threshold voltage value being between the first and second threshold voltage values.

26. The method of claim 25, wherein the first polarization state comprises a positive polarization state in the ferroelectric gate dielectric layer and is associated with memory data of a first logical state being stored in a respective ferroelectric memory transistor, and the second polarization state comprises a negative polarization state in the ferroelectric gate dielectric layer and is associated with memory data of a second logical state being stored in a respective ferroelectric memory transistor, the method further comprises:
    generating a reference signal indicative of the third polarization state in the reference memory transistor; and
    reading, using the reference signal, the stored memory data from the other ferroelectric memory transistors to determine the logical state of the stored memory data.

27. The method of claim 25, wherein:
    biasing, using the first set of bias voltages, the one or more ferroelectric memory transistors comprises applying a positive bias to the gate terminal of the ferroelectric memory transistor relative to the drain and source terminals to induce the first polarization state in the ferroelectric gate dielectric layer; and
    biasing, using the second set of bias voltages, the one or more ferroelectric memory transistors comprises applying a positive bias to the drain and source terminals of the ferroelectric memory transistor relative to the gate terminal to induce the second polarization state in the ferroelectric gate dielectric layer.

28. The method of claim 25, wherein designating at least one ferroelectric memory transistor comprises designating a plurality of ferroelectric memory transistors as reference memory transistors, the method further comprising:
    biasing, using a third set of bias voltages, the reference memory transistors to provide the third polarization state in the ferroelectric gate dielectric layer of the reference memory transistors; and
    combining signals indicative of the third polarization state in the plurality of reference memory transistors to generate a reference signal for reading the stored memory data from the other ferroelectric memory transistors to determine the logical state of the stored memory data.

29. The method of claim 28, wherein combining signals indicative of the third polarization state in the plurality of reference memory transistors comprises combining bit line signals from the plurality of reference memory transistors and the method further comprising:
    averaging the bit line signals to generate the reference signal.

30. The method of claim 28, wherein the array of memory strings comprises a three-dimensional array of memory strings, and designating a plurality of ferroelectric memory transistors as reference memory transistors comprises:
    designating a plurality of ferroelectric memory transistors in a memory plane as reference memory transistors, the memory plane including memory strings arranged in a row in a first horizontal direction in the three-dimensional array.

31. The method of claim 28, wherein the array of memory strings comprises a three-dimensional array of memory strings, and designating a plurality of ferroelectric memory transistors as reference memory transistors comprises:
    designating a plurality of ferroelectric memory transistors in a memory stack as reference memory transistors, the memory stack including memory strings arranged in a vertical direction in the three-dimensional array.

32. The method of claim 28, wherein the array of memory strings comprises a three-dimensional array of memory strings, and designating a plurality of ferroelectric memory transistors as reference memory transistors comprises:
    designating a plurality of ferroelectric memory transistors in a memory slice as reference memory transistors, the memory slice including memory transistors across the three-dimensional array of memory strings provided in a plane in a vertical direction and a first horizontal direction.

33. The method of claim 25, further comprising:
selecting a memory transistor from a second memory string for access;
sensing at a sense amplifier a bit line signal associated with the selected memory transistor to read the stored data;
generating a reference signal indicative of the third polarization state in the reference memory transistor; and
in response to the reference signal, latching, at an output node of the sense amplifier, the sensed data value for the selected memory transistor.

34. The method of claim 25, further comprising:
generating a reference signal indicative of the third polarization state in the reference memory transistor;
selecting a memory transistor from a second memory string for access;
providing at a differential sense amplifier the reference signal and a bit line signal associated with the selected memory transistor to read the stored data; and
generating a sense amplifier output signal indicative of the stored data.

35. The method of claim 27, wherein:
biasing, using the third set of bias voltages, the reference memory transistor comprises applying a positive bias of a second voltage value to the gate terminal of the reference memory transistor relative to the drain terminal or the source terminal to induce the third polarization state in the ferroelectric gate dielectric layer, the second voltage value being equal to or less than the first voltage value.

36. The method of claim 35, further comprising:
prior to biasing the reference memory transistor to the third set of bias voltages, pre-conditioning the reference memory transistor by apply a set of bias voltages to set the reference memory transistor to a polarization state opposite the third polarization state.

37. The method of claim 35, wherein:
applying the positive bias of the first voltage value comprises applying the positive bias of the first voltage value for a first time duration to the gate terminal of the ferroelectric memory transistor relative to the drain and source terminals to induce the first polarization state; and
applying the positive bias of the second voltage value comprises applying the positive bias of the second voltage value for a second time duration to the gate terminal of the reference memory transistor relative to the drain terminal or the source terminal to induce the third polarization state in the ferroelectric gate dielectric layer, the second time duration being shorter than the first time duration.

38. The method of claim 27, wherein:
biasing, using the third set of bias voltages, the reference memory transistor comprises applying a positive bias of a fourth voltage value to the drain terminal or the source terminal of the reference memory transistor relative to the gate terminal to induce the third polarization state in the ferroelectric gate dielectric layer, the fourth voltage value being equal to or less than the third voltage value.

39. The method of claim 38, further comprising:
prior to biasing the reference memory transistor to the third set of bias voltages, pre-conditioning the reference memory transistor by apply a set of bias voltages to set the reference memory transistor to a polarization state opposite the third polarization state.

40. The method of claim 38, wherein:
applying the positive bias of the third voltage value to the drain and source terminals of the ferroelectric memory transistor relative to the gate terminal comprises applying the positive bias of the third voltage value for a third time duration to the drain and source terminals of the ferroelectric memory transistor relative to the gate terminal to induce the first polarization state; and
applying the positive bias of the fourth voltage value comprises applying the positive bias of the fourth voltage value for a fourth time duration to the drain terminal or the source terminal of the reference memory transistor relative to the gate terminal to induce the third polarization state in the ferroelectric gate dielectric layer, the fourth time duration being shorter than the third time duration.

41. The method of claim 27, wherein
biasing, using the first set of bias voltages, one or more ferroelectric memory transistors comprises applying a positive bias of a first voltage value to the gate terminal of the ferroelectric memory transistor relative to the drain and source terminals to induce the first polarization state; and
biasing, using the third set of bias voltages, the reference memory transistor comprises applying a positive bias of a second voltage value to the gate terminal of the reference memory transistor relative to the drain terminal and the source terminal to induce the third polarization state in the ferroelectric gate dielectric layer, the second voltage value being less than the first voltage value.

42. The method of claim 27, wherein:
biasing, using the second set of bias voltages, one or more ferroelectric memory transistors comprises applying a positive bias of a third voltage value to the drain and source terminals of the ferroelectric memory transistor relative to the gate terminal to induce the second polarization state; and
biasing, using the third set of bias voltages, the reference memory transistor comprises applying a positive bias of a fourth voltage value to the drain terminal and the source terminal of the reference memory transistor relative to the gate terminal to induce the third polarization state in the ferroelectric gate dielectric layer, the fourth voltage value being less than the third voltage value.

43. The method of claim 25, further comprising:
periodically applying the third set of bias voltages to the reference memory transistor to set the ferroelectric gate dielectric layer to the third polarization state.

* * * * *